(12) United States Patent
Tsukidate et al.

(10) Patent No.: US 6,262,721 B1
(45) Date of Patent: Jul. 17, 2001

(54) SERVICE SUPPLY APPARATUS FOR SUPPLYING A SERVICE OF A BROADCASTING PROGRAM WITH ATTRIBUTE INFORMATION OF THE PROGRAM

(75) Inventors: Ryota Tsukidate; Yoshiyasu Takeuchi, both of Tokyo; Kazuhiro Machida, Inzai; Takenosuke Harada, Yokohama; Shigeki Kaneko, Funabashi; Kenichi Fujita, Tokyo; Yoshimasa Goto, Kawasaki, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 08/888,362

(22) Filed: Jul. 3, 1997

(30) Foreign Application Priority Data

Jul. 3, 1996 (JP) .................................................. 8-193976
Jul. 23, 1996 (JP) .................................................. 8-211964

(51) Int. Cl.[7] ...................................................... H04N 7/10
(52) U.S. Cl. .............................................. 345/327; 348/12
(58) Field of Search .................... 345/327; 109/219–218, 109/217; 348/1, 2–5, 7, 12, 10, 13; 455/2

(56) References Cited

U.S. PATENT DOCUMENTS

| | | |
|---|---|---|
| 5,223,924 | 6/1993 | Strubbe . |
| 5,446,919 | * 8/1995 | Wilkins ................................ 455/6.2 |
| 5,758,257 | * 5/1998 | Herz et al. ............................... 455/2 |

FOREIGN PATENT DOCUMENTS

| | | |
|---|---|---|
| 64-50688 | 2/1989 | (JP) . |
| 6-197342 | 7/1994 | (JP) . |
| 6-319122 | 11/1994 | (JP) . |
| 2520588 | 5/1996 | (JP) . |

* cited by examiner

Primary Examiner—Nathan Flynn
(74) Attorney, Agent, or Firm—Israel Gopstein

(57) ABSTRACT

Viewer individual attribute information indicating an attribute of a particular viewer such as an age, male or female, a resident district, a taste, an occupation and a life style is stored in a receiving terminal apparatus of the particular viewer. When a broadcasting program is transmitted from a service supply apparatus to the receiving terminal apparatus, service addition information indicating an attribute of the broadcasting program or an attribute condition required of viewers is transmitted to the receiving terminal apparatus with contents of the broadcasting program. In the receiving terminal apparatus, the service addition information is collated with the viewer individual attribute information of the particular viewer, and it is judged whether or not the broadcasting program is suitable for the particular viewer. In cases where the broadcasting program is suitable for the particular viewer, the broadcasting program is received by the receiving terminal apparatus and is reproduced and displayed. Therefore, the broadcasting program can be received by only a group of particular viewers desired on a side of the service supply apparatus even though the group of particular viewers is not specified.

47 Claims, 34 Drawing Sheets

FIG. 10

| SUPPLY CONDITION | NAME OF PROGRAM | KEYWORD |
|---|---|---|
| LIVE BROADCAST 1 | SOCCER GAME | SOCCER |
| LIVE BROADCAST 2 | GOLF COMPETITION | GOLF |
| LIVE BROADCAST 3 | F1 CAR RACING | F1 |
| LIVE BROADCAST 4 | BASEBALL GAME | BASEBALL |

BROADCASTING DATA STORING UNIT — 71

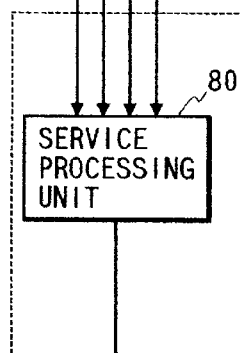

SERVICE PROCESSING UNIT — 80

BASEBALL GAME

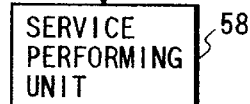

SERVICE PERFORMING UNIT — 58

OVERALL VIEWER ATTRIBUTE INFORMATION

| KEYWORD | SUMMED USING NUMBER |
|---|---|
| SOCCER | 2305 |
| GOLF | 1280 |
| F1 | 532 |
| BASEBALL | 12479 |

91

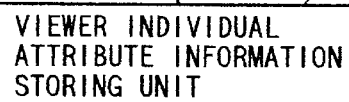

VIEWER INDIVIDUAL ATTRIBUTE INFORMATION STORING UNIT — 87

VIEWER ATTRIBUTE INFORMATION

| KEYWORD | USING NUMBER |
|---|---|
| SOCCER | 30 |
| GOLF | 9 |
| F1 | 7 |
| BASEBALL | 5 |

| BINARY CODE | KEYWORD | USING NUMBER |
|---|---|---|
| 0 | CAR | 6 |
| 1 | 40s | 27 |
| 10 | 30s | 21 |
| 11 | FLOWER | 2 |
| 100 | PLANT | 3 |
| 101 | GARDEN | 1 |
| 110 | VEGETABLE | 6 |
| 111 | F1 | 7 |
| 1000 | 20s | 30 |
| 1001 | INSECT | 1 |
| 1010 | 10s | 1 |
| | | |
| | | |

108a

⇒

108b

| BINARY CODE | KEYWORD | USING NUMBER |
|---|---|---|
| 0 | CAR | 7 |
| 1 | 40s | 27 |
| 10 | 30s | 22 |
| 11 | FLOWER | 2 |
| 100 | PLANT | 3 |
| 101 | GARDEN | 1 |
| 110 | VEGETABLE | 6 |
| 111 | F1 | 8 |
| 1000 | 20s | 31 |
| 1001 | INSECT | 1 |
| 1010 | 10s | 1 |
| | | |
| | | |

FIG. 18

| BINARY CODE | KEYWORD | USING NUMBER |
|---|---|---|
| 1000 | 20s | 30 |
| 1 | 40s | 27 |
| 10 | 30s | 21 |
| 1100 | SWIMSUIT | 9 |
| 1011 | PICTURE | 8 |
| 111 | F1 | 7 |
| 0 | CAR | 6 |
| 110 | VEGETABLE | 6 |
| 1010 | 10s | 5 |
| 100 | PLANT | 3 |
| 11 | FLOWER | 2 |
| | | |
| | | |

109c

⇒

109d

| BINARY CODE | KEYWORD | USING NUMBER |
|---|---|---|
| 1000 | 20s | 30 |
| 1 | 40s | 27 |
| 10 | 30s | 21 |
| 1100 | SWIMSUIT | 9 |
| 1011 | PICTURE | 8 |
| 111 | F1 | 7 |
| 0 | CAR | 6 |
| 110 | VEGETABLE | 6 |
| 1010 | 10s | 5 |
| 100 | PLANT | 3 |
| 11 | FLOWER | 2 |
| 101 | ROCK | 1 |
| 1001 | CONCERT | 1 |

FIG. 21

SHORT-TERM ATTRIBUTES

| KEYWORD | USING NUMBER |
|---|---|
| 20s | 30 |
| SWIMSUIT | 9 |
| F1 | 7 |
| 10s | 5 |

LONG-TERM ATTRIBUTES BEFORE RENEWAL

| KEYWORD | USING NUMBER |
|---|---|
| 20s | 1205 |
| 40s | 40 |
| 30s | 220 |
| PICTURE | 40 |
| F1 | 150 |
| CAR | 36 |
| VEGETABLE | 12 |
| 10s | 360 |
| PLANT | 34 |
| FLOWER | 170 |
| | |

SUMMATION

LONG-TERM ATTRIBUTES AFTER RENEWAL

| KEYWORD | USING NUMBER |
|---|---|
| 20s | 1235 |
| 40s | 40 |
| 30s | 220 |
| PICTURE | 40 |
| F1 | 157 |
| CAR | 36 |
| VEGETABLE | 12 |
| 10s | 365 |
| PLANT | 34 |
| FLOWER | 170 |
| SWIMSUIT | 90 |
| | |

FIG. 35

| 1/24/1997Fri | | | |
|---|---|---|---|
| TIME | BROADCASTING STATION | PROGRAM NAME | KEYWORD |
| 7 | NETWORK A | SATELITE NEWS | NEWS |
| 7 | NETWORK B | SATELITE DRAMA | DRAMA |
| 7 | NETWORK C | EXITING SPORTS | SPORTS |
| ----- | -------------- | -------------------- | ---------- |

137

| KEYWORD | USING NUMBER |
|---|---|
| SPORTS | 2305 |
| DRAMA | 1280 |
| MOVIE | 532 |
| NEWS | 12479 |

139

| 1/24/1997Fri | |
|---|---|
| 7 | NETWORK A<br>SATELITE NEWS |
| 8 | NETWORK D<br>SPECIAL PROGRAM ABOUT HOSPITALS |
| 9 | NETWORK F<br>WORLD NEWS |

138

SERVICE SUPPLY APPARATUS FOR SUPPLYING A SERVICE OF A BROADCASTING PROGRAM WITH ATTRIBUTE INFORMATION OF THE PROGRAM

BACKGROUND OF THE INVENTION

1. Field of the Invention

The present invention relates generally to a service supply apparatus, a service receiving apparatus and a broadcast system composed of the service supply apparatus and the service receiving apparatus, and more particularly to a service supply apparatus for supplying a service of a broadcasting program and service addition information indicating attributes of the broadcasting program, a service receiving apparatus of a viewer for receiving the service of the broadcasting program and the service addition information and a broadcast system for transmitting a broadcasting program required by a viewer from the service supply apparatus to the service receiving apparatus of the viewer.

2. Description of the Related Art

Multi-media information such as audio information and visual information has been recently supplied to a user (or a viewer) with the advancement of a communication technique and a data processing technique. Also, because a large capacity of recording medium has been developed, a user can use a broadcast system to transmit a large volume of broadcasting program data by using a broadcast communicating unit, the broadcasting program data is received and stored by a terminal unit on a user's side and the broadcasting program data is reproduced and viewed by the user.

2.1. Previously Proposed Art

As one conventional technique of the broadcast system already disclosed, broadcasting program data including both content data of a broadcasting program expected to be viewed by a viewer and control data used to control the broadcasting program is broadcasted from a broadcasting center and is received by a receiving terminal unit of the viewer, the broadcasting program data is recorded in a recording medium, the recorded broadcasting program data is read out when the user desires to view the broadcasting program, and the broadcasting program is viewed by the viewer.

Also, another conventional broadcast system, in which a processing program used to process a broadcasting program is transmitted with the broadcasting program to a receiving terminal unit of the viewer, is known. In this broadcast system, data of the broadcasting program and data of the processing program are distributed in a plurality of objects, and the data are transmitted in an object unit. Therefore, display contents of the broadcasting program can be widely changed because the processing program is transmitted with the broadcasting program and is executed.

2.2. Problems to be Solved by the Invention

However, in the conventional broadcast system, though the broadcasting program is transmitted, the display contents of the broadcasting program are changed by executing the processing program and the viewer can entertain varied contents of the broadcasting program, main contents of the broadcasting program (or a main portion of the broadcasting program) are only reproduced and displayed in cases where the contents of the broadcasting program are reproduced and displayed on the user's receiving terminal unit. Therefore, in cases where a service supplier desires to supply a broadcasting program or a service relating to the broadcasting program to one or more viewers on condition that the broadcasting program suits their tastes or personal attributes, the service supplier is required to specify in advance the viewers to which the service supplier really desires to supply the broadcasting program or the service. Otherwise, the service supplier has no choice but to supply the broadcasting program or the service to a plurality of unspecified users regardless of tastes of the unspecified users. In other words, unless the service supplier knows tastes of a plurality of users, the service supplier cannot supply the broadcasting program or the service to the users on condition that the broadcasting program suits their tastes. Also, in cases where each of a plurality of users is specified in advance by a service supplier, the service supplier is required to get allowance for supplying a broadcasting program or a service relating to the broadcasting program from each of the users each time the broadcasting program or the service is supplied to the users. Therefore, there is a drawback that a transmission volume of data of the broadcasting program or the service is increased as the number of users is increased.

SUMMARY OF THE INVENTION

An object of the present invention is to provide, with due consideration to the drawbacks of such a conventional broadcast system, a broadcast system in which a broadcasting program transmitted from a center station is reproduced and displayed on a side of each of a plurality of viewers on condition that the broadcasting program suits a taste of each viewer regardless of whether the viewers are specified. Also, the object of the present invention is to provide a service supply apparatus and a service receiving apparatus used in the broadcast system.

In the broadcast system according to a first idea, an attribute (or a taste) of each viewer is registered on a receiving side, an attribute of a broadcasting program is specified by a service supplier of a center side to limitedly supply the broadcasting program to a group of particular viewers to which the service supplier desires to supply the broadcasting program, the broadcasting program and the attribute of the broadcasting program are supplied to all viewers from the center side, the attribute of the broadcasting program is examined on each receiving side, and it is judged on each receiving side whether or not the attribute of the broadcasting program matches with the attribute of the viewer. In cases where the attribute of the broadcasting program matches with the attribute of the viewer, it is judged that the broadcasting program is suitable for the viewer, and the broadcasting program is reproduced and displayed by the viewer.

Also, in the broadcast system according to a second idea, an attribute (or a taste) of a viewer and an operation record of the viewer indicating the reproduction of a particular broadcasting program received by the viewer are transmitted to a center side for each of a plurality of viewers, and an overall attribute of a plurality of viewers by which the particular broadcasting program is reproduced and displayed are grasped by a program supplier according to the attributes of the viewers and the operation records of the viewers.

Also, in the broadcast system according to a third idea, a data transmitting means is placed between a center side and each service receiving terminal unit, an electronic direct mail or a questionnaire about one or more broadcasting programs is transmitted from the center side, the electronic direct mail or the questionnaire is received by one or more service receiving terminal units of particular viewers through the data transmitting means, and replies submitted to the questionnaire is returned from the particular viewers to the center side.

The object of the present invention is achieved by the provision of a broadcast system comprising a service supply apparatus for supplying service content information of a plurality of broadcasting programs one after another and a receiving terminal apparatus for receiving the service content information of each broadcasting program supplied by the service supply apparatus, the service supply apparatus comprising:
- broadcasting data storing means for storing the service content information indicating contents of each of the broadcasting programs as broadcasting data;
- service addition information preparing means for preparing service addition information indicating an attribute of each broadcasting program stored in the broadcasting program storing means as broadcasting data; and
- broadcasting data transmitting means for transmitting the service content information of each broadcasting program stored in the broadcasting program storing means and the service addition information of the corresponding broadcasting program prepared by the service addition information preparing means, and the receiving terminal apparatus of a viewer comprising:
- attribute information storing means for storing viewer attribute information indicating a personal attribute of the viewer;
- broadcasting data receiving means for receiving the service content information and the service addition information of the broadcasting program transmitted from the broadcasting data transmitting means of the service supply apparatus;
- attribute information collating means for collating the service addition information received by the broadcasting data receiving means with the viewer attribute information stored in the attribute information storing means and judging whether or not the attribute of the service content information of the broadcasting program suits the personal attribute of the viewer; and
- broadcasting program reproducing means for reproducing the service content information of the broadcasting program received by the broadcasting data receiving means in cases where it is judged by the attribute information collating means that the attribute of the service content information of the broadcasting program suits the personal attribute of the viewer.

In the above configuration, service addition information indicating an attribute of service content information of one broadcasting program is prepared by the service addition information preparing means each time the service content information of the broadcasting program is stored in the broadcasting data storing means. Thereafter, the service content information of the broadcasting program and the service addition information of the broadcasting program are transmitted from the service supply apparatus to the receiving terminal apparatus. Thereafter, the service addition information is collated with viewer attribute information indicating an attribute of the viewer, and it is judged whether or not the attribute of the service content information of the broadcasting program is suitable to the attribute of the viewer. In cases where the attribute of the service content information of the broadcasting program is suitable to the attribute of the viewer, the service content information of the broadcasting program is reproduced.

Therefore, even though the service content information of the broadcasting program is transmitted to a large number of receiving terminal apparatuses used by a plurality of viewers, because it is judged in each of the receiving terminal apparatuses whether or not the attribute of the service content information of the broadcasting program is suitable to the attribute of the viewer, each of the viewers can always reproduce the service content information of the broadcasting program suitable to the viewer.

It is preferred that the service content information and the service addition information of the broadcasting program transmitted from the service supply apparatus be received by a plurality of receiving terminal apparatuses of a plurality of viewers, the service supply apparatus further comprise:
- viewer attribute information data base for storing a piece of viewer attribute information transmitted from the attribute information storing means of each of the receiving terminal apparatuses; and
- service processing means for producing overall viewer attribute information for the viewers from the pieces of viewer attribute information stored in the viewer attribute information data base and selecting a piece of particular service content information of a particular broadcasting program from among the pieces of service content information of the broadcasting programs stored in the broadcasting data storing means, on condition that an attribute of the particular service content information of the particular broadcasting program is most suitable to the overall viewer attribute information, so as to transmit the particular service content information of the particular broadcasting program and particular service addition information of the particular broadcasting program from the broadcasting data transmitting means to each of the receiving terminal apparatuses.

In the above configuration, because the viewer attribute information is transmitted from the attribute information storing means of each of a plurality of receiving terminal apparatuses of a plurality of viewers to the service supply apparatus and overall viewer attribute information for the viewers is produced in the service processing means from the pieces of viewer attribute information, an average attribute of the viewers can be grasped in the service supply apparatus. Therefore, even though a plurality of pieces of service content information of a plurality of broadcasting programs are simultaneously stored in the broadcasting data storing means of the service supply apparatus, a piece of particular service content information of a particular broadcasting program can be selected from among the pieces of service content information of the broadcasting programs on condition that an attribute of the particular service contents of the particular broadcasting program is most suitable to the overall viewer attribute information. That is, the particular service contents of a particular broadcasting program most suitable to the viewers can be transmitted to the receiving terminal apparatuses.

Also, the object of the present invention is achieved by the provision of a broadcast system comprising a service supply apparatus for supplying an electronic direct mail and a receiving terminal apparatus for receiving the electronic direct mail supplied by the service supply apparatus, the service supply apparatus comprising:
- broadcasting data storing means for storing contents of the electronic direct mail as broadcasting data;
- service addition information preparing means for preparing service addition information indicating an attribute of the electronic direct mail stored in the broadcasting program storing means as broadcasting data while adding mail receiving viewer condition information indicating an attribute condition required of a viewer planned to receive the electronic direct mail to the service addition information; and broadcasting data transmitting means for transmitting the electronic direct mail stored in the broadcasting program storing means and the service addition information prepared by the service addition information preparing means, and the receiving terminal apparatus of a current viewer comprising:

attribute information storing means for storing viewer attribute information indicating a personal attribute of the viewer;

broadcasting data receiving means for receiving the electronic direct mail and the service addition information transmitted from the broadcasting data transmitting means of the service supply apparatus;

attribute information collating means for collating the attribute condition indicated by the mail receiving viewer condition information of the service addition information received by the broadcasting data receiving means with the personal attribute indicated by the viewer attribute information stored in the attribute information storing means and judging whether or not the electronic direct mail is suitable for the current viewer; and mail reproducing means for reproducing the electronic direct mail received by the broadcasting data receiving means in cases where the attribute information collating means judges that the electronic direct mail is suitable for the current viewer.

In the above configuration, service addition information indicating an attribute of an electronic direct mail is prepared by the service addition information preparing means while adding mail receiving viewer condition information to the service addition information. The mail receiving viewer condition information indicates an attribute condition required of a viewer planned to receive the electronic direct mail. Thereafter, the service addition information and the electronic direct mail are transmitted from the service supply apparatus to a plurality of receiving terminal apparatuses. In each receiving terminal apparatus of a current viewer, the mail receiving viewer condition information is extracted from the service addition information, and the attribute condition of the mail receiving viewer condition information is collated with the personal attribute of the current viewer in the attribute information collating means. In cases where the personal attribute of the current viewer satisfies the attribute condition of the mail receiving viewer condition information, the attribute information collating means judges that the electronic direct mail is suitable for the current viewer, and the electronic direct mail is reproduced in the mail reproducing means. In contrast, in cases where the personal attribute of the current viewer does not satisfy the attribute condition of the mail receiving viewer condition information, because the electronic direct mail is not suitable for the current viewer, the electronic direct mail is not reproduced.

Accordingly, because the service addition information including the mail receiving viewer condition information is transmitted from the service supply apparatus to the receiving terminal apparatus and the personal attribute of the current viewer is collated with the attribute condition indicated by the mail receiving viewer condition information, the electronic direct mail can be reproduced by only the current viewer on condition that the current viewer is suitable for the electronic direct mail. Therefore, the electronic direct mail can be efficiently transmitted and reproduced.

Also, the object of the present invention is achieved by the provision of a broadcast system comprising a service supply apparatus for supplying a questionnaire and a receiving terminal apparatus for receiving the questionnaire supplied by the service supply apparatus, the service supply apparatus comprising:

broadcasting data storing means for storing contents of the questionnaire as broadcasting data;

service addition information preparing means for preparing service addition information indicating an attribute of the questionnaire stored in the broadcasting program storing means as broadcasting data while adding questionnaire receiving viewer condition information indicating an attribute condition required of a viewer planned to receive the questionnaire to the service addition information; and broadcasting data transmitting means for transmitting the questionnaire stored in the broadcasting program storing means and the service addition information prepared by the service addition information preparing means, and the receiving terminal apparatus of a current viewer comprising:

attribute information storing means for storing viewer attribute information indicating a personal attribute of the viewer;

broadcasting data receiving means for receiving the questionnaire and the service addition information transmitted from the broadcasting data transmitting means of the service supply apparatus;

attribute information collating means for collating the attribute condition indicated by the questionnaire receiving viewer condition information of the service addition information received by the broadcasting data receiving means with the personal attribute indicated by the viewer attribute information stored in the attribute information storing means and judging whether or not the questionnaire is suitable for the current viewer; and questionnaire reproducing means for reproducing the questionnaire received by the broadcasting data receiving means in cases where the attribute information collating means judges that the questionnaire is suitable for the current viewer.

In the above configuration, the service addition information including the questionnaire receiving viewer condition information is transmitted from the service supply apparatus to the receiving terminal apparatus, and the personal attribute of the current viewer is collated with the attribute condition indicated by the questionnaire receiving viewer condition information to judge whether or not the questionnaire is suitable for the current viewer. Therefore, the questionnaire can be reproduced by only the current viewer on condition that the current viewer is suitable for the questionnaire, so that the questionnaire can be efficiently transmitted and reproduced.

Also, the object of the present invention is achieved by the provision of a service supply apparatus, comprising:

broadcasting data storing means for storing service content information indicating contents of a broadcasting program as broadcasting data;

service addition information preparing means for preparing service addition information indicating an attribute of the broadcasting program stored in the broadcasting program storing means as broadcasting data; and broadcasting data transmitting means for transmitting the service content information of the broadcasting program stored in the broadcasting program storing means and the service addition information prepared by the service addition information preparing means to one or more receiving terminal apparatuses of one or more viewers.

In the above configuration, because the service addition information indicating an attribute of the broadcasting program is transmitted with the service content information of the broadcasting program, each of the viewers can received the broadcasting program on condition that the broadcasting program is suitable for the viewer. That is, even though a group of viewers which are planned to receive the broadcasting program is not specified, the broadcasting program can be received by a group of particular viewers for which the broadcasting program is suitable.

Also, the object of the present invention is achieved by the provision of a service supply apparatus, comprising:

broadcasting data storing means for storing contents of an electronic direct mail as broadcasting data;

service addition information preparing means for preparing service addition information indicating an attribute of the electronic direct mail stored in the broadcasting program storing means as broadcasting data while adding mail receiving viewer condition information indicating an attribute condition required of a plurality of particular viewers planned to receive the electronic direct mail to the service addition information; and broadcasting data transmitting means for transmitting the electronic direct mail stored in the broadcasting program storing means and the service addition information prepared by the service addition information preparing means to a plurality of receiving terminal apparatuses of a plurality of viewers including the particular viewers.

In the above configuration, because the mail receiving viewer condition information indicating an attribute condition required of a plurality of particular viewers planned to receive the electronic direct mail is transmitted with the electronic direct mail, each of the particular viewers can received the electronic direct mail on condition that the electronic direct mail is suitable for the particular viewer. That is, even though a group of particular viewers which are planned to receive the electronic direct mail is not specified, the electronic direct mail can be received by the group of particular viewers for which the electronic direct mail is suitable.

Also, the object of the present invention is achieved by the provision of a service supply apparatus, comprising:

broadcasting data storing means for storing contents of a questionnaire as broadcasting data;

service addition information preparing means for preparing service addition information indicating an attribute of the questionnaire stored in the broadcasting program storing means as broadcasting data while adding questionnaire receiving viewer condition information indicating an attribute condition required of a plurality of particular viewers planned to receive the questionnaire to the service addition information; and broadcasting data transmitting means for transmitting the questionnaire stored in the broadcasting program storing means and the service addition information prepared by the service addition information preparing means to a plurality of receiving terminal apparatuses of a plurality of viewers including the particular viewers.

In the above configuration, because the questionnaire receiving viewer condition information indicating an attribute condition required of a plurality of particular viewers planned to receive the questionnaire is transmitted with the questionnaire, each of the particular viewers can received the questionnaire on condition that the questionnaire is suitable for the particular viewer. That is, even though a group of particular viewers which are planned to receive the questionnaire is not specified, the questionnaire can be received by the group of particular viewers for which the questionnaire is suitable.

Also, the object of the present invention is achieved by the provision of a receiving terminal apparatus of a current viewer, comprising:

attribute information storing means for storing viewer attribute information indicating a personal attribute of the current viewer;

broadcasting data receiving means for receiving service content information indicating contents of a broadcasting program and service addition information indicating an attribute of the broadcasting program transmitted from a service supply apparatus;

attribute information collating means for collating the service addition information received by the broadcasting data receiving means with the viewer attribute information stored in the attribute information storing means and judging whether or not the attribute of the service content information of the broadcasting program suits the personal attribute of the viewer; and broadcasting program reproducing means for reproducing the service content information of the broadcasting program received by the broadcasting data receiving means in cases where it is judged by the attribute information collating means that the attribute of the service content information of the broadcasting program suits the personal attribute of the viewer.

In the above configuration, the service addition information indicating an attribute of the broadcasting program is collated with the viewer attribute information indicating a personal attribute of the current viewer, and it is judged whether or not the attribute of the service content information of the broadcasting program suits the personal attribute of the viewer. Therefore, the service content information of the broadcasting program can be reproduced in cases where the attribute of the service content information of the broadcasting program suits the personal attribute of the viewer.

Accordingly, even though a large number of broadcasting programs are received by the viewer, one or more particular broadcasting programs suitable for the viewer are selected from the broadcasting programs, and the viewer can view the particular broadcasting programs.

Also, the object of the present invention is achieved by the provision of a receiving terminal apparatus of a current viewer comprising:

attribute information storing means for storing viewer attribute information indicating a personal attribute of the current viewer;

broadcasting data receiving means for receiving an electronic direct mail and service addition information indicating an attribute of the electronic direct mail from a service supply apparatus, mail receiving viewer condition information indicating an attribute condition for a viewer planned to receive the electronic direct mail being included in the service addition information;

attribute information collating means for collating the attribute condition indicated by the mail receiving viewer condition information of the service addition information received by the broadcasting data receiving means with the personal attribute indicated by the viewer attribute information stored in the attribute information storing means and judging whether or not the electronic direct mail is suitable for the current viewer; and mail reproducing means for reproducing the electronic direct mail received by the broadcasting data receiving means in cases where the attribute information collating means judges that the electronic direct mail is suitable for the current viewer.

In the above configuration, the service addition information in which the mail receiving viewer condition information indicating an attribute condition for a viewer planned to receive the electronic direct mail is included is received with the electronic direct mail, and the attribute condition indicated by the mail receiving viewer condition information is collated with the personal attribute indicated by the viewer attribute information to judge whether or not the electronic direct mail is suitable for the current viewer. In cases where the personal attribute of the current viewer satisfies the attribute condition, it is judged that the electronic direct mail is suitable for the current viewer, and the electronic direct mail is reproduced.

Accordingly, even though a large number of electronic direct mails are received by the current viewer, one or more particular electronic direct mails suitable for the current viewer are selected from the electronic direct mails, and the current viewer can read the particular electronic direct mails.

Also, the object of the present invention is achieved by the provision of a receiving terminal apparatus of a current viewer comprising:

attribute information storing means for storing viewer attribute information indicating a personal attribute of the current viewer;

broadcasting data receiving means for receiving a questionnaire and service addition information indicating an attribute of the questionnaire from a service supply apparatus, questionnaire receiving viewer condition information indicating an attribute condition for a viewer planned to receive the questionnaire being included in the service addition information;

attribute information collating means for collating the attribute condition indicated by the questionnaire receiving viewer condition information of the service addition information received by the broadcasting data receiving means with the personal attribute indicated by the viewer attribute information stored in the attribute information storing means and judging whether or not the questionnaire is suitable for the current viewer; and questionnaire reproducing means for reproducing the questionnaire received by the broadcasting data receiving means in cases where the attribute information collating means judges that the questionnaire is suitable for the current viewer.

In the above configuration, the service addition information in which the questionnaire receiving viewer condition information indicating an attribute condition for a viewer planned to receive the questionnaire is included is received with the questionnaire, and the attribute condition indicated by the questionnaire receiving viewer condition information is collated with the personal attribute indicated by the viewer attribute information to judge whether or not the questionnaire is suitable for the current viewer. In cases where the personal attribute of the current viewer satisfies the attribute condition, it is judged that the questionnaire is suitable for the current viewer, and the questionnaire is reproduced.

Accordingly, even though a large number of questionnaires are received by the current viewer, one or more particular questionnaires suitable for the current viewer are selected from the questionnaires, and the current viewer can read the particular questionnaires.

BRIEF DESCRIPTION OF THE DRAWINGS

The objects, features and advantages of the present invention will be apparent from the following description taken in conjunction with the accompanying drawings, in which:

FIG. 10 is an explanatory view of a service selecting operation performed by a service processing unit to select only one broadcasting program supplied through one image channel from among four broadcasting programs supplied through four image channel;

FIG. 16 is an explanatory view showing a code table renewing operation in which a using number for a particular keyword in a code table 108a is incremented each time a particular binary character code corresponding to the particular keyword is requested of a keyword coding unit shown in FIG. 13;

FIG. 18 is an explanatory view showing a code allocating operation in which a code crossed off from a code table 109b in the code table renewing operation is allocated to a new keyword as a coded keyword;

FIG. 21 shows the renewal of long-term attributes held in a long-term attribute holding unit shown in FIG. 19;

FIG. 35 is an explanatory view showing an operation for displaying an electronic broadcasting program by using viewer individual attribute information transmitted from a service supply apparatus shown in FIG. 33.

DETAILED DESCRIPTION OF THE EMBODIMENTS

Preferred embodiments of a broadcast system, a service supply apparatus and a service receiving apparatus according to the present invention are described with reference to drawings.

Figure 1:
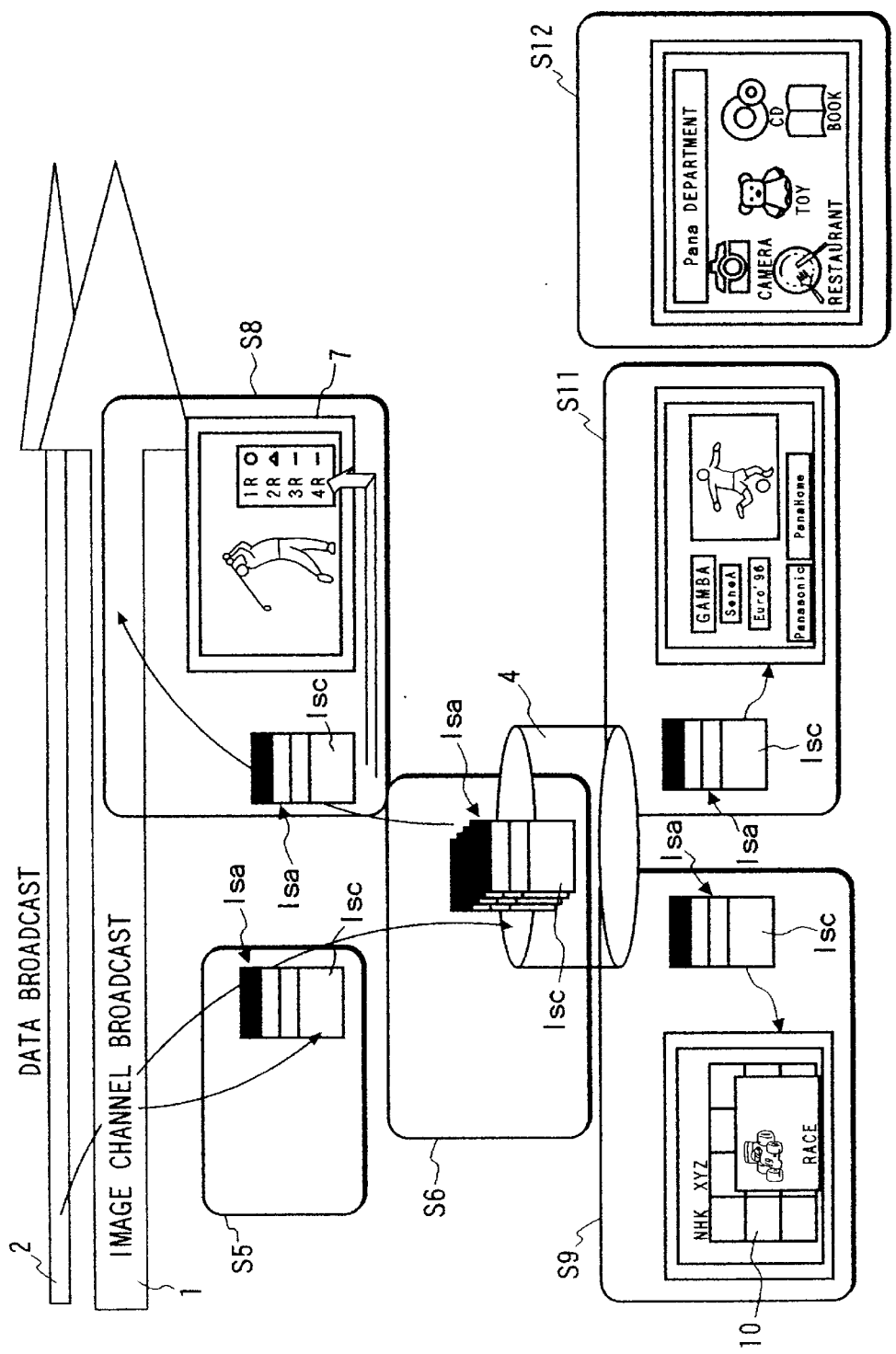
FIG. 1 is an outline block diagram showing a fundamental conceptual structure of a broadcast system according to the present invention.

FIG. 1 is an outline block diagram showing a fundamental conceptual structure of a broadcast system according to the present invention.

In FIG. 1, a processing from a broadcasting step for sending service addition information Isa from a center station to a plurality of viewers (or a plurality of users) through a two-way communication line on a data broadcast 2 to a utilizing step for utilizing the service addition information Isa on a side of each of the viewers is shown. The data broadcast 2 is performed with an image channel broadcast 1. In the image channel broadcast 1, service contents of a broadcasting program (or a broadcasting program itself) composed of image information, audio information, character information and the like is sent from the center station to the viewers. Also, service addition information Isa indicates features (or attributes) of a corresponding service (or a corresponding broadcasting program), a relationship between the corresponding service and another service (or a broadcasting program relating to the corresponding broadcasting program) and the like, and the service addition information Isa such as an electronic program guide (EPG) is repeatedly broadcasted at any time on the data broadcast 2. In this specification, the service contents of one broadcasting program and service addition information of the broadcasting program are respectively called broadcasting data.

In this broadcast system, features of service contents of a particular broadcasting program and a relationship between the service contents of the particular broadcasting program and service contents of another broadcasting program relating to the particular broadcasting program are written in the service addition information Isa as attribute information of the particular broadcasting program. As an example, in an operation of the broadcast system according to the present invention, the service addition information Isa of a broadcasting program is broadcasted from the center station before service content information Isc (for example, including contents of the broadcasting program, contents of a commercial message attached to the broadcasting program and contents of other information) is broadcasted. In this case, the service content information Isc denotes service contents of the broadcasting program.

In another broadcasting data transmission case, the service addition information Isa is superimposed on the digitalized broadcasting program (or the digitalized service content information Isc), and the service addition information Isa and the digitalized broadcasting program are broadcasted through the same communication path. Also, in another broadcasting data transmission case, the service content information Isc of the broadcasting program is sent on analog-broadcast, and the service addition information Isa is sent on digital-broadcast.

Figure 2:
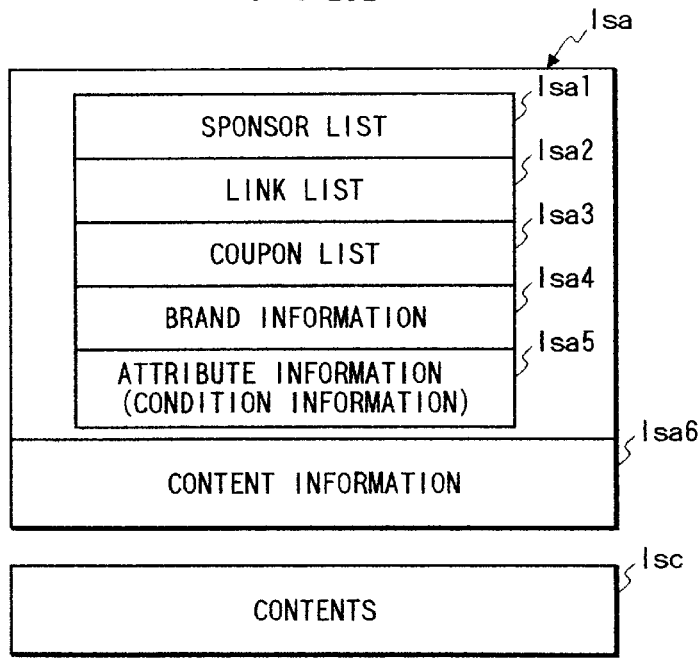
FIG. 2 shows a configuration of service addition information Isa of one broadcasting program.

As shown in FIG. 2, the service addition information Isa corresponding to one service (or one broadcasting program) is, for example, composed of a sponsor list Isa1, a link list Isa2, a coupon list Isa3, brand information Isa4, attribute (or condition) information Isa5 and content information Isa6.

The sponsor list Isa1 denotes data of sponsor names relating to the service, and the sponsor names are written in a list form. The link list Isa2 denotes data indicating another link service or other link services linked to the service, and the link services are written in a list form. The coupon list Isa3 denotes information of a plurality of types of coupons respectively applicable to the service at a service addition information preparing time, and the types of coupons are written in a list form. The coupon denotes data relating to a discount on the service in cases where a viewer is required to pay for the service, and a discount degree is determined according to his utilizing results of the service in the past time. For example, a discount point is supplied for the viewer as a coupon. The brand information Isa4 denotes one or more broadcasting program producers, one or more broadcasting program presenters and one or more business enterprises guaranteeing the service. The attribute information Isa5 denotes attributes such as a range of ages of viewers, the distinction of sex of the viewers, a resident district of the viewers, tastes of the viewers, occupations of the viewers, life styles of the viewers and the like. Also, data of broadcasting program viewing results of the viewers and broadcasting program selecting records of the viewers are included in the attribute information Isa5. In this embodiment, the attribute information Isa5 relates to attributes of the viewers. However, it is applicable that attributes relating to service contents of a broadcasting program be stored as the attribute information Isa5. For example, the attribute information Isa5 indicates that service contents of a broadcasting program is the presentation of a sport competition or service contents of a broadcasting program belong to a classification of an action movie. The content information Isa6 denotes data indicating contents of the service. Also, service content information Isc mainly composed of elements of a broadcasting program corresponds to one piece of service addition information Isa, and the service content information Isc denotes the service contents of the broadcasting program. For example, the service content information Isc is composed of multimedia information indicating details of the broadcasting program, an advance billing of the broadcasting program, the broadcasting program itself, a commercial message attached to the broadcasting program, a questionnaire relating to the broadcasting program, a mail relating to the broadcasting program, an application program relating to the broadcasting program, and other various data relating to the broadcasting program.

Service addition information Isa and service content information Isc corresponding to the service addition information Isa are respectively broadcasted and are received in a receiving terminal apparatus as a set of the service addition information Isa and the service content information Isc. The set of the service addition information Isa and the service content information Isc is stored, maintained and managed in a service information storing unit 4 of the receiving terminal apparatus.

The service content information Isc is broadcasted as a broadcasting service from a dedicated image channel to a receiving terminal apparatus after the service addition information Isa are broadcasted. In the receiving terminal apparatus, particular service addition information Isa judged to be necessary for a user of the receiving terminal apparatus is selected from among the pieces of service addition information Isa according to a setting condition of the receiving terminal apparatus, and a set of the particular service addition information Isa and the service content information Isc is stored in the service information storing unit 4 of the receiving terminal apparatus in a service addition information accumulation processing step S5 (refer to FIG. 1). The pieces of particular service addition information Isa selected and accumulated one after another are managed and maintained by using a resident demon program stored in the receiving terminal apparatus. In cases where a piece of replacing information indicating the replacement of service addition information Isa stored in the service information storing unit 4 is received in the receiving terminal apparatus, the pieces of particular service addition information Isa stored in the service information storing unit 4 are updated, a piece of particular service addition information Isa is linked to a piece of reference information according to a user's preference, a piece of particular service addition information Isa is managed to be immediately read out when the piece of particular service addition information Isa is called up by a viewer's application, or a piece of unnecessary particular service addition information Isa is abandoned in a management and maintenance processing step S6 (refer to FIG. 1). The pieces of particular service addition information Isa broadcasted and received in the service addition information accumulation processing step S5 are partially changed and respectively stored in the service information storing unit 4. In the present invention, the service addition information Isa differs from the service content information Isc. However, it is applicable that the service addition information Isa itself include the service content information Isc.

Thereafter, a piece of specific service addition information Isa relating to a current broadcasting program is picked up and read out from the pieces of service addition information Isa accumulated in the service information storing unit 4 as the need arises, and the specific service addition information Isa is overlay-displayed on an image plane of a display 7, or the specific service addition information Isa blended with a background of the current broadcasting program is displayed. For example, in an automatic display processing step S8 for the service addition information Isa performed during a relay broadcast of a golf competition, an operation that the user refers to a current score of a displayed player, an analyzed image of a swing form is displayed, or detail information of a golf club used by a displayed player is displayed can be performed, regardless of a proceeding condition of the broadcast of the golf competition, by operating a remote control unit.

Also, there is a case that the user does not operate the remote control unit but information relating to the golf competition is automatically called up and displayed when a trigger signal is output at a prescribed timing during the broadcast of the golf competition. For example, a direction of a wind in a golf course or a score of a participating player not displayed can be displayed on another displaying plane with a narration. Also, service addition information relating to a commercial message or a commercial message itself can be packed in the service addition information Isa as the service addition information Isa. Also, an image of a commercial message stored in the service information storing unit 4 (such as a local disk) as contents of the service addition information Isa can be displayed in place of an image of a commercial message in a current broadcasting program. For example, in cases where an advertisement of an automobile is performed during a current broadcasting program, even though image information of a commercial message stored in the service information storing unit 4 is the same as that in a current broadcasting program, character information such as data of an inquired dealer in the current broadcasting program can be replaced with data of another dealer which meets with each district and is stored as the service addition information Isa.

Next, a case that the service addition information Isa is accessed by using an electronic program guide and is used is described.

In a broadcasting program guide display processing step S9 for the service addition information Isa, a piece of service addition information Isa for a broadcasting program guide is read out to a displaying unit 7 by the operation of the user, and a broadcasting program guide 10 is displayed. In case of a conventional broadcasting program guide, data of a broadcasting program guide is supplied for the user on condition that the broadcasting program guide can be easily realized and interactively operated by the function of a viewer software (for example, Gem Star or Star Sight) attached on a side of the receiving terminal apparatus. However, an expression form of characters in detail information of the conventional broadcasting program guide is limited to a table form. However, in the present invention, information relating to a broadcasting program, linking information indicating a linking relationship between a broadcasting program listed in the broadcasting program guide 10 and the broadcasting program information, an advance billing of a broadcasting program and the like can be packed in the service addition information Isa as the service addition information Isa. Therefore, the user can interactively access an advance billing of a broadcasting program listed in the broadcasting program guide 10. That is, an amount of information useful to select a broadcasting program is increased.

Also, the user can search one piece of service addition information Isa itself and can display and use detail data of the service addition information Isa. In a search display processing step S11 for the service addition information Isa, detail data of the service addition information Isa is read out and displayed on the displaying unit 7 by the operation of the user. That is, service content information Isc, link information, sponsor information or coupon information of the service addition information Isa is accessed and displayed as detail data of the service addition information Isa. For example, as shown in FIG. 1, link information of the service addition information Isa is displayed in the search display processing step S11. Because another piece of service addition information Isa can be found out by tracing the link information, the link information can function as a service navigator. In cases where a piece of linked service addition information Isa linked to one piece of service addition information Isa does not exist in the storing unit, it is possible that the linked service addition information Isa can be obtained from an information source by using a modem unit attached to the receiving terminal apparatus.

Also, it is applicable that an application program be set as the service content information Isc included in the service addition information C. In this case, the receiving terminal apparatus reads out the service addition information C, and the application program is executed in an application display processing step S12 using the service addition information C. Various types of processing are performed by executing various application programs. For example, an on-line TV shopping is performed in the application display processing step S12 using the service addition information C.

Figure 3:
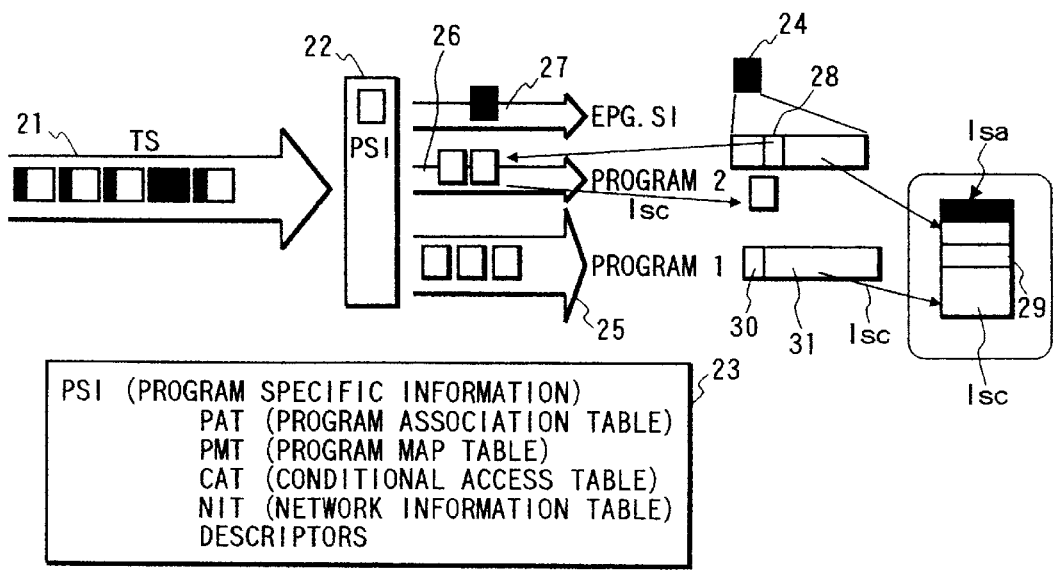
FIG. 3 shows an example of a structure of a piece of broadcasting data.

FIG. 3 shows an example of a structure of a piece of broadcasting data. In FIG. 3, in a transport stream 21 (hereinafter, merely called a stream) denoting pieces of data used in a digital broadcast, a plurality of packets of service information multiplexed with each other are arranged. A piece of program specific information 22 indicates contents of the stream 21. The program specific information 22 is composed of a table group 23 (composed of a program association table, a conditional access table and a network information table) and descriptors 24. A packet of broadcasting program can be extracted from the stream 21 by searching the table group 23. In FIG. 3, a condition that a broadcasting image program 25 is extracted from the stream 21 as a program 1, a digital broadcasting program 26 is extracted from the stream 21 as a program 2 and data 27 of an electronic program guide (EPG) and service information (SI) is extracted from the stream 21 is shown as an example. In this example, the service addition information Isa is defined as a descriptor 24 of the service information SI. In contents of the service addition information Isa, pointer information 28 indicating service content information Isc is included. That is, contents indicated by the pointer information 28 are the service content information Isc. In the service content information Isc, a header 30 and a content body 31 are included. Information of the descriptor 24 and information produced in the receiving terminal apparatus are combined as the service addition information Isa, a package 29 of broadcasting services is prepared from the service addition information Isa and the service content information Isc, and the package 29 is stored in the service information storing unit 4 (or a local disk).

Figure 4:
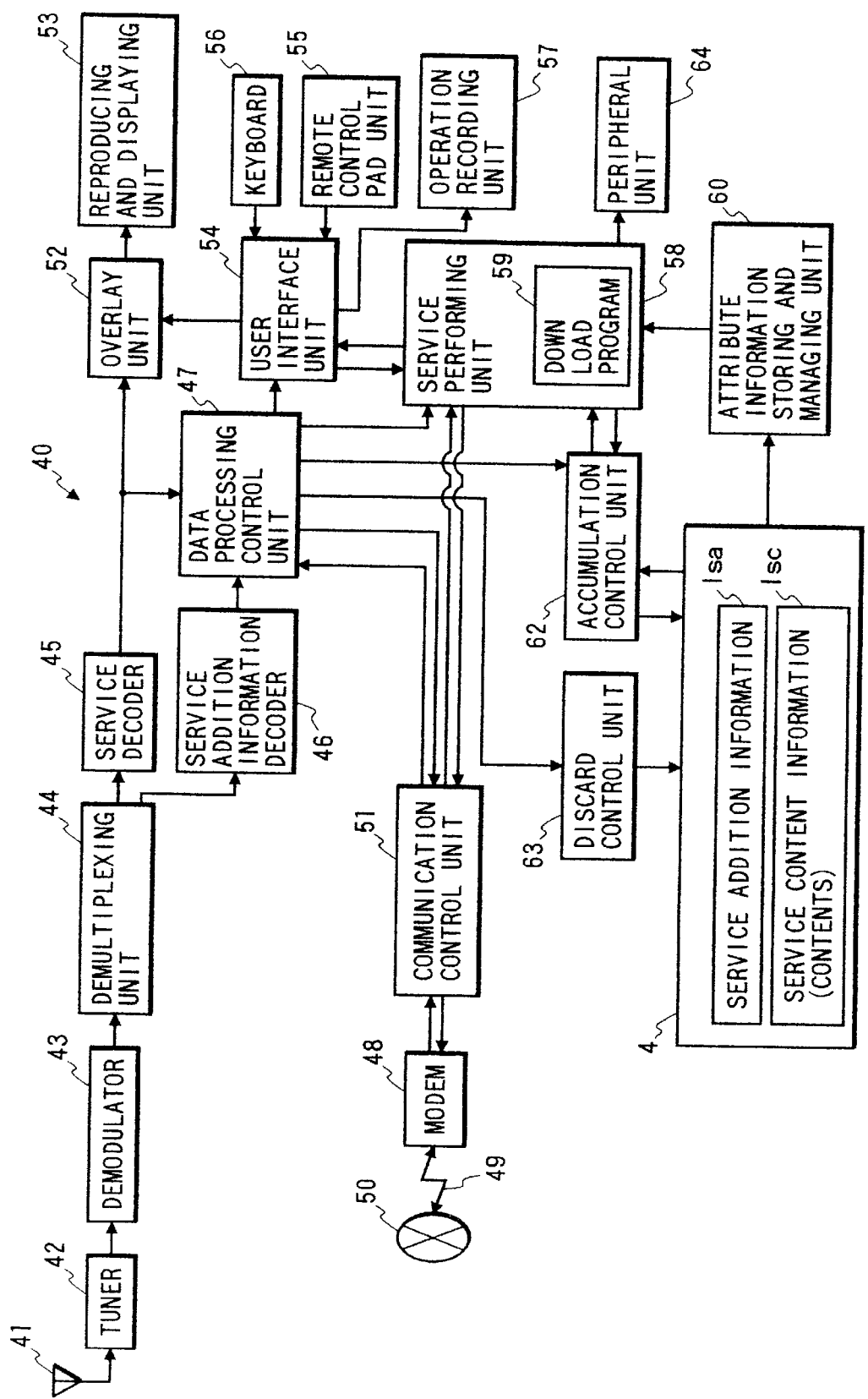
FIG. 4 is a block diagram of a receiving terminal apparatus arranged in a broadcast system according to embodiments of the present invention.

FIG. 4 is a block diagram of a receiving terminal apparatus 40 arranged in a broadcast system according to embodiments of the present invention.

A multimedia accumulation displaying apparatus is, for example, used as the receiving terminal apparatus 40. The receiving terminal apparatus 40 is arranged on a viewer side and mainly functions as a receiving terminal. Also, the receiving terminal apparatus 40 of a viewer functions as a transmitting terminal to transmit broadcasting program viewing records and fixed attributes (such as sex, an age and a living area of the viewer) as personal attribute information when the transmission of the personal attribute information arises.

As shown in FIG. 4, the receiving terminal apparatus 40 utilized by a viewer comprises an antenna 41 for receiving a broadcast, a tuner 42 for detecting a phase of a broadcast wave in synchronization with the broadcast wave, a demodulator 43 for demodulating a modulated signal of the received broadcast wave, a demultiplexing unit 44 for demultiplexing the demodulated signal to a service signal indicating service contents C (or service content information Isc) of a particular broadcasting program and a service addition information signal, a service decoder 45 for decoding the service signal to obtain data of the service contents C of the particular broadcasting program, a service addition information decoder 46 for decoding the service addition information signal to obtain service addition information Isa, a data processing control unit 47 for analyzing and processing the data of the service contents C obtained in the service decoder 45 and the service addition information Isa obtained in the service addition information decoder 46, a modem 48 connected with a communication network 50 through a telecommunication line 49 such as a telephone line, a data line or the like, a communication control unit 51 for controlling a data transmitting operation in which data is transmitted to the communication network 50 and a data receiving operation in which data is received from the communication network 50 and is transmitted to the data processing control unit 47, an overlay unit 52 for overlaying the data of the service contents C of the particular broadcasting program obtained in the service decoder 45, a reproducing and displaying unit 53 for reproducing and displaying the data of the service contents C of the particular broadcasting program while performing an overlay of the data of the service contents C in the overlay unit 52, a user interface unit 54 for processing an instruction command input by a user and performing an editing operation for data display in a reproducing and display operation to perform a user interface function, a remote control pad unit 55, connected with the user interface unit 54, for receiving the instruction command from the user, a keyboard 56, connected with the user interface unit 54, for receiving the instruction command from the user, an operation recording unit 57, connected with the user interface unit 54, for recording an operation performed by the user, the service information storing unit 4 for storing service content information Isc and service addition information Isa, a service performing unit 58 for determining whether or not an operation for receiving the particular broadcasting program, an operation for reproducing the particular broadcasting program or an operation for displaying the particular broadcasting program is performed and performing each of the operations, and an attribute information storing and managing unit 60 for storing and managing pieces of viewer individual attribute information indicating fixed attributes (such as sex, an age and a living area) and a record (or a viewing record) for operations performed by the service performing unit 58.

In the service performing unit 58, a plurality of programs for performing the receiving operation, the reproducing operation and the displaying operation and a download program 59 used to write the service content information Isc and the service addition information Isa in the service information storing unit 4 are arranged. Also, the viewer individual attribute information managed in the attribute information storing and managing unit 60 are collated with attribute information Isa5 of the service addition information Isa stored in the service information storing unit 4 in the service performing unit 58 to judge whether or not the attribute of the particular broadcasting program is suitable to the viewer. Therefore, the service performing unit 58 functions as attribute information collating means.

The receiving terminal apparatus 40 of the viewer further comprises an accumulation control unit 62 for controlling an accumulating operation in which pieces of service content information Isc and pieces of service addition information Isa are accumulated in the service information storing unit 4 and controlling a reading operation in which the service content information Isc and the service addition information Isa are read out from the service information storing unit 4, and a discard control unit 63 for controlling a data discarding operation in which the service content information Isc and the service addition information Isa stored in the service information storing unit 4 are discarded.

The receiving terminal apparatus 40 is connected with a peripheral apparatus 64 to transmit data between the receiving terminal apparatus 40 and the peripheral apparatus 64, so that functions of the receiving terminal apparatus 40 can be enhanced.

Figure 5:
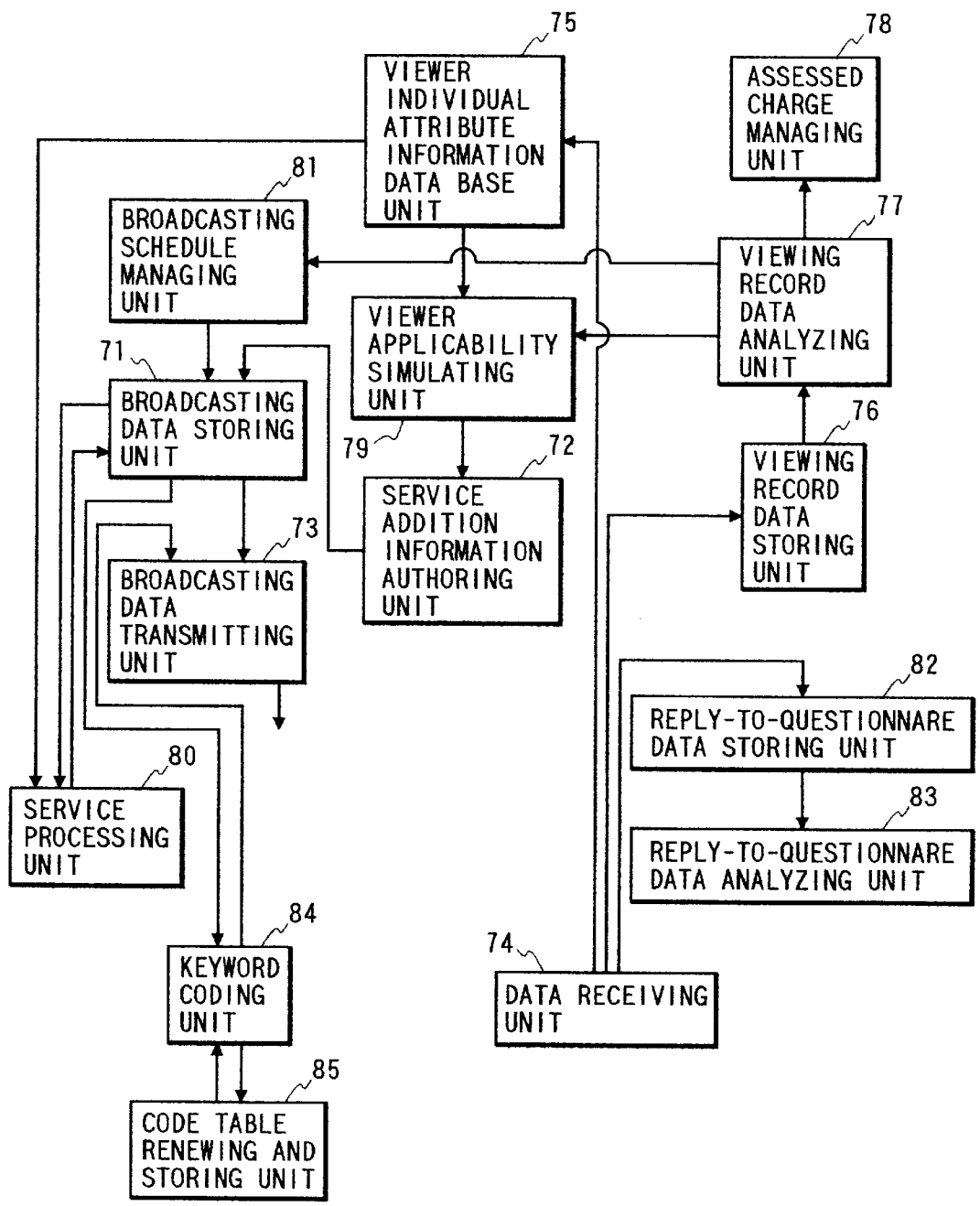
FIG. 5 is a block diagram of a service supply apparatus arranged in the broadcast system according to embodiments of the present invention.

FIG. 5 is a block diagram of a service supply apparatus 70 arranged in the broadcast system according to embodiments of the present invention. The service supply apparatus 70 is arranged in a center station and mainly functions as a transmitting terminal to transmit broadcasting data such as service content information Isc of one broadcasting program and service addition information Isa of the broadcasting program. Also, the service supply apparatus 70 is used as a receiving terminal on the side of the center station to receive the personal attribute information indicating the personal viewing record and the fixed attributes from each of viewers.

As shown in FIG. 5, the service supply apparatus 70 comprises a data receiving and transmitting unit 74 for receiving personal viewing record data indicating the personal viewing record of one viewer and viewer individual attribute information indicating fixed attributes of one viewer from each of the receiving terminal units 40 of the viewers and transmitting data produced in the service supply apparatus 70 to each of the receiving terminal apparatuses 40 of the viewers, a viewer individual attribute information data base unit 75 for holding and managing the viewer individual attribute information, which is extracted from the attribute information storing and managing unit 60 and is received in the data receiving and transmitting unit 74, for each viewer, a viewing record data storing unit 76 for storing viewing record data received in the data receiving and transmitting unit 74 for each viewer, a viewing record data analyzing unit 77 for analyzing the viewing record data stored in the viewing record data storing unit 76, an assessed charge managing unit 78 for managing an assessed charge for the viewing of a pay broadcasting program according to an analyzing result obtained in the viewing record data analyzing unit 77, a viewer applicability simulating unit 79 for preparing provisional viewer condition information indicating a provisional attribute condition required of viewers planned to receive a particular broadcasting program, simulating a viewer applicability of each viewer for the particular broadcasting program by collating the provisional attribute condition with the viewer individual attribute information managed in the viewer individual attribute information data base unit 75 and the analyzing result obtained in the viewing record data analyzing unit 77, specifying provisional viewers on condition that the viewer applicability of each provisional viewer for the particular broadcasting program exceeds a prescribed value such as 60% or 80%, and finally preparing viewer condition information indicating an attribute condition required of particular viewers planned to receive the particular broadcasting program on condition that the viewer applicability of each particular viewer for the particular broadcasting program exceeds the prescribed value and a group of the particular viewers is appropriate for the transmission of the particular broadcasting program, and a broadcasting schedule managing unit 81 for managing a broadcasting schedule of a plurality of broadcasting programs by changing a broadcasting schedule for one or more broadcasting programs according to the analyzing result obtained in the viewing record data analyzing unit 77.

Therefore, in the service supply apparatus 70, because the viewer individual attribute information and the viewing record data for each viewer are received and the viewer applicability is estimated according to the viewer individual attribute information and the viewing record data, the services of the broadcasting programs can be improved, and the broadcasting schedule for the broadcasting programs can be changed.

The service supply apparatus 70 further comprises a service addition information authoring unit 72, functioning as a service addition information preparing means, for preparing service addition information Isa of one particular broadcasting program while adding the viewer condition information prepared in the viewer applicability simulating unit 79 for each particular broadcasting program, a broadcasting data storing unit 71, functioning as a service outputting means, for storing broadcasting data such as the service content information Isc denoting the service contents of one particular broadcasting program transmitted from a broadcasting program supplying unit (not shown) and the service addition information Isa of the particular broadcasting program prepared in the service addition information authoring unit 72, for each particular broadcasting program in a particular order determined according to the broadcasting schedule managed by the broadcasting schedule managing unit 81, and a broadcasting data transmitting unit 73 for transmitting the broadcasting data stored in the broadcasting data storing unit 71 to a plurality of viewers for each particular broadcasting program in the particular order.

Therefore, the service addition information Isa in which information about each particular broadcasting program is written as attribute information is broadcasted from the service supply apparatus 70 with service content information Isc of each particular broadcasting program as the broadcasting data. In this case, each particular broadcasting program is composed of image information, audio information, character information and the like.

The service supply apparatus 70 further comprises a service processing unit 80 for producing overall viewer attribute information for the viewers from the pieces of viewer individual attribute information stored in the viewer individual attribute information data base 75 and selecting a piece of specific service content information of a specific broadcasting program from among the pieces of service content information of the particular broadcasting programs stored in the broadcasting data storing unit 71, on condition that an attribute of the specific service content information of the specific broadcasting program is most suitable to the overall viewer attribute information, so as to transmit the specific service content information of the particular broadcasting program and service addition information indicating the attribute of the specific service content information of the specific broadcasting program from the broadcasting data transmitting unit 73.

a reply-to-questionnaire data storing unit 82 for storing replies to the questionnaire for a plurality of viewers as reply-to-questionnaire data, a reply-to-questionnaire data analyzing unit 83 for analyzing the reply-to-questionnaire data stored in the reply-to-questionnaire data storing unit 82 to obtain a result of the questionnaire.

Therefore, the questionnairing can be performed by using the service supply apparatus 70.

The service supply apparatus 70 further comprises a code table renewing and storing unit 85 for renewing and storing a code table in which a code is allocated to each of a plurality of keywords, and a keyword coding unit 84 for coding a keyword attached to a broadcasting program (or a service) by replacing the keyword with a code corresponding to the keyword according to the code table stored in the code table renewing and storing unit 85.

In the above configuration of a combination of the receiving terminal apparatus 40 and the service supply apparatus 70 arranged in the broadcast system, a plurality of embodiments are described. In this case, the receiving terminal apparatus 40 represents a plurality of receiving terminal apparatuses 40a to 40i used in following embodiments, and the service supply apparatus 70 represents a plurality of service supply apparatuses 70a to 70i used in following embodiments.

(First Embodiment)

Figure 6:
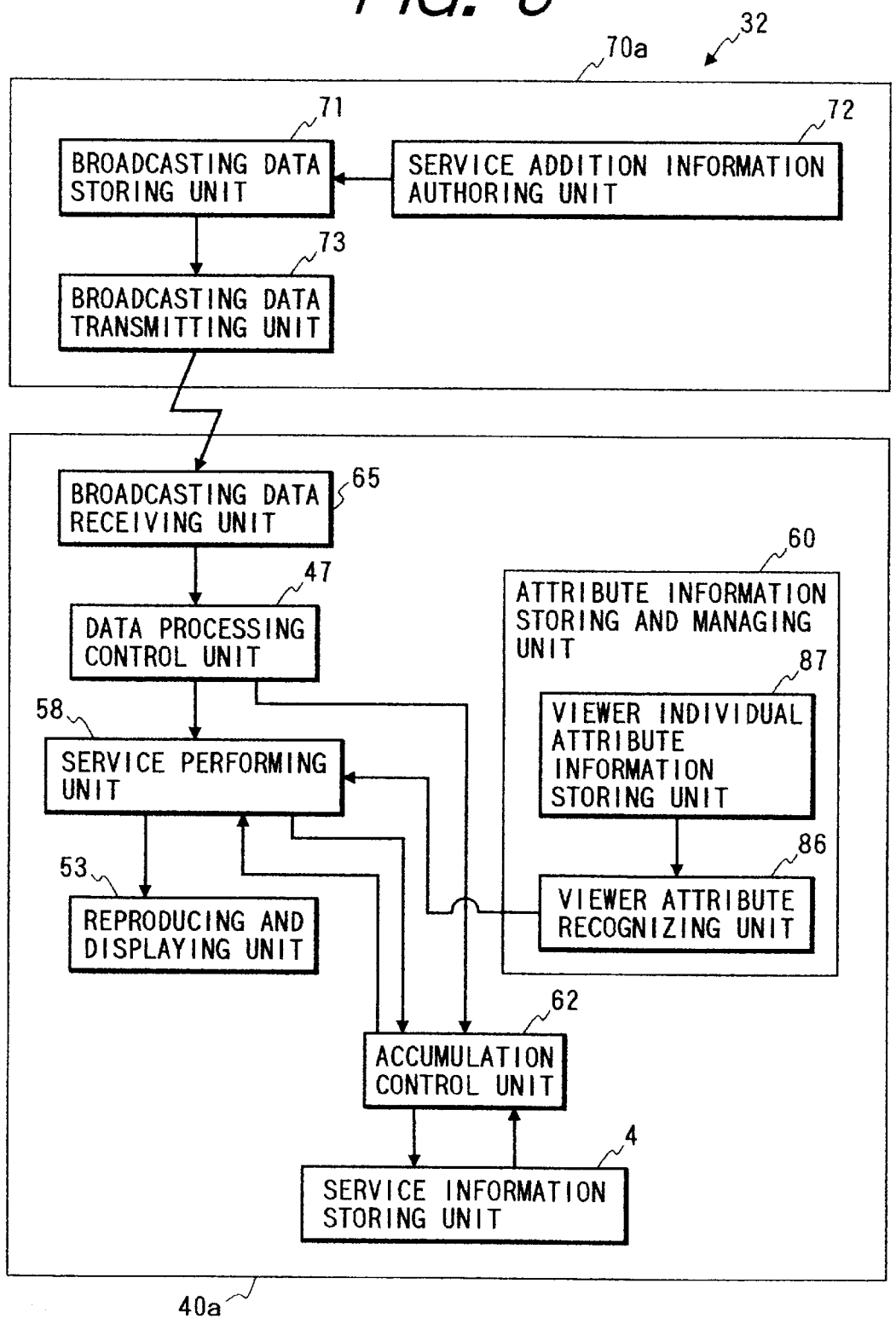
FIG. 6 is a block diagram of a broadcast system according to a first embodiment of the present invention.

FIG. 6 is a block diagram of a broadcast system according to a first embodiment of the present invention.

As shown in FIG. 6, a broadcast system 32 comprises a service supply apparatus 70a and a receiving terminal apparatus 40a. The service supply apparatus 70a comprises the broadcasting data storing unit 71, the service addition information authoring unit 72 and the broadcasting data transmitting unit 73.

Also, the receiving terminal apparatus 40a of a current viewer comprises a broadcasting data receiving unit 65 composed of the antenna 41, the tuner 42, the demodulating unit 43, the demodulating unit 43, the demultiplexing unit 44, the service decoder 45 and the service addition information decoder 46, the data processing control unit 47, the attribute information storing and managing unit 60, the service performing unit 58 for judging whether or not a particular broadcasting program received by the broadcasting data receiving unit 65 as broadcasting data is suitable for the current viewer by collating the attribute information Isa5 of service addition information Isa of the particular broadcasting program with the personal attributes of the current viewer recognized by the attribute information storing and managing unit 60 and performing a service of the particular broadcasting program in cases where it is judged that the particular broadcasting program is suitable for the current viewer, the reproducing and displaying unit 53 for display the particular broadcasting program according to the service of the particular broadcasting program performed by the service performing unit 58, the accumulation control unit 62 and the service information storing unit 4.

The attribute information storing and managing unit 60 comprises a viewer individual attribute information storing unit 87 for storing viewer individual attribute information indicating attributes of the viewer, and a viewer attribute recognizing unit 86 for recognizing personal attributes (for example, a taste and fixed attributes such as sex, an age and a living area) of the current viewer according to the viewer individual attribute information stored in the viewer individual attribute information storing unit 87.

In the above configuration of the broadcast system 32, one particular broadcasting program is composed of both service content information Isc denoting service contents of one particular broadcasting program and service addition information Isa in which features of the service contents of the particular broadcasting program and a relationship between the service contents of the particular broadcasting program and service contents of another broadcasting program relating to the particular broadcasting program are written as attribute information.

The service addition information Isa is prepared in the service addition information authoring unit 72. In this case, examined viewer condition information indicating a particular condition required for viewers is added to the service addition information Isa as attribute information (or condition information) Isa5 because a broadcasting program supplier desires to supply the particular broadcasting program for one or more particular viewers satisfying the particular condition. For example, the examined viewer condition information of the attribute information Isa5 indicates attributes "20s in age", "male", "Tokyo metropolis residents". In this case, the particular broadcasting program is planned to be received by only a group of particular viewers satisfying the personal attributes "20s in age", "male", "Tokyo metropolis residents". However, it is applicable that the examined viewer condition information indicate attributes determined according to service contents of a broadcasting program. For example, the examined viewer condition information indicates "sport competition fan" or "action movie fan".

Thereafter, the service content information Isc and the service addition information Isa are stored in the broadcasting data storing unit 71 as broadcasting data, the service content information Isc is broadcasted from the broadcasting data transmitting unit 73 of the broadcast system 70*a* as broadcasting data of the particular broadcasting program on the image channel broadcast 1, and the service addition information Isa of the particular broadcasting program is broadcasted from the broadcasting data transmitting unit 73 of the broadcast system 70*a* as other broadcasting data of the particular broadcasting program on the data broadcast 2. Thereafter, the service content information Isc and the service addition information Isa are received by the antenna 41 of the receiving terminal apparatus 40*a*. In this case, before the service content information Isc is broadcasted from the broadcasting data transmitting unit 73, the service addition information Isa is prepared in the service addition information authoring unit 72, the service addition information Isa prepared is temporarily stored in the broadcasting data storing unit 71, the service addition information Isa is read out to the broadcasting data transmitting unit 73, and the service addition information Isa is broadcasted from the broadcasting data transmitting unit 73.

In another case, the service content information Isc and the service addition information Isa are superimposed on various digitalized broadcasting programs and are broadcasted with through the same communication path. Also, in another case, the service content information Isc of the broadcasting program is transmitted in analog-broadcasting, and the service addition information Isa is transmitted in digital-broadcasting.

Figure 7:
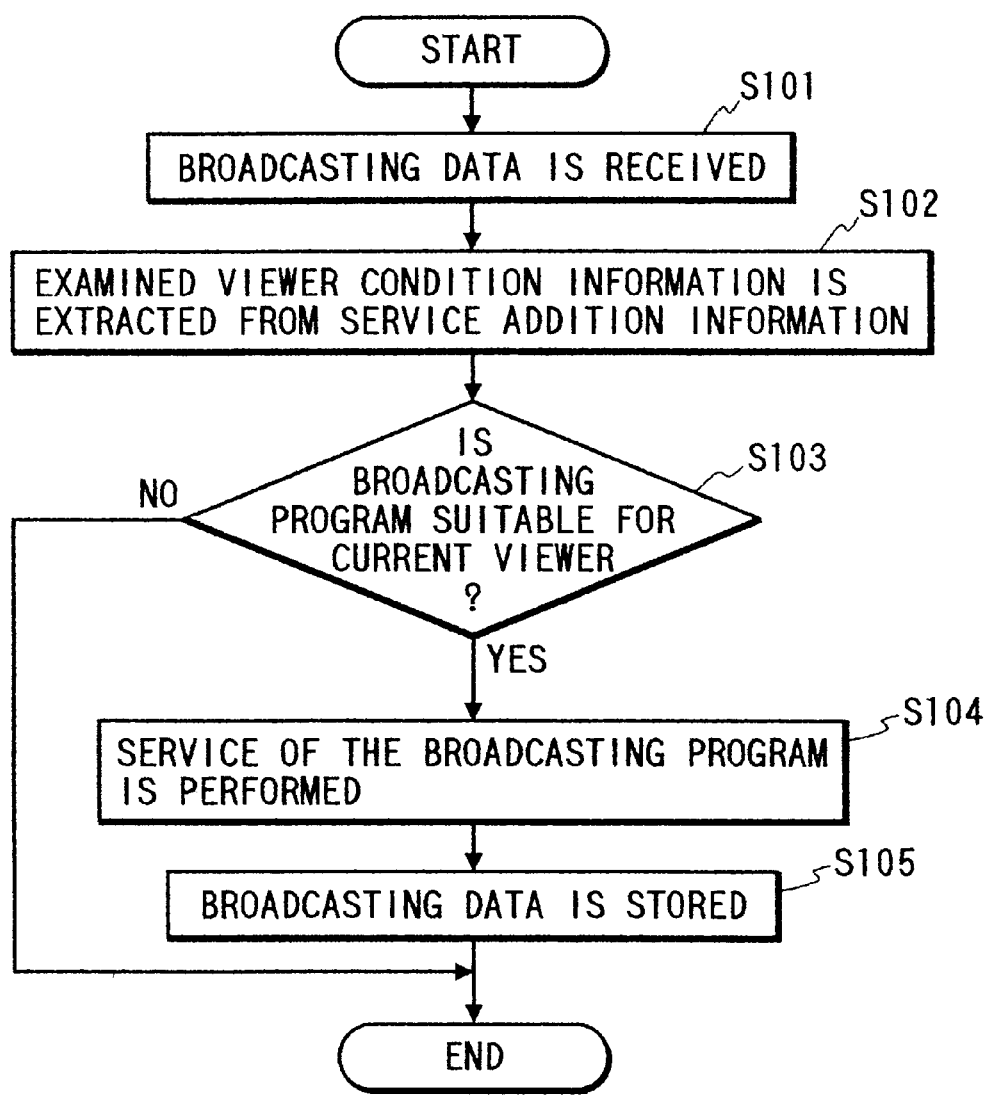
FIG. 7 shows a procedure of a receiving operation performed in a receiving terminal apparatus.

In the receiving terminal apparatus 40*a*, a receiving operation is performed according to a procedure shown in FIG. 7.

As shown in FIG. 7, the broadcasting data composed of the service addition information Isa and the service content information Isc is received in the broadcasting data receiving unit 65 (step 101). Thereafter, the service addition information Isa is separated from the service content information Isc in the data processing control unit 47, and the attribute information Isa5 is transmitted to the service performing unit 58. Also, viewer individual attribute information indicating attributes of the current viewer is read out from the viewer individual attribute information storing unit 87 to the viewer attribute recognizing unit 86. For example, the attributes of the current viewer such as an age of the current viewer, the distinction of sex of the current viewer, a living area of the current viewer, tastes of the current viewer, an occupation of the current viewer, a life style of the viewer and the like are written in the viewer individual attribute information. In the viewer attribute recognizing unit 86, personal attributes (for example, a taste and fixed attributes such as sex, an age and a living area) of the current viewer is recognized according to the viewer individual attribute information.

In the service performing unit 58, the examined viewer condition information indicating the particular condition for viewers is extracted from the service addition information Isa (step 102). Thereafter, an applicability of the current viewer for the particular broadcasting program is calculated by collating the personal attributes of the current viewer with the particular condition indicated by the examined viewer condition information, and it is judged according to the viewer applicability whether or not the particular broadcasting program is suitable for the current viewer (step 103). In cases where the viewer applicability exceeds a prescribed value such as 60% or 80%, it is judged that the personal attributes of the current viewer satisfies the particular condition. Therefore, it is judged that the particular broadcasting program is suitable for the current viewer, and a service of the particular broadcasting program having the service content information Isc is performed by the service performing unit 58 (step 104). That is, the broadcasting program is reproduced and displayed in the reproducing and displaying unit 53 under the control of the service performing unit 58. In contrast, in cases where the viewer applicability does not exceed a prescribed value, it is judged that the particular broadcasting program is not suitable for the current viewer (step 103), and the broadcasting program is not reproduced. Thereafter, the service addition information Isa and the service content information Isc are stored in the service information storing unit 4 as the broadcasting data under the control of the accumulation control unit 62 (step 105).

In this embodiment, the service contents of the broadcasting program transmitted from the service supply apparatus 32 are immediately reproduced and displayed in cases where it is judged by the service performing unit 58 that the particular broadcasting program is suitable for the current viewer. However, it is not necessarily required to immediately display the service contents of the particular broadcasting program. That is, after the step 101, the service content information Isc and the service addition information Isa of the particular broadcasting program are temporarily stored in the service information storing unit 4 under the control of the accumulation control unit 62. Thereafter, when the viewer desires to reproduce the service content information Isc of the particular broadcasting program, an instruction is input to the keyboard 56 or the remote control pad unit 55 by the viewer, and the service content information Isc and the service addition information Isa are read out from the service information storing unit 4 to the data processing control unit 47. Thereafter, the steps 102, 103 and 104 are performed in the same manner.

Accordingly, even though the service contents of a plurality of broadcasting programs are respectively transmitted from the service supply apparatus 70a to a large number of receiving terminal apparatuses 40a of a plurality of viewers, because it is judged in each of the receiving terminal apparatuses 40a whether or not the service contents of each broadcasting program is suitable for each of the viewers recognized by the personal attributes, each of the viewers can always reproduce the service contents of specific broadcasting programs suitable to the viewer.

(Second Embodiment)

In a broadcast system according to a second embodiment, one or more keywords are attached to service content information Isc of each broadcasting program denoting service contents of the broadcasting program as service addition information Isa to identify a type (or attribute) of each broadcasting program.

In cases where the number of broadcasting programs planned to be transmitted from a broadcasting program supplying unit (not shown) is larger than the number of image channels, pieces of viewer individual attribute information of all viewers are transmitted from a plurality of receiving terminal apparatuses of the viewers to a service supply apparatus, a plurality of particular broadcasting programs suitable for the viewers are selected from among the broadcasting programs according to the pieces of viewer individual attribute information on condition that the number of particular broadcasting programs is equal to the number of image channels, and service content information Isc of each particular broadcasting program is transmitted to the receiving terminal apparatuses with service addition information Isa of the corresponding particular broadcasting program. The number of image channels denotes the number of images displayed on the same image plane. Therefore, the number of image channels is normally one. However, in cases where the image plane is partitioned into a plurality of image displaying regions, there are a plurality of image channels. and a plurality of particular broadcasting programs are simultaneously displayed in the image displaying regions of one image plane. Hereinafter, the selection of a particular broadcasting program, the transmission of the particular broadcasting program and the reproduction of the particular broadcasting program are described on condition that the number of image channels is one.

Figure 8:
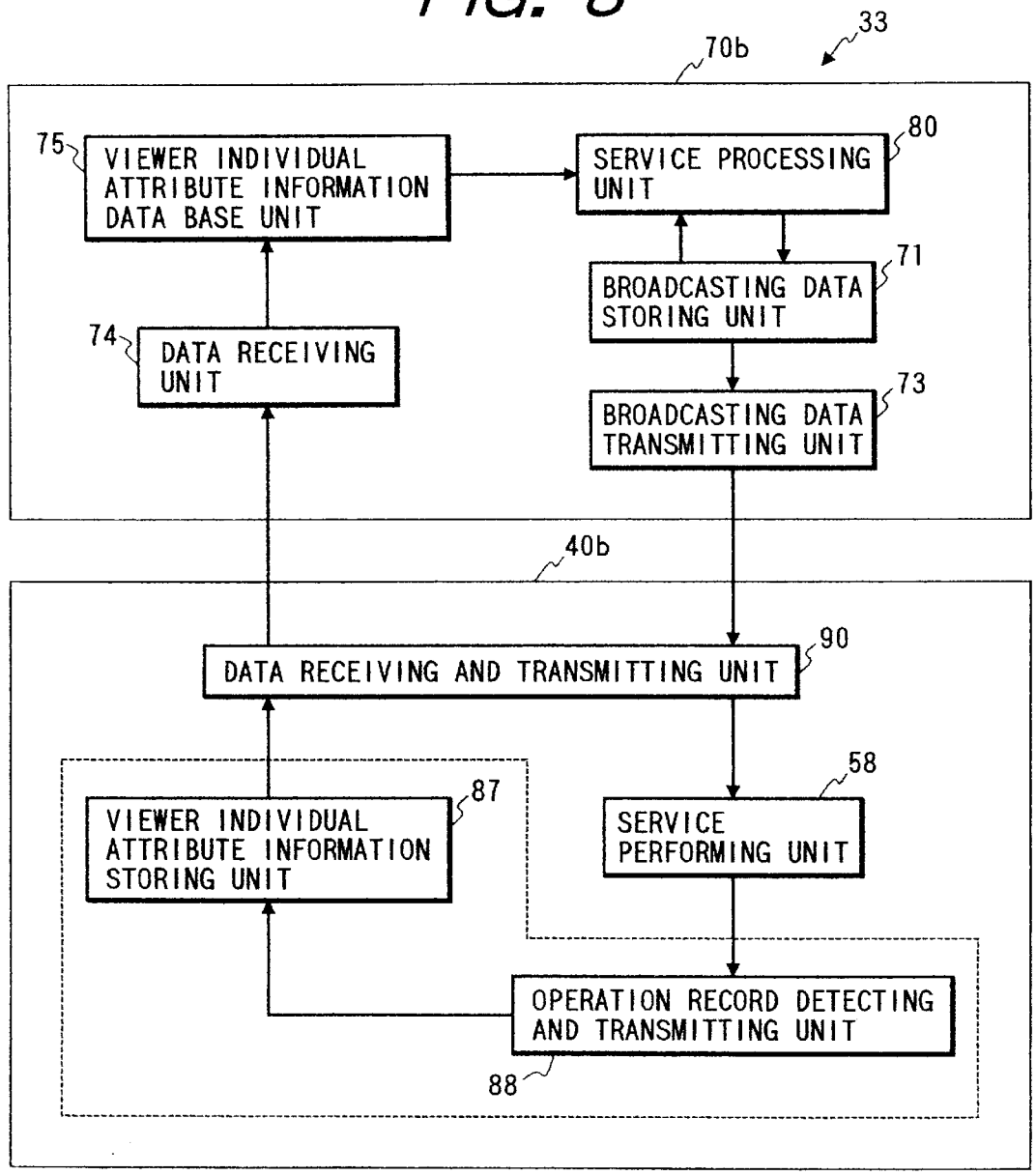
FIG. 8 is a block diagram of a broadcast system according to a second embodiment of the present invention.

FIG. 8 is a block diagram of a broadcast system according to a second embodiment of the present invention.

As shown in FIG. 8, a broadcast system 33 comprises a service supply apparatus 70b and a receiving terminal apparatus 40b.

The receiving terminal apparatus 40b utilized by a current viewer comprises a data receiving and transmitting unit 90 for receiving broadcasting data composed of service addition information Isa of a particular broadcasting program and service content information Isc of the particular broadcasting program from the service supply apparatus 70b and transmitting viewer individual attribute information to the service supply apparatus 70b, the data processing control unit 47 for analyzing the broadcasting data received by the data receiving and transmitting unit 90 and separating the service addition information Isa from the broadcasting data, the service information storing unit 4 for storing the service addition information Isa and the service content information Isc, the attribute information storing and managing unit 60, and the service performing unit 58 for performing a service of the particular broadcasting program stored in the service information storing unit 4.

The attribute information storing and managing unit 60 comprises the viewer individual attribute information storing unit 87 for storing viewer individual attribute information in which a set of a keyword attached to service content information Isa of one broadcasting program and a using number for the keyword is listed for each keyword, and an operation record detecting and transmitting unit 88 for detecting the service of the particular broadcasting program performed in the service performing unit 58 as an operation record and transmitting the operation record to the viewer individual attribute information storing unit 87 to increment the using number for each of keywords attached to the service content information Isa of the particular broadcasting program in the viewer individual attribute information storing unit 87.

The using number for one keyword indicates how many times the current viewer views one type of broadcasting program, to which the keyword is attached, under the control of the service performing unit 58, and pieces of viewer individual attribute information for all keywords are filed in a list in the viewer individual attribute information storing unit 87.

The service supply apparatus 70b comprises the data receiving unit 74 for receiving pieces of viewer individual attribute information for all keywords from each of receiving terminal apparatuses of viewers, the viewer individual attribute information data base unit 75 for holding and managing a list of pieces of viewer individual attribute information for all keywords transmitted from the viewer individual attribute information storing unit 87 for each viewer, the service processing unit 80 for summing up pieces of viewer individual attribute information for all keywords and all viewers managed by the viewer individual attribute information data base unit 75 to prepare a list of pieces of overall viewer attribute information for all keywords, and selecting the particular broadcasting program most suitable to all viewers according to the list of the overall viewer attribute information for all keywords from among a plurality of broadcasting programs planned to be transmitted to all viewers, the broadcasting data storing unit 71 for storing service addition information Isa and service content information Isc of the particular broadcasting program selected by the service processing unit 80, and the broadcasting data transmitting unit 73 for transmitting broadcasting data composed of the service addition information Isa of the particular broadcasting program and service content information Isc of the particular broadcasting program.

The data receiving and transmitting unit 90 comprises the modem 48 and the communication control unit 51 functioning as a viewer individual attribute information transmitting means. Also, the data receiving and transmitting unit 90 further comprises the antenna 41, the tuner 42, the demodulating unit 43, the demodulating unit 43, the demultiplexing unit 44, the service decoder 45 and the service addition information decoder 46 functioning as a broadcasting data receiving means. Therefore, the data receiving and transmitting unit 90 performs a two-way communication.

In the above configuration of the broadcast system 33, a broadcasting program selecting operation is described with reference to FIGS. 9 and 10 on condition that the number of a plurality of broadcasting programs transmitted from a broadcasting program supplying unit (not shown) is larger than the number of image channels.

Figure 9:
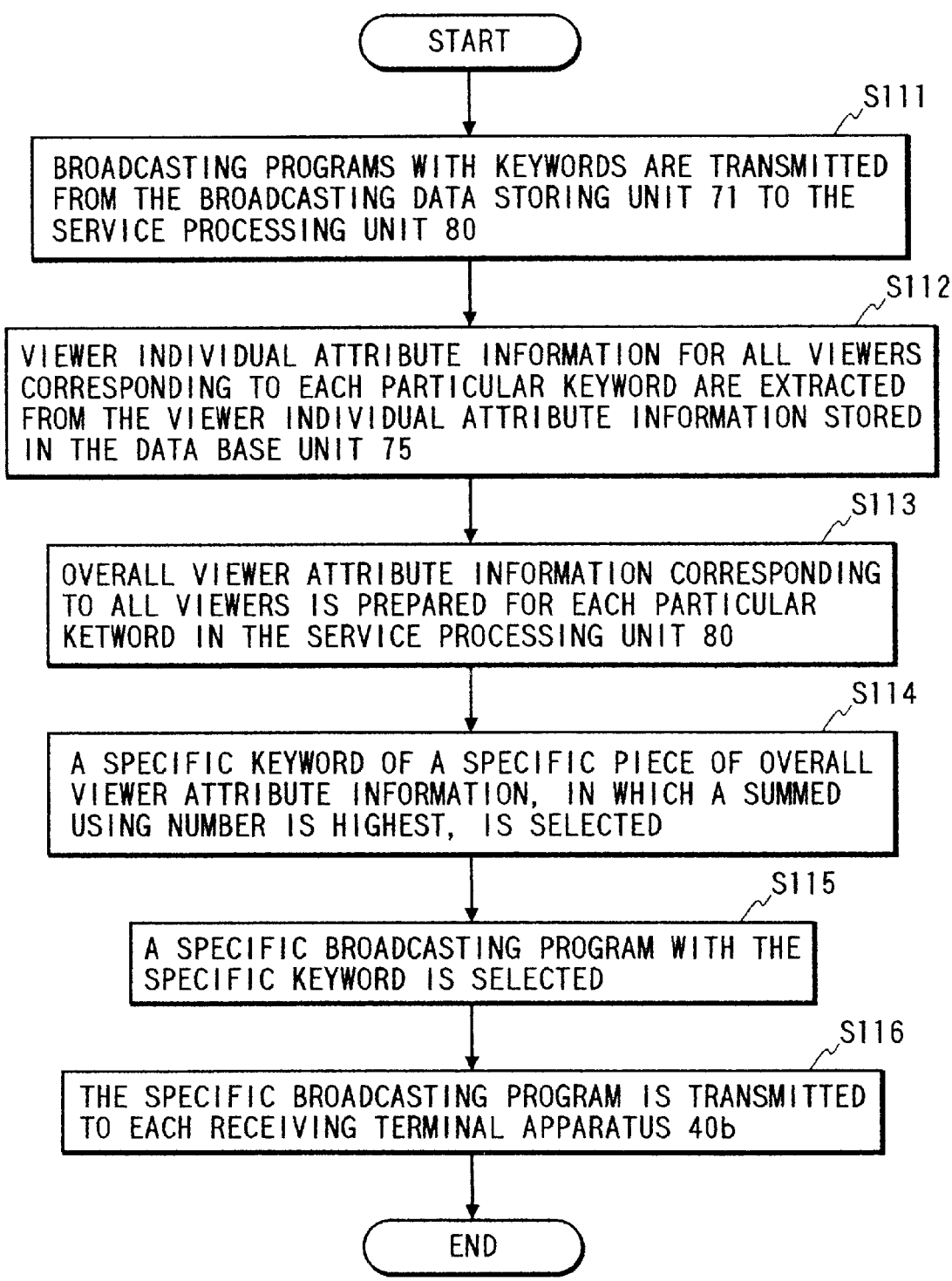
FIG. 9 is a flow chart showing a broadcasting program selecting operation performed according to the second embodiment.

FIG. 9 is a flow chart showing a broadcasting program selecting operation performed according to the second embodiment, and FIG. 10 is an explanatory view of a service selecting operation performed on condition that four services (or four broadcasting programs) are supplied and only one image channel is used.

When a broadcasting program selecting operation is started, a plurality of broadcasting programs respectively having a particular keyword are transmitted from the broadcasting data storing unit 71 to the service processing unit 80 (step 111). A keyword attached to one broadcasting program indicates a type of the broadcasting program. For example, as shown in FIG. 10, a first live broadcasting programs of a soccer game having a keyword of "soccer", a second live broadcasting programs of a golf competition having a keyword of "golf", a third live broadcasting programs of an F1 car racing having a keyword of "F1" and a fourth live broadcasting programs of a baseball game having a keyword of "baseball" are simultaneously transmitted to the service processing unit 80 in a supplying condition of the spot broadcasting.

Thereafter, the viewer individual attribute information data base unit 75, in which a list of pieces of viewer individual attribute information for all viewers transmitted from the viewer individual attribute information storing unit 87 is held and managed, is searched for a piece of viewer individual attribute information corresponding to each of the particular keywords attached to the broadcasting programs, and pieces of viewer individual attribute information for all viewers corresponding to one particular keyword are extracted for each particular keyword by the service processing unit 80 (step 112).

Thereafter, in the service processing unit 80, a summed using number for one particular keyword indicating how many times one type of broadcasting program with the particular keyword is viewed by the viewers is calculated for each particular keyword by summing up the using numbers of the pieces of viewer individual attribute information of all viewers for each particular keyword, a pieces of overall viewer attribute information corresponding to all viewers is prepared for each particular keyword, and a list of pieces of overall viewer attribute information for all viewers corresponding to the particular keywords is prepared by the service processing unit 80 (step 113). Each piece of overall viewer attribute information for all viewers corresponding to one particular keyword is composed of the particular keyword and a summed using number indicating how many times one type of broadcasting program with the particular keyword is viewed by the viewers. For example, as shown in FIG. 10, a list 91 of pieces of overall viewer attribute information for all viewers corresponding to the keywords "soccer", "golf", "F1" and "baseball" is prepared in the service processing unit 80.

Thereafter, a specific keyword of a specific piece of overall viewer attribute information, in which a summed using number for the specific keyword is highest among those for other keywords in the pieces of overall viewer attribute information is selected (step 114). For example, as shown in FIG. 10, the summed using number of 12479 for the keyword "baseball" is highest in the list 91 of overall viewer attribute information. Thereafter, a specific broadcasting program with the specific keyword is selected from among the plurality of broadcasting programs in the service processing unit 80 (step 115). For example, because the keyword "baseball" is attached to a baseball game, the fourth live broadcasting program of the baseball game is selected.

Thereafter, the specific broadcasting program is transmitted as the particular broadcasting program from the broadcasting data transmitting unit 73 to the receiving terminal apparatus 40b of each viewer (step 116).

In the receiving terminal apparatus 40b, the particular broadcasting program is received in the data receiving and transmitting unit 90 and is stored in the service information storing unit 4 through the data processing control unit 47. Thereafter, when a current viewer desires to view the particular broadcasting program, the particular broadcasting program is read out from the service information storing unit 4 and is reproduced and displayed in the reproducing and displaying unit 53 under the control of the service performing unit 58. This reproduction of the particular broadcasting program is detected by the operation record detecting and transmitting unit 88 as an operation record, and the operation record for the particular broadcasting program is transmitted to the viewer individual attribute information storing unit 87. In the viewer individual attribute information storing unit 87, a set of one keyword and one using number for the keyword is listed for each keyword as viewer individual attribute information, and each using number for one keyword indicates how many times the viewer views one type of broadcasting program to which the keyword is attached. When the operation record for the particular broadcasting program is received, the using number for each of keywords attached to service content information Isa of the particular broadcasting program is incremented. For example, as shown in FIG. 10, a list 92 of pieces of viewer individual attribute information for the keywords "soccer", "golf", "F1" and "baseball" is stored in the viewer individual attribute information storing unit 87 for each viewer. The list 92 of viewer individual attribute information is renewed each time one operation record is received. When the transmission of the list 92 of viewer individual attribute information is desired by the service supply apparatus 70b, the list 92 of viewer individual attribute information is transmitted from the data receiving and transmitting unit 90 of each viewer to the data receiving unit 74 of the service supply apparatus 70b, and the list 92 of viewer individual attribute information for each viewer is received by the viewer individual attribute information data base unit 75. Therefore, a plurality of lists 92 of viewer individual attribute information for all viewers are stored in the viewer individual attribute information data base unit 75.

Next, a ranking broadcasting program broadcasting operation, in which data of a ranking broadcasting program (or a ranking service) is prepared in the service supply apparatus 70b and is broadcasted to each of the viewers, is described with reference to FIGS. 11 and 12.

Figure 11:
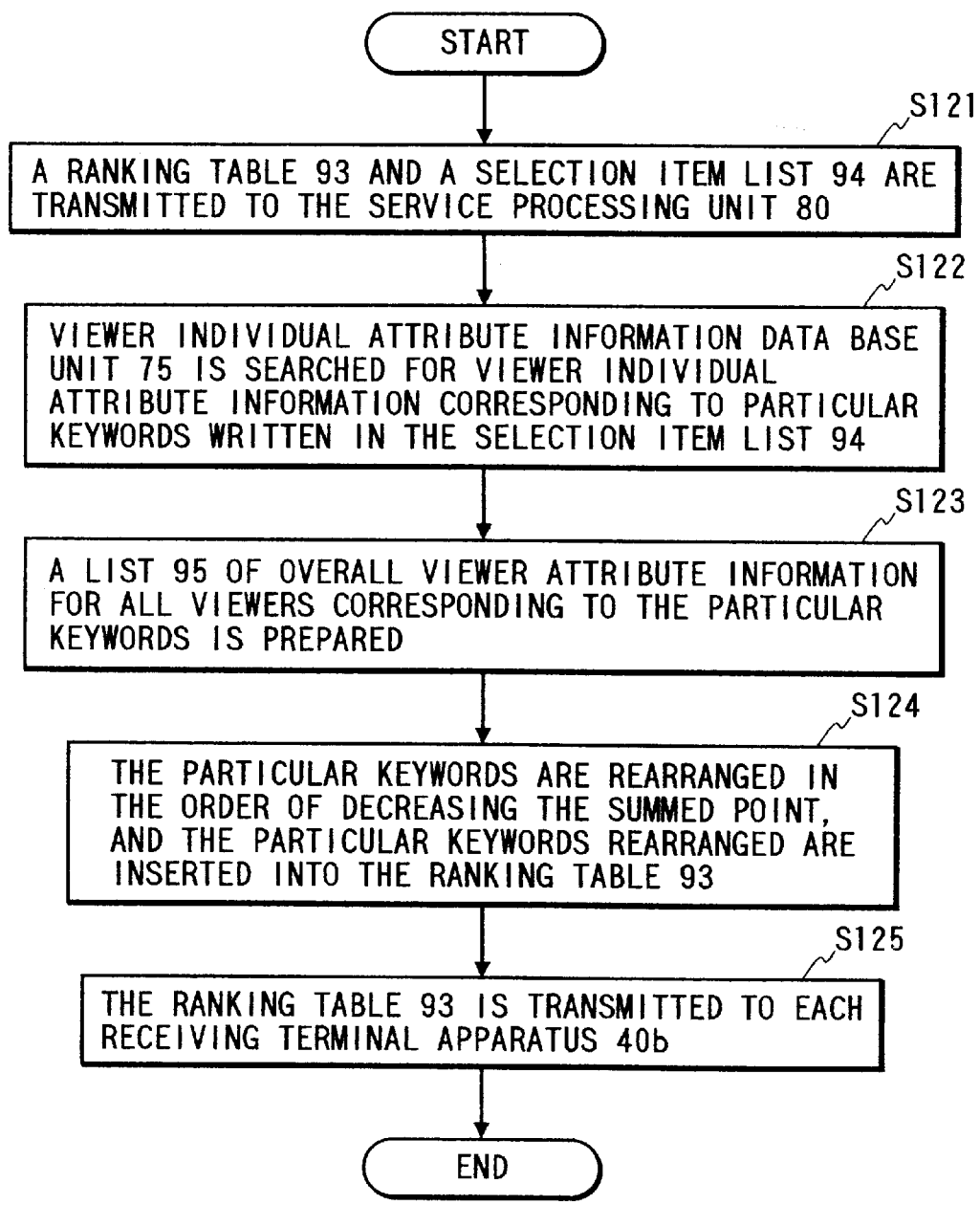
FIG. 11 is a flow chart showing a ranking broadcasting program broadcasting operation performed according to the second embodiment.
Figure 12:
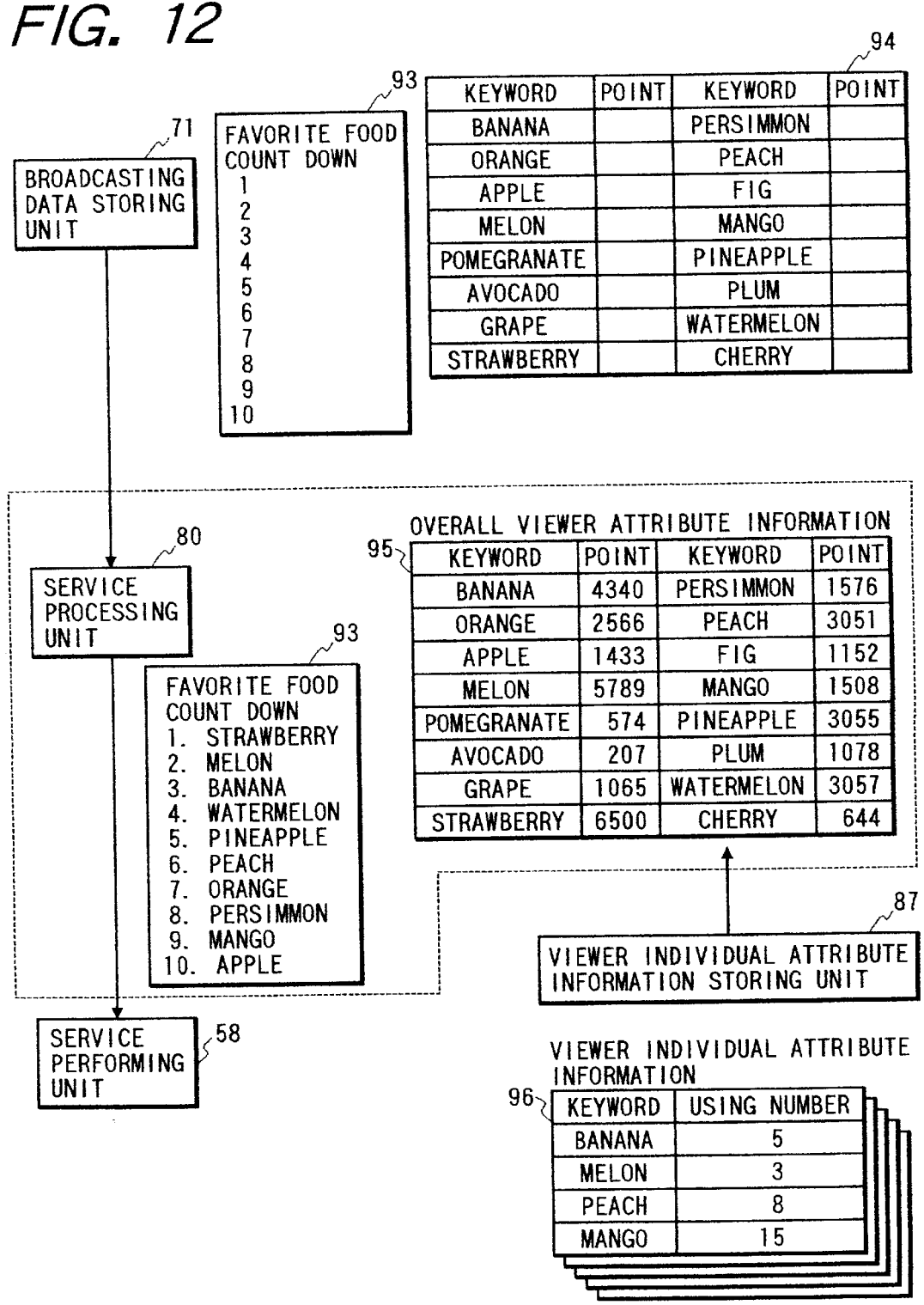
FIG. 12 is an explanatory view of a ranking broadcasting program broadcasting operation in which a ranking broadcasting program (or a ranking service) named "favorite food count down" is prepared.

FIG. 11 is a flow chart showing a ranking broadcasting program broadcasting operation performed according to the second embodiment, and FIG. 12 is an explanatory view of the ranking broadcasting program broadcasting operation in which a ranking broadcasting program (or a ranking service) named "favorite food count down" is prepared.

As shown in FIGS. 11 and 12, a ranking table 93 named "favorite food count down" and a selection item list 94 of particular keywords indicating foods are transmitted from the broadcasting data storing unit 71 to the service processing unit 80 (step 121). The ranking table 93 has a blank space. Thereafter, the viewer individual attribute information data base unit 75, in which a list of pieces of viewer individual attribute information for all viewers transmitted from the viewer individual attribute information storing unit 87 is held and managed, is searched for pieces of viewer individual attribute information corresponding to the particular keywords written in the selection item list 94 for each viewer (step 122), the using numbers of the pieces of viewer individual attribute information for all viewers corresponding to one particular keyword are summed up to calculate a summed point for each particular keyword, and a list 95 of pieces of overall viewer attribute information for all viewers corresponding to the particular keywords is prepared by the service processing unit 80 (step 123). Each piece of overall viewer attribute information for all viewers corresponding to one particular keyword is composed of the particular keyword and one summed point indicating how many times one type of broadcasting program with the particular keyword is viewed by the viewers.

Thereafter, the particular keywords are rearranged in the order of decreasing the summed point, and the particular keywords rearranged are inserted into the ranking table 93 by the service processing unit 80 (step 124). Thereafter, the ranking table 93, in which names of foods indicated by the particular keywords are written in the order of decreasing the summed point, is transmitted from the data receiving and transmitting unit 74 to the receiving terminal apparatus 40*b* of each viewer as a ranking broadcasting program (step 125).

In the receiving terminal apparatus 40*b*, the ranking broadcasting program with the ranking table 93 is received in the data receiving and transmitting unit 90 and is stored in the service information storing unit 4 through the service performing unit 58 and the accumulation control unit 62. Thereafter, when a viewer desires to view the ranking table 93, the ranking broadcasting program with the ranking table 93 is read out from the service information storing unit 4 and is reproduced and displayed in the reproducing and displaying unit 53 under the control of the service performing unit 58. Thereafter, the viewer selects a particular food from the foods listed in the ranking table 93. This selecting result is accumulated to the viewer individual attribute information storing unit 87. In the viewer individual attribute information storing unit 87, a list 96 of pieces of viewer individual attribute information for a plurality of keywords is stored, and a using number for a keyword relating to the selected food is incremented. The list 96 of viewer individual attribute information is transmitted from the data receiving and transmitting unit 90 of each viewer to the data receiving unit 74 of the service supply apparatus 70*b* when the transmission of the list 96 of viewer individual attribute information is desired by the service supply apparatus 70*b*, and the list 96 of viewer individual attribute information is stored in the viewer individual attribute information data base unit 75 for each viewer.

(Third Embodiment)

In this embodiment, a keyword which is attached to a name of a broadcasting program and indicate an attribute of the broadcasting program is coded in a service supply apparatus, and a coded keyword is transmitted from the service supply apparatus to each of a plurality of receiving terminal apparatuses as service addition information Isa of the broadcasting program.

Figure 13:
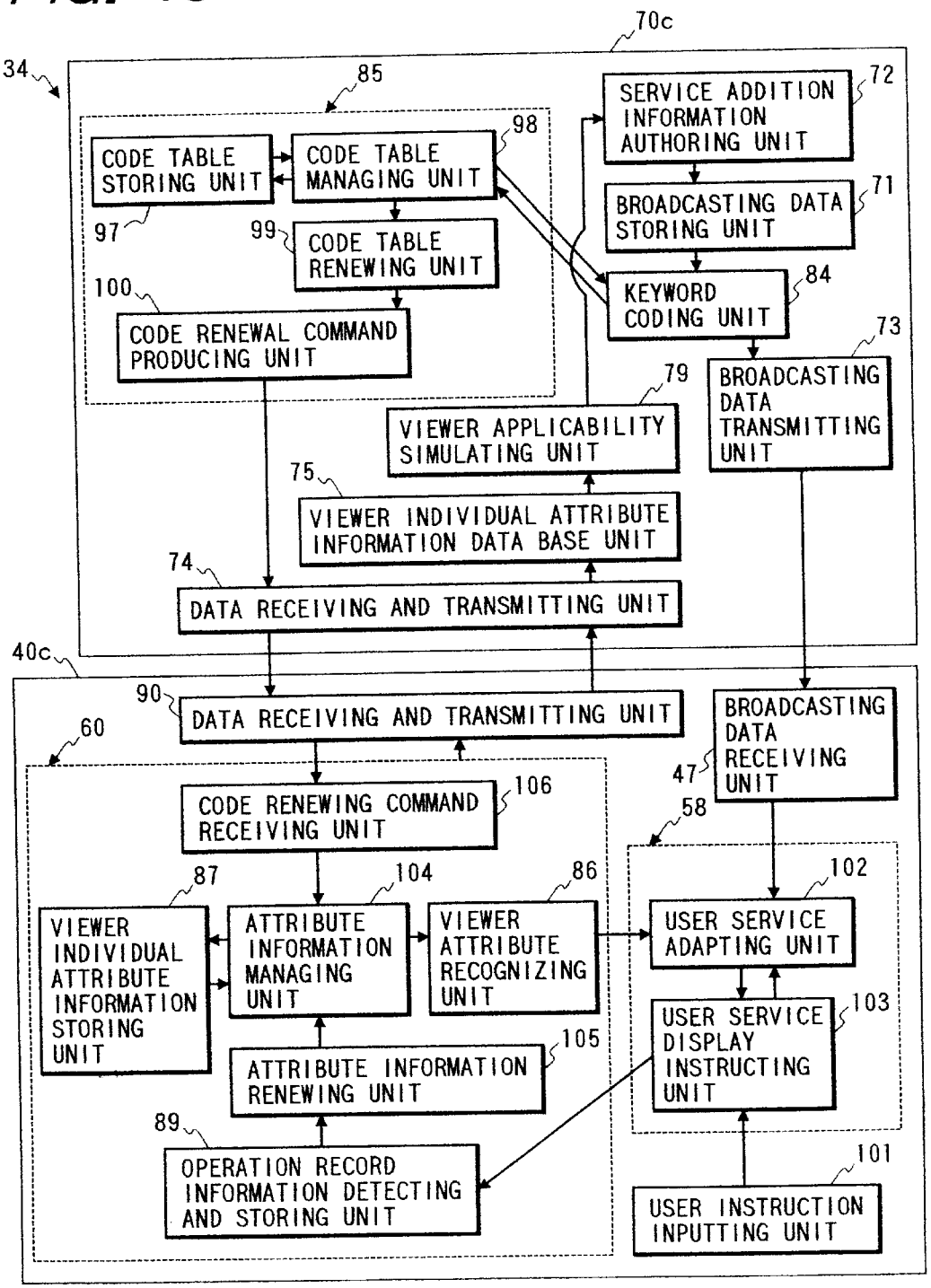
FIG. 13 is a block diagram of a broadcast system according to a third embodiment of the present invention.

FIG. 13 is a block diagram of a broadcast system according to a third embodiment of the present invention.

As shown in FIG. 13, a broadcast system 34 comprises a service supply apparatus 70*c* and a plurality of receiving terminal apparatuses 40*c*.

The service supply apparatus 70*c* comprises
the viewer individual attribute information data base unit 75, the viewer applicability simulation unit 79, the service addition information authoring unit 72,
the broadcasting data storing unit 71, functioning as a service outputting means, for storing service content information Isc of each particular broadcasting program and a broadcasting program name list in which a set of a broadcasting program name of one particular broadcasting program and one or more keywords corresponding to the broadcasting program name is listed for each channel,
the code table renewing and storing unit 85 for renewing and storing a code table in which a set of a keyword, a binary character code (or a coded keyword) corresponding to the keyword and a using number indicating how many times one type of broadcasting program identified by the keyword is viewed by the viewers are listed for each keyword,
the keyword coding unit 84 for coding one keyword corresponding to each broadcasting program name of the broadcasting program name list by replacing the keyword with a coded keyword corresponding to the keyword according to the code table and preparing a coded broadcasting program name list,
the broadcasting data transmitting unit 73 for transmitting service content information Isc of each particular broadcasting program and the coded broadcasting program name list in which a set of one broadcasting program name of one particular broadcasting program and the coded keyword indicating an attribute of the particular broadcasting program is listed as service addition information Isa of the particular broadcasting program for each particular broadcasting program, and
the data receiving and transmitting unit 74 for transmitting a code renewal command generated in the code table renewing and storing unit 85 to each receiving terminal apparatus 40*c*.

The code table renewing and storing unit 85 comprises
a code table storing unit 97 for storing data of the code table,
a code table managing unit 98 for managing the code table stored in the code table storing unit 97 to renew the code table or read out a binary character code of the code table to the keyword coding unit 84,
a code table renewing unit 99 for renewing the data of the code table managed by the code table managing unit 98, and
a code renewal command producing unit 100 for producing a code renewal command such as a code deleting command when the data of the code table is renewed by the code table renewing unit 99.

Each receiving terminal apparatus 40*c* utilized by a user (or a viewer) comprises
the broadcasting data receiving unit 65 for receiving the service content information Isc of each particular broadcasting program and the coded broadcasting program name list prepared in the keyword coding unit 84 and transmitting viewer individual attribute information stored in the attribute information storing and managing unit 60 to the viewer individual attribute information data base unit 75 of the service supply apparatus 70*c*,
the data processing control unit 47,
the service performing unit 58 for initially performing services of the particular broadcasting programs to display the broadcasting program names listed in the coded broadcasting program name list in the reproducing and displaying unit 53, a user instruction inputting unit 101, denoting the remote control pad 55 or the keyboard 56, for receiving an instruction input by a user (or a viewer) to display one particular broadcasting program by selecting the name of the particular broadcasting program from the broadcasting program names displayed under the control of the service performing unit 58, and the attribute information storing and managing unit 60.

The service performing unit 58 comprises a user service adapting unit 102 for estimating an applicability of the user for each particular broadcasting program according to the personal attributes of the user obtained in the attribute information storing and managing unit 60 and judging according to the applicability whether or not the service of each particular broadcasting program is performed, and a user service display instructing unit 103 for initially instructing the reproducing and displaying unit 53 to display the broadcasting program names listed in the coded broadcasting program name list and instructing the reproducing and displaying unit 53 to display one particular broadcasting program judged to perform the service by the user service adapting unit 102.

The attribute information storing and managing unit 60 comprises the viewer individual attribute information storing unit 87 for storing a set of one coded keyword attached to the name of the selected broadcasting program and one using number for the coded keyword for each coded keyword as viewer individual attribute information, an operation record information detecting and storing unit 89 for detecting the reproduction of the particular broadcasting program performed by the user under the control of the user service display instructing unit 103 as operation record information and accumulating pieces of operation record information, an attribute information renewing unit 105 for renewing the viewer individual attribute information stored in the viewer individual attribute information storing unit 87 according to the operation record information stored in the operation record detecting and storing unit 89 so as to increment the using number for each of coded keywords corresponding to the operation records in the viewer individual attribute information storing unit 87, a code renewing command receiving unit 106 for receiving the code renewing command transmitted from the code renewal command producing unit 100 when the data of the code table is renewed in the service supply apparatus 70c, an attribute information managing unit 104 for managing the viewer individual attribute information stored in the viewer individual attribute information storing unit 87 to renew the viewer individual attribute information according to the code renewing command received by the code renewing command receiving unit 106, and the viewer attribute recognizing unit 86 for recognizing personal attributes of the user according to the viewer individual attribute information stored in the viewer individual attribute information storing unit 87.

The code renewing command receiving unit 106 is connected with the data receiving and transmitting unit 90 composed of the modem 48 and the communication control unit 51.

In the above configuration of the broadcast system 34, an operation relating to a code conversion is described with reference to FIG. 14.

Figure 14:
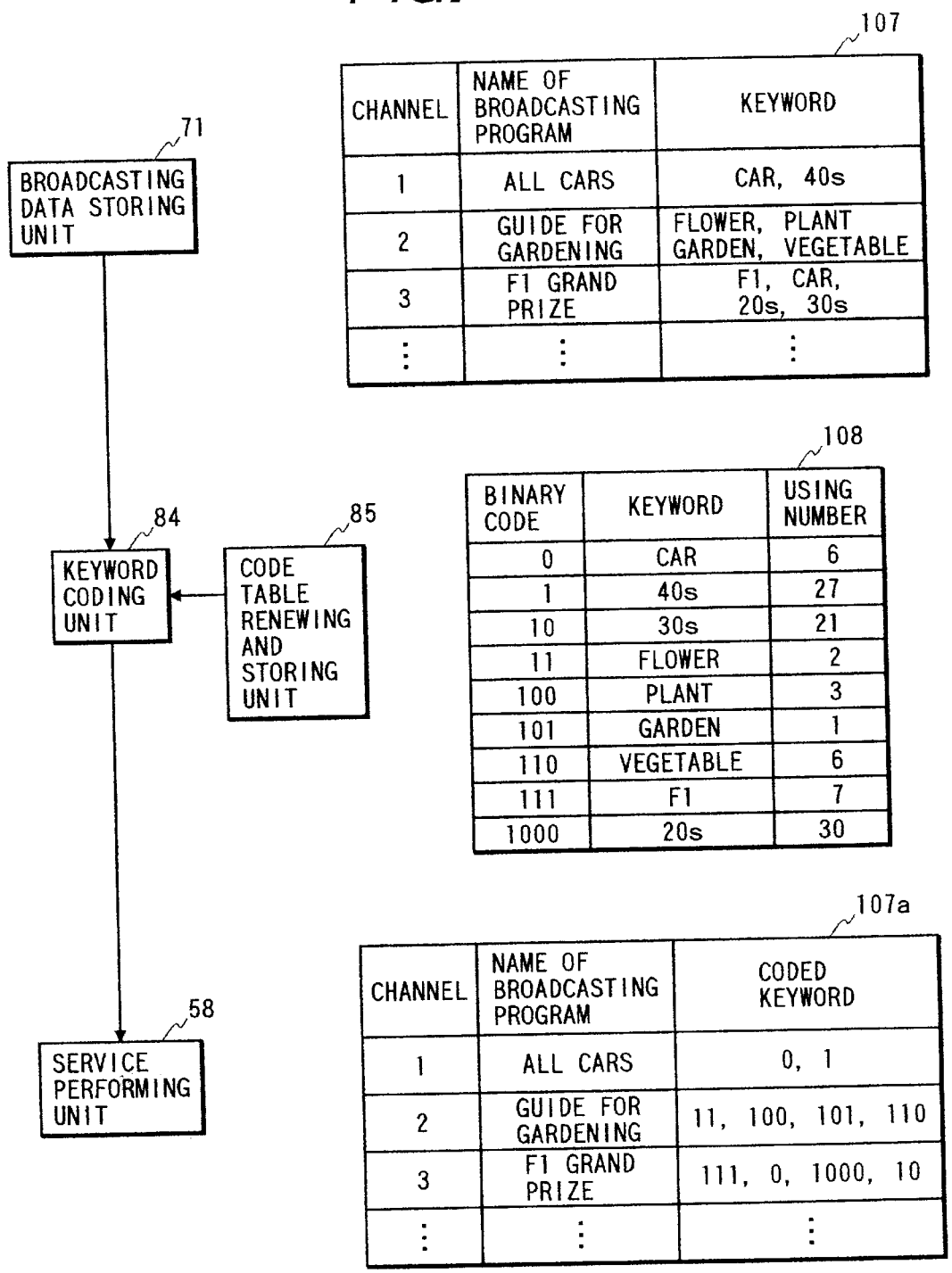
FIG. 14 is an explanatory view of an operation in which a keyword attached to each of names of broadcasting programs is coded in a service supply apparatus shown in FIG. 13.

FIG. 14 is an explanatory view of an operation in which a keyword attached to each of names of broadcasting programs is coded in the service supply apparatus 70c.

As shown in FIG. 14, a list 107 of names of broadcasting programs, in which one or more keywords are attached to each of the names of the broadcasting programs, is stored in the broadcasting data storing unit 71. Also, a code table 108, in which a plurality of binary character codes respectively corresponding to one of a plurality of keywords are listed and a using number is written for each keyword, is stored in the code table storing unit 97. Each using number for one keyword denotes how many times the keyword is coded. When the broadcasting program list 107 is transmitted to the keyword coding unit 84, a plurality of binary character codes corresponding to the keywords listed in the broadcasting program list 107 are extracted from the code table 108 under the control of the code table managing unit 98, and the plurality of binary character codes corresponding to the keywords are transmitted to the keyword coding unit 84. That is, when the keyword coding unit 84 requests the code table renewing and storing unit 85 to transmit a particular code corresponding to a particular keyword, the code table 108 is searched by the code table managing unit 98 for the particular code, and the particular code is transmitted to the keyword coding unit 84. Thereafter, in the keyword coding unit 84, each of the keywords of the broadcasting program list 107 is replaced with a corresponding binary character code to code the keywords of the broadcasting program list 107. Therefore, a coded broadcasting program list 107a in which one or more binary character codes are attached to each of the names of the broadcasting programs as one or more coded keywords is produced, and the coded broadcasting program list 107a is transmitted to the receiving terminal apparatus 40c through the data receiving and transmitting unit 74.

In the receiving terminal apparatus 40c, any coded keyword does not exist as attribute information in the viewer individual attribute information storing unit 87 at an initial time. Therefore, when the coded broadcasting program list 107a is transmitted to the service performing unit 58 through the data receiving and transmitting unit 90, the user service adapting unit 102 supplies the coded broadcasting program list 107a to the user service display indicating unit 103 without changing the arrangement of the names of the broadcasting programs in the user service adapting unit 102, and the coded broadcasting program list 107a is displayed in the reproducing and displaying unit 53 under the control of the user service display indicating unit 103. Thereafter, when the user selects one name of a particular broadcasting program by operating the user instruction inputting unit 101, the particular broadcasting program relating to the selected name is reproduced and displayed in the reproducing and displaying unit 53, the display of the broadcasting program is detected by the operation record information detecting and storing unit 89 as operation record information. Therefore, pieces of operation record information indicating coded keywords frequently selected by the user are accumulated in the operation record information detecting and storing unit 89.

Thereafter, when a user inputs an instruction indicating the registration of coded keywords to the instruction inputting unit 101, coded keywords frequently selected by the user are specified by the attribute renewing unit 105 according to the operation record information stored in the operation record information detecting and storing unit 89 and are registered in the viewer individual attribute information storing unit 87 as viewer individual attribute information. Therefore, the coded keywords are accumulated in the viewer individual attribute information storing unit 87 as viewer individual attribute information. The viewer individual attribute information accumulated in the viewer individual attribute information storing unit 87 is transmitted to the user service adapting unit 102 through the attribute information managing unit 104, and it is judged according to the viewer individual attribute information whether or not one broadcasting program of which the name is selected by the user is suitable for the user. In cases where the broadcasting program is suitable for the user, the broadcasting program is reproduced and displayed i the reproducing and displaying unit 53 under the control of the user service adapting unit 102.

Next, a keyword registering operation in which a binary character code corresponding to a new keyword not registered in the code table 108 is newly registered in the code table storing unit 97 of the service supply apparatus 70c is registered is described with reference to FIG. 15.

Figure 15:
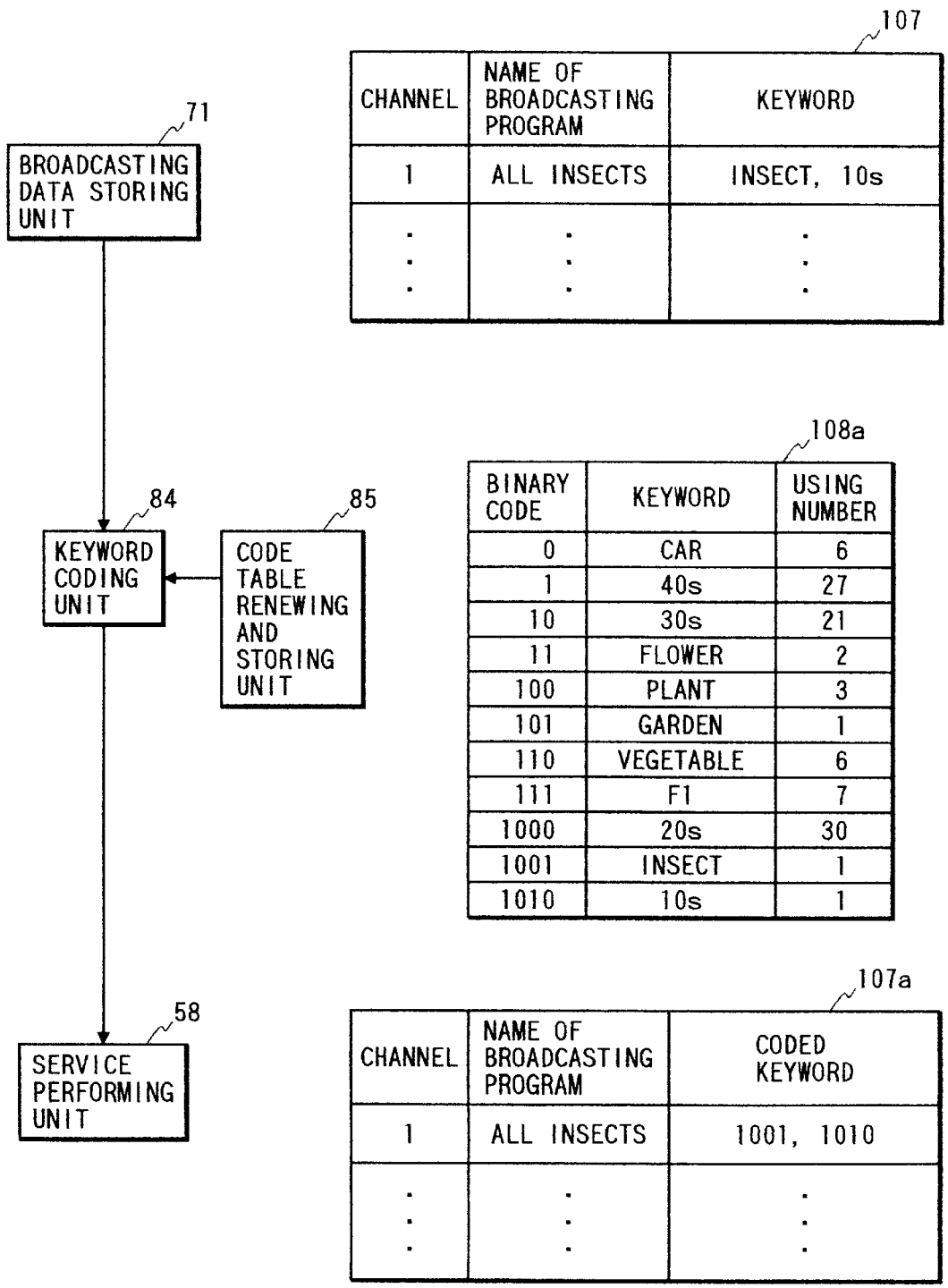
FIG. 15 is an explanatory view of an operation in which a binary character code corresponding to a new keyword not registered in a code table 108 is newly registered in a code table storing unit of the service supply apparatus shown in FIG. 13.

FIG. 15 is an explanatory view of an operation in which a binary character code corresponding to a new keyword not registered in the code table 108 is newly registered in the code table storing unit 97 of the service supply apparatus 70c is registered.

As shown in FIG. 15, a broadcasting program list 107, in which one or more keywords are attached to each of names of broadcasting programs, is stored in the broadcasting data storing unit 71 of the service supply apparatus 70c, and the broadcasting program list 107 is transmitted to the keyword coding unit 84. Thereafter, when the keyword coding unit 84 inquires of the code table renewing and storing unit 85 about a binary character code corresponding to a particular keyword, the code table managing unit 98 searches the code table 108 stored in the code table storing unit 97 for a binary character code corresponding to the particular keyword. In cases where it is detected by the code table managing unit 98 that any binary character code corresponding to the particular keyword does not exist, a particular binary character code is allocated for the particular keyword by the code table managing unit 98, a set of the particular keyword and the particular binary character code corresponding to the particular keyword is registered in the table code 108 of the table code storing unit 97 to newly prepare a code table 108a, and the particular keyword registered in the code table 108a newly prepared is transmitted to the keyword coding unit 84. Thereafter, in the keyword coding unit 84, each of the keywords of the broadcasting program list 107 is replaced with a corresponding binary character code to produce a coded broadcasting program list 107a in which one or more binary character codes are attached to each of the names of the broadcasting programs as one or more coded keywords, and the coded broadcasting program list 107a is transmitted to the service performing unit 58 of the receiving terminal apparatus 40c through the data receiving and transmitting unit 74.

In the receiving terminal apparatus 40c, the particular binary character code newly allocated for the particular keyword by the code table managing unit 98 is registered in the viewer individual attribute information storing unit 87 as viewer individual attribute information according to the operation record information stored in the operation record information detecting and storing unit 89.

FIG. 16 is an explanatory view showing a code table renewing operation in which a using number for a particular keyword in the code table 108a is incremented each time a particular binary character code corresponding to the particular keyword is requested of the keyword coding unit 84.

As shown in FIG. 16, when a broadcasting program list 107 in which a name of a broadcasting program with four keywords "F1", "car", "20s in age", "30s in age" is listed is transmitted from the broadcasting data storing unit 71 to the keyword coding unit 84, four binary character codes corresponding to the four keywords in the code table 108a are requested of the keyword coding unit 84. Therefore, four using numbers for the four keywords are respectively incremented. That is, in a code table 108a before renewal, the using number for the keyword "F1" is set to 7, the using number for the keyword "car" is set to 6, the using number for the keyword "20s in age" is set to 30, and the using number for the keyword "30s in age" is set to 21. In contrast, in a code table 108b after renewal, the using number for the keyword "F1" is incremented to 8, the using number for the keyword "car" is incremented to 7, the using number for the keyword "20s in age" is incremented to 31, and the using number for the keyword "30s in age" is incremented to 22.

Figure 17:
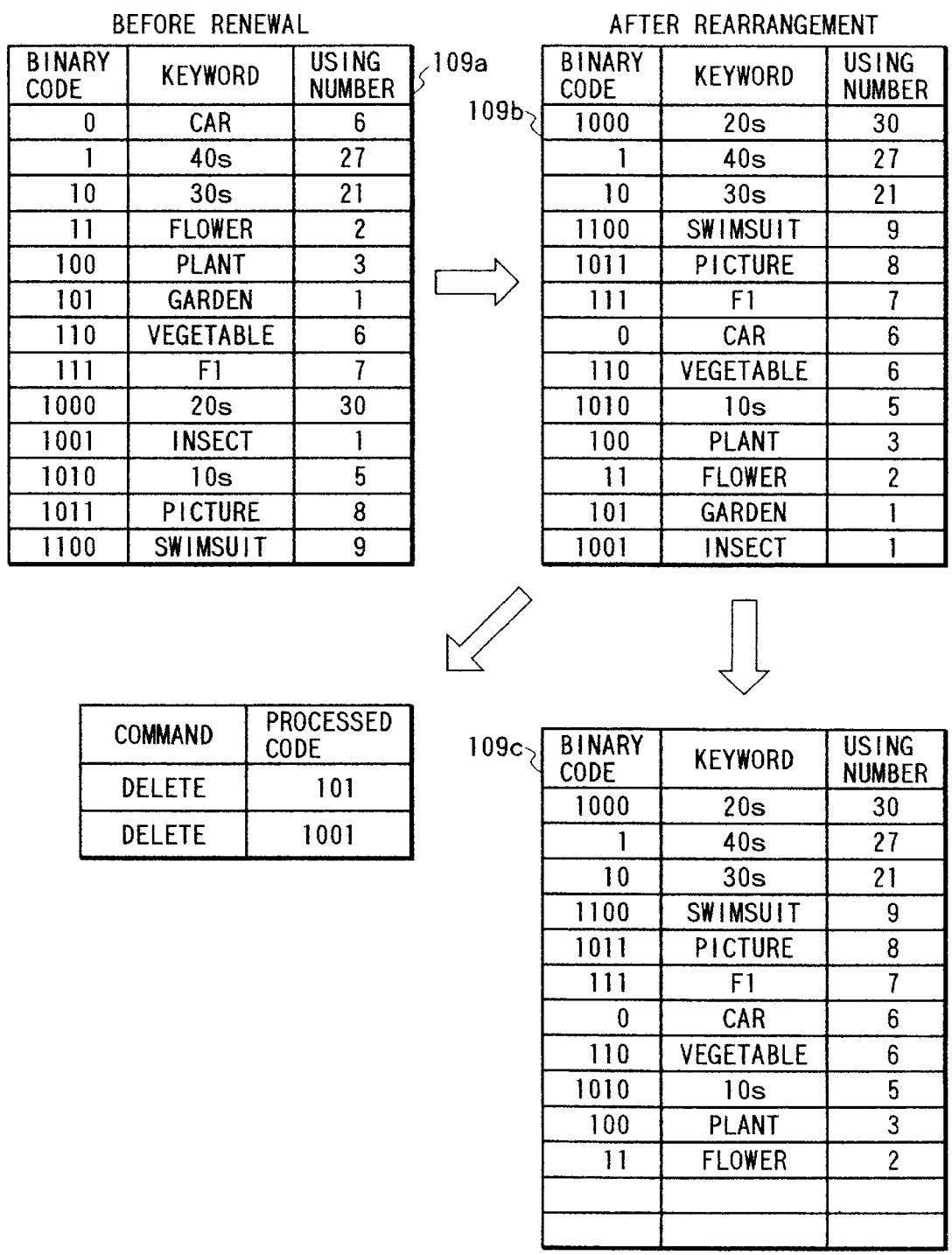
FIG. 17 is an explanatory view showing a code table renewing operation performed when a code table 109a stored in a code table storing unit becomes filled up with data.

FIG. 17 is an explanatory view showing a code table renewing operation performed when a code table stored in the code table storing unit 97 becomes filled up with data.

As shown in FIG. 17, when a code table 109a stored in the code table storing unit 97 becomes filled up with data, the code table 109a is transmitted to the code table renewing unit 99 under the control of the code table managing unit 98. In the code table renewing unit 99, the keywords registered in the code table 109a are rearranged in the order of decreasing the using number, so that a code table 109b in which the keywords are rearranged in the order of decreasing the using number is prepared. Thereafter, it is ascertained that any blank space does not exist in the code table 109b, and a predetermined number of keywords, of which using numbers are lowest, are crossed off from the code table 109b with the binary character codes corresponding to the keywords. For example, because two keywords "garden" and "insect" are arranged in the lowest lines of the code table 109b and the using numbers for the keywords "garden" and "insect" are lowest, the keywords "garden" and "insect" are crossed off from the code table 109b, so that a code table 109c having a blank space is newly prepared. The code table 109c is replaced with the code table 108 stored in the code table storing unit 97, and a code table 108 having a blank space is newly stored in the code table storing unit 97. Also, because there is a probability that one or more binary character codes corresponding to the keywords crossed off from the code table 108 are stored as viewer individual attribute information in the viewer individual attribute information storing unit 87 of the receiving terminal apparatus 40c, a code deleting command indicating the cancellation of the binary character codes corresponding to the keywords crossed off from the code table 108 is produced in the code renewal command producing unit 100 and is transmitted to the code renewing command receiving unit 106 of the receiving terminal apparatus 40c through the data receiving and transmitting units 74 and 90.

In the receiving terminal apparatus 40c, when the code deleting command is transmitted from the code renewing command receiving unit 106 to the attribute information managing unit 104, it is examined whether or not one or more binary character codes corresponding to the keywords crossed off from the code table 108 are stored as viewer individual attribute information in the viewer individual attribute information storing unit 87. In cases where one or more binary character codes corresponding to the keywords crossed off from the code table 108 are stored, the binary character codes are deleted.

In another case other than the case that the code table 108 stored in the code table storing unit 97 becomes filled up with data, the using number of each keyword in the code table 108 is periodically examined by the code table renewing unit 99, and a particular keyword of which the using number is low is crossed off. Also, when a particular binary character code a corresponding to the particular keyword is stored in the viewer individual attribute information storing unit 87, the particular binary character code is deleted in the same manner.

FIG. 18 is an explanatory view showing a code allocating operation in which a code crossed off from the code table 109b in the code table renewing operation is allocated to a new keyword as a coded keyword.

As shown in FIG. 18, in cases where the keyword coding unit 84 inquires of the code table managing unit 98 about a binary character code corresponding to a particular keyword, on condition that the code table 109c having a blank space is prepared in the code table renewing operation and is stored in the code table storing unit 97, and it is detected by the code table managing unit 98 that any binary character code corresponding to the particular keyword does not exist in the code table 109c, a particular code, which is crossed off from the code table 109b in the code table renewing operation and is not registered in the code table 109c, is allocated to the particular keyword by the code table managing unit 98. Therefore, a code table 109e, in which a set of the particular keyword and the particular binary character code is registered, is prepared and replaced with the code table 108 stored in the code table storing unit 97. Thereafter, the particular binary character code corresponding to the particular keyword is transmitted to the keyword coding unit 84. For example, because the binary character codes "101" and "1001" are crossed off from the code table 109b in the code table renewing operation, the binary character code "101" is allocated to a new keyword "rock", and the binary character code "1001" is allocated to another new keyword "concert".

Therefore, because an unnecessary keyword is removed from the code table 109b to obtain a blank space for a new keyword, a code region of the code table 109c can be efficiently used.

(Fourth Embodiment)

In this embodiment, a plurality of keywords stored in the viewer individual attribute information storing unit 87 as viewer individual attribute information are classified into long-term viewer individual attribute information, short-term viewer individual attribute information and fixed viewer individual attribute information and are managed by the attribute information managing unit 104.

Figure 19:
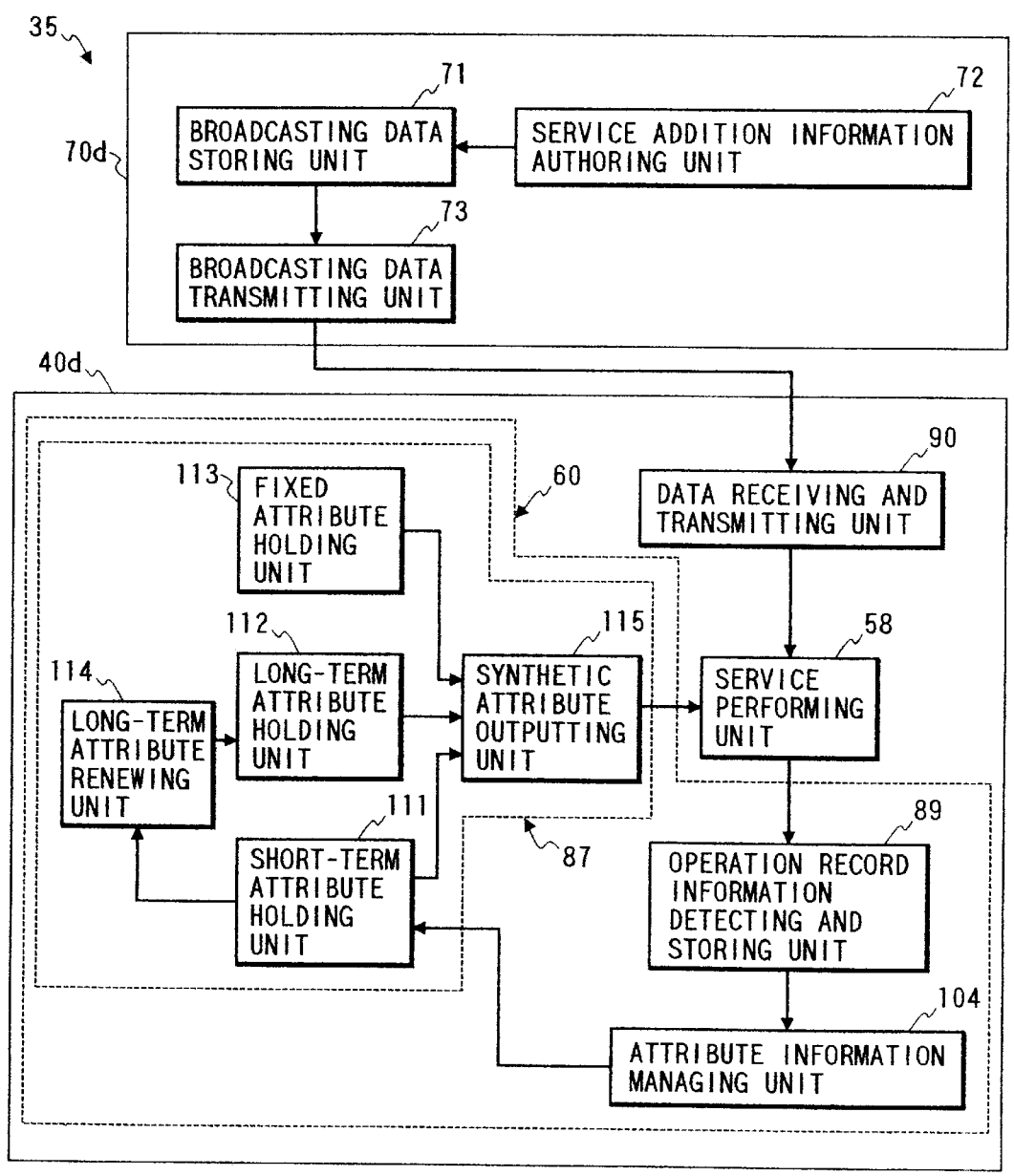
FIG. 19 is a block diagram of a broadcast system according to a fourth embodiment of the present invention.

FIG. 19 is a block diagram of a broadcast system according to a fourth embodiment of the present invention.

As shown in FIG. 19, a broadcast system 35 comprises a service supply apparatus 70d and a plurality of receiving terminal apparatuses 40d.

The service supply apparatus 70d comprises the broadcasting data storing unit 71, functioning as a service outputting means, for storing a broadcasting program name list in which a set of a broadcasting program name and one or more keywords corresponding to the broadcasting program name is listed for each channel, the service addition information authoring unit 72, functioning as a service addition information preparing means, for preparing service addition information Isa, and the broadcasting data transmitting unit 73 for transmitting the broadcasting program name list stored in the broadcasting data storing unit 71 to the receiving terminal apparatuses 40d as broadcasting data.

Each receiving terminal apparatus 40d utilized by a user comprises the data receiving and transmitting unit 90 for receiving the broadcasting program name list, the service performing unit 58, and the attribute information storing and managing unit 60.

The attribute information storing and managing unit 60 comprises the operation record information detecting and storing unit 89 for detecting the display of a broadcasting program performed under the control of the service performing unit 58 as an operation record and storing operation record information indicating the operation record of the user, the attribute information managing unit 104 and the viewer individual attribute information storing unit 87.

The viewer individual attribute information storing unit 87 comprises a short-term attribute holding unit 111 for holding short-term attributes of the user which are cleared every day, a long-term attribute holding unit 112 for holding long-term attributes of the user, a fixed attribute holding unit 113 for holding fixed attributes not renewed unless the user intentionally renews the fixed attributes, a long-term attribute renewing unit 114 for renewing the long-term attributes held in the long-term attribute holding unit 112 by changing the short-term attributes held in the short-term attribute holding unit 111 to a plurality of new long-term attributes and transmitting the new long-term attributes to the long-term attribute holding unit 112, and a synthetic attribute outputting unit 115 for synthesizing information of the long-term attributes held in the long-term attribute holding unit 112, information of the short-term attributes held in the short-term attribute holding unit 111 and information of fixed attributes held in the fixed attribute holding unit 113 to synthetic information indicating synthetic attributes and outputting the synthetic information to the service performing unit 58.

The long-term attributes indicate information obtained by learning user's attributes for a long term, and the short-term attributes indicate information of user's attributes in a short term such as one day.

In the above configuration, the management and processing for viewer individual attribute information stored in the viewer individual attribute information storing unit 87 are described.

Figure 20:
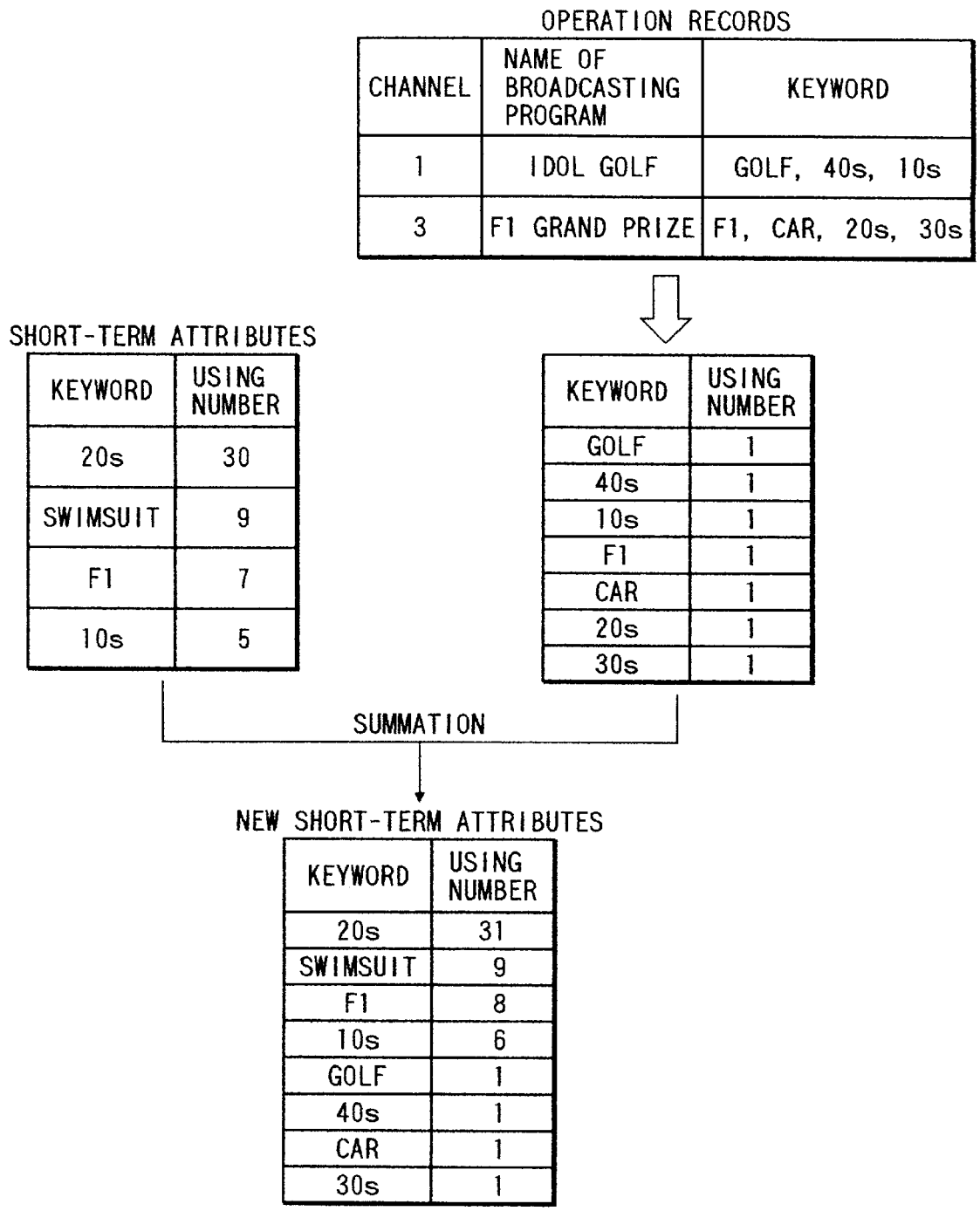
FIG. 20 shows the renewal of short-term attributes held in a short-term attribute holding unit shown in FIG. 19.

When a particular keyword attached to a name of a particular broadcasting program is transmitted as service addition information from the service addition information authoring unit 72 to the data receiving and transmitting unit 90 of the receiving terminal apparatus 40d. Thereafter, when the particular broadcasting program is selected by the user, the particular broadcasting program is displayed under the control of the service performing unit 58, and the particular keyword is stored in the operation record information detecting and storing unit 89 as operation record information. Thereafter, when a short-term attribute renewing command is transmitted from the attribute information renewing unit 105 to the short-term attribute holding unit 111 through the attribute information managing unit 104, the particular keyword is extracted from the operation record information detecting and storing unit 89 to the short-term attribute holding unit 111, and a using number for the particular keyword is incremented in the short-term attribute holding unit 111. For example, as shown in FIG. 20, when particular broadcasting programs "Idol Golf" and "F1 Grand Prize" are selected by the user and are displayed, the display of the particular broadcasting programs is detected as operation records by the operation record information detecting and storing unit 89, particular keywords "golf", "40s in age", "10s in age", "F1", "car", "20s in age" and "30s in age" relating to the operation records are extracted from the service addition information Isa of the particular broadcasting programs, and using numbers of short-term attributes for the particular keywords in the short-term attribute holding unit 111 are respectively incremented to produce new short-term attributes for the particular keywords.

Thereafter, when a long-term attribute renewing command is transmitted from the attribute information renewing unit 105 to the long-term attribute renewing unit 114 through the attribute information managing unit 104, a particular keyword with a using number is extracted from the short-term attribute holding unit 111 to the long-term attribute renewing unit 114. Also, the same particular keyword with a using number is extracted from the long-term attribute holding unit 112 to the long-term attribute renewing unit 114, the using numbers for the same particular keyword are summed up, the using number for the particular keyword is replaced with a summed using number in the long-term attribute holding unit 112 to renew the long-term attribute indicated by the particular keyword, and the particular keyword with a using number held in the short-term attribute holding unit 111 is deleted. For example, as shown in FIG. 21, when a particular keyword "20s in age" with a using number of 30, a particular keyword "swimsuit" with a using number of 9, a particular keyword "F1" with a using number of 7 and a particular keyword "10s in age" with a using number of 5 are held in the short-term attribute holding unit 111, the using numbers for the particular keywords are renewed in the long-term attribute holding unit 112. The renewing of the long-term attribute is, for example, performed once a day.

Figure 22:
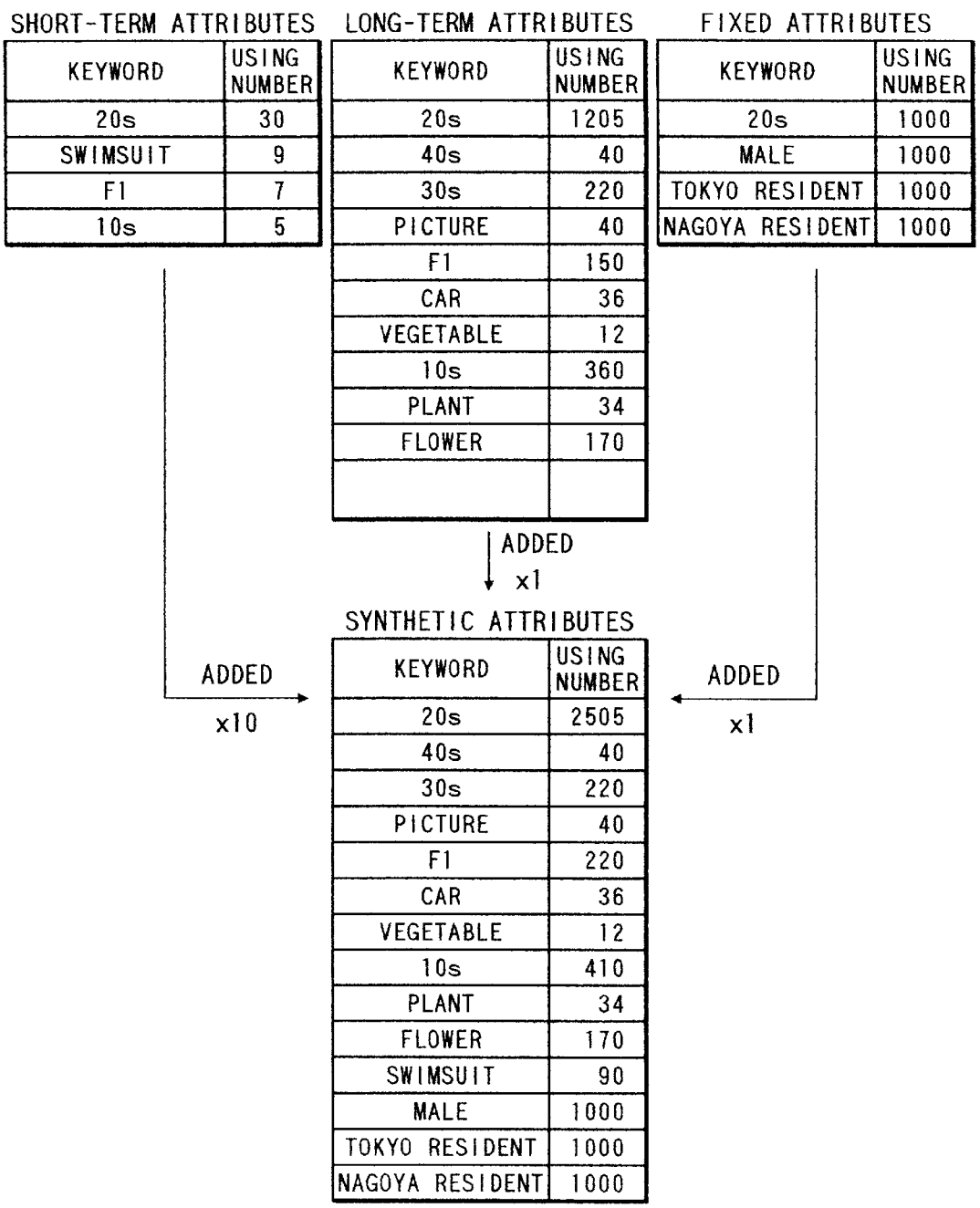
FIG. 22 shows the generation of synthetic attributes held in a synthetic attribute holding unit shown in FIG. 19.

Also, one or more specific keywords and fixed points attached to the specific keywords are input to the user instruction inputting unit 101 and are stored in the fixed attribute holding unit 113 as fixed attributes. Thereafter, when the attribute information managing unit 104 requests the viewer individual attribute information storing unit 87 to output viewer individual attribute information, the synthetic attribute outputting unit 115 receives the long-term attributes, the short-term attributes and the fixed attributes from the holding units 111, 112 and 113, and a synthetic attribute corresponding to a particular keyword is generated from one long-term attribute, one short-term attribute and one fixed attribute corresponding to the same particular keyword according to a predetermined synthesizing method to regard the short-term attribute as important. For example, as shown in FIG. 22, the using numbers for the keywords held in the short-term attribute holding unit 111 are respectively multiplied by 10 in the synthetic attribute outputting unit 115, and a multiplied using number for one keyword indicating one short-term attribute, a using number for the same keyword indicating one long-term attribute and a fixed point for the same keyword indicating one fixed attribute are summed up as a using number for the same keyword indicating one synthetic attribute.

Thereafter, the synthetic attributes are transmitted to the service performing unit 58 as viewer individual attribute information. Therefore, when a specific broadcasting program with service addition information is received in the receiving terminal apparatus 40d, the judgement whether or not the specific broadcasting program is suitable for the user can be automatically performed according to the viewer individual attribute information without obtaining the user's judgement.

(Fifth Embodiment).

In this embodiment, a viewing record obtained in each receiving terminal apparatus is collected by a service supply apparatus.

Figure 23:
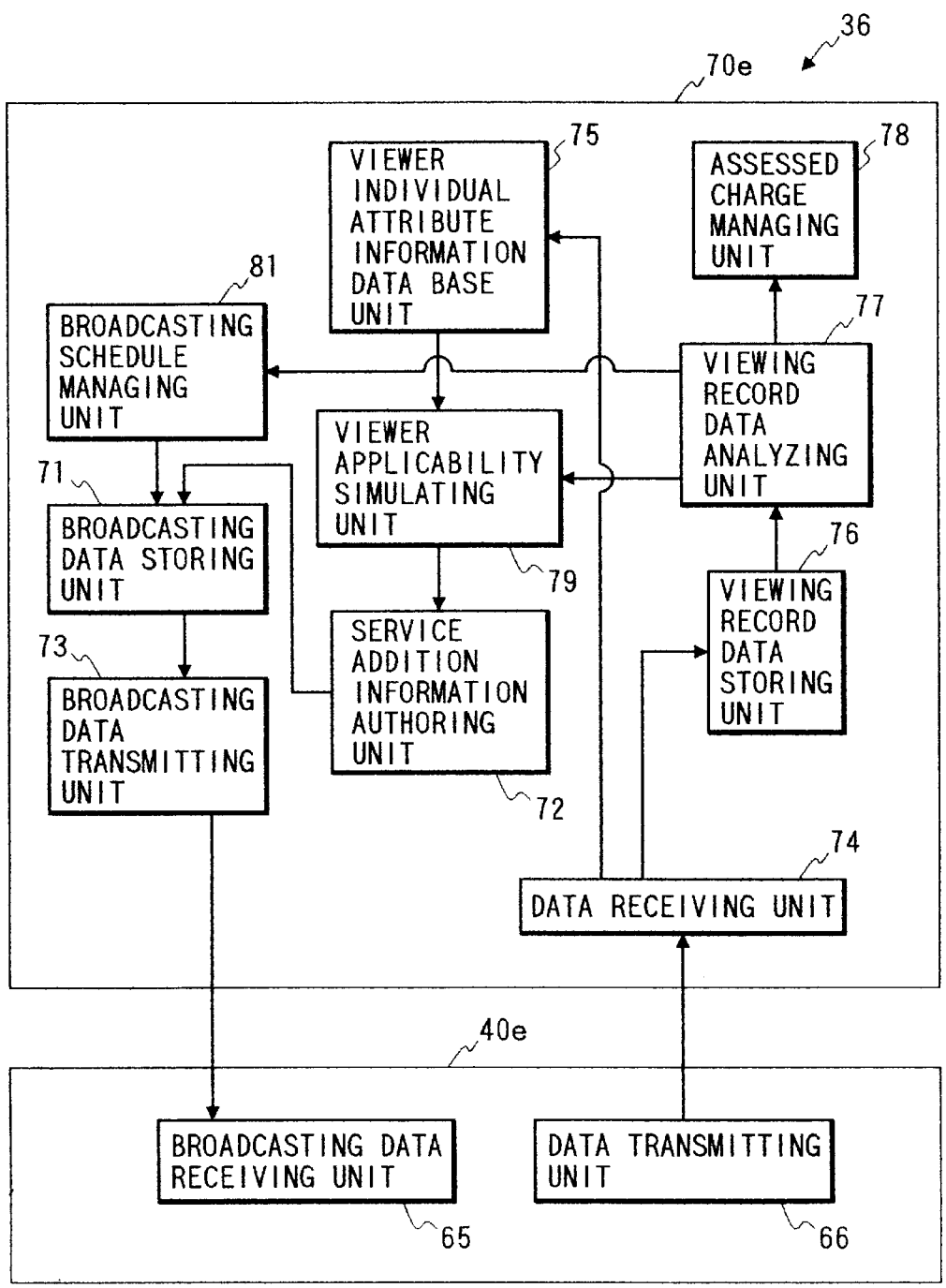
FIG. 23 is a block diagram of a service supply apparatus of a broadcast system according to a fifth embodiment of the present invention.

FIG. 23 is a block diagram of a service supply apparatus of a broadcast system according to a fifth embodiment of the present invention.

As shown in FIG. 23, a broadcast system 36 comprises a service supply apparatus 70e and a plurality of receiving terminal apparatuses 40e.

The service supply apparatus 70e comprises the data receiving unit 74 for receiving viewer individual attribute information and viewing record data from each of the receiving terminal apparatuses 40e, the viewer individual attribute information data base unit 75 for holding and managing the viewer individual attribute information received by the data receiving unit 74, the viewing record data storing unit 76 for holding and managing the viewing record data received by the data receiving unit 74, the viewing record data analyzing unit 77 for analyzing the viewing record data stored in the viewing record data storing unit 76, the assessed charge managing unit 78 for managing an assessed charge for the viewing of a pay broadcasting program according to an analyzing result obtained in the viewing record data analyzing unit 77, the viewer applicability simulating unit 79 for preparing provisional examined viewer condition information indicating a provisional attribute condition required of viewers from which viewing records for a particular broadcasting program are planned to be collected, simulating a viewer applicability of each viewer for the particular broadcasting program by collating the provisional attribute condition with the viewer individual attribute information managed in the viewer individual attribute information data base unit 75 and an analyzing result obtained in the viewing record data analyzing unit 77, specifying provisional viewers on condition that the viewer applicability of each provisional viewer for the particular broadcasting program exceeds a prescribed value such as 60% or 80%, and finally preparing examined viewer condition information indicating an attribute condition required of particular viewers, from which viewing records for a particular broadcasting program are planned to be collected, on condition that the viewer applicability of each particular viewer for the particular broadcasting program exceeds the prescribed value and the collection of the viewing records from a group of the particular viewers is appropriate, the service addition information authoring unit 72 for preparing service addition information Isa of the particular broadcasting program while adding the examined viewer condition information prepared by the viewer applicability simulating unit 79, broadcasting program identification information, viewing record collection schedule information and access point information to the service addition information Isa as condition information Isa5, the broadcasting data storing unit 71 for storing service content information Isc of the particular broadcasting program and the service addition information Isa of particular broadcasting program prepared in the service addition information authoring unit 72 as broadcasting data, and the broadcasting data transmitting unit 73 for transmitting the broadcasting data stored in the broadcasting data storing unit 71 to the plurality of receiving terminal apparatuses 40e, and the broadcasting schedule managing unit 81 for managing a broadcasting schedule of a plurality of broadcasting programs by changing a broadcasting schedule for one or more broadcasting programs according to the analyzing result obtained in the viewing record data analyzing unit 77.

Figure 24:
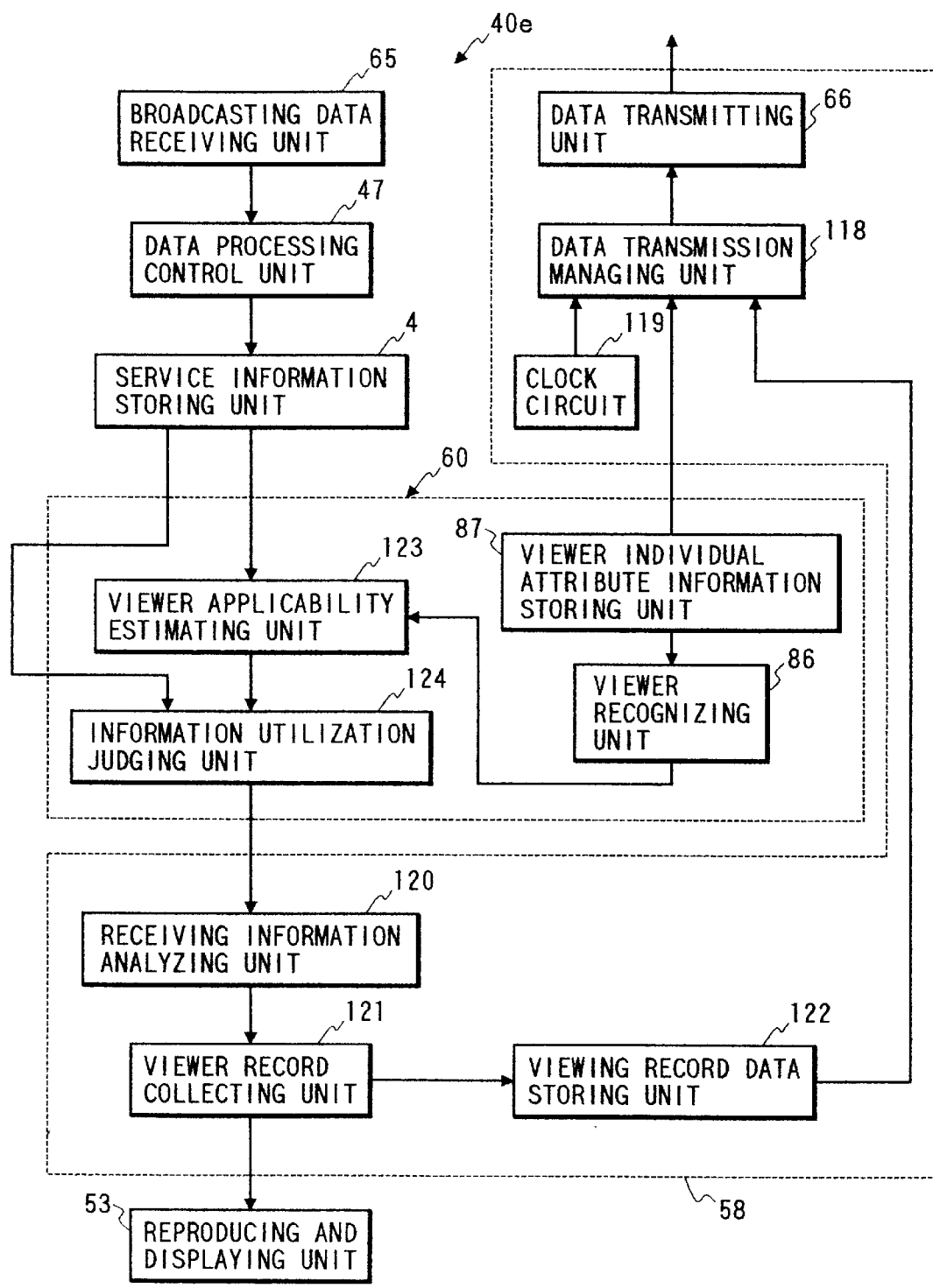
FIG. 24 is a block diagram of one receiving terminal apparatus of the broadcast system according to the fifth embodiment of the present invention.

FIG. 24 is a block diagram of one receiving terminal apparatus 40e of the broadcast system according to the fifth embodiment of the present invention.

As shown in FIG. 24, each receiving terminal apparatus 40e utilized by a current viewer comprises:

the broadcasting data receiving unit 65 for receiving the broadcasting data composed of the service content information Isc of the particular broadcasting program and the service addition information Isa of the particular broadcasting program from the service supply apparatus 70e;

the data processing control unit 47 for analyzing the broadcasting data received by the broadcasting data receiving unit 65 and separating the service addition information Isa from the broadcasting data;

the service information storing unit 4 for storing the service content information Isc of the particular broadcasting program and the service addition information Isa of the particular broadcasting program obtained in the data processing control unit 47;

the attribute information storing and managing unit 60 for judging whether or not the reception of the particular broadcasting program is performed, according to the examined viewer condition information included in the service addition information Isa and the personal attribute of the current viewer;

the service performing unit 58 for collecting and storing a viewing record, the broadcasting program identification information, the viewing record collection schedule information, the access point information, the viewer identification information and the terminal identification information in cases where it is judged by the attribute information storing and managing unit 60 that the reception of the particular broadcasting program is performed; and the reproducing and displaying unit 53 for displaying information that the reception of the particular broadcasting program is performed.

The attribute information storing and managing unit 60 comprises the viewer individual attribute information storing unit 87 for storing viewer individual attribute information generally classified into viewer identification information, terminal identification information, female or male identification information, age identification information, living area identification information, occupation identification information, married or unmarried identification information, taste (or hobby) identification information, life style (morning person or night bird) identification information and the like, the viewer attribute recognizing unit 86 for recognizing personal attributes (for example, a taste and fixed attributes such as sex, an age and a living area) of a viewer according to viewer individual attribute information stored in the viewer individual attribute information storing unit 87, a viewer applicability estimating unit 123 for estimating viewer applicability for one broadcasting program stored in the service information storing unit 4 by collating the personal attributes of the viewer recognized by the viewer attribute recognizing unit 86 with a viewer condition indicated by examined viewer condition information included in the service addition information Isa, and an information utilization judging unit 124 for judging whether or not data of the broadcasting program can be utilized, according to an estimating result obtained in the viewer applicability estimating unit 123.

The service performing unit 58 has various functions for performing the processing of various services. That is, the service performing unit 58 comprises a receiving information analyzing unit 120 for analyzing the data of the broadcasting program of which the utilization is judged by the information utilization judging unit 124, a viewing record collecting unit 121 for collecting a viewing result each time the broadcasting program analyzed in the receiving information analyzing unit 120 is reproduced and displayed in the reproducing and displaying unit 53, a viewing record data storing unit 122 for storing a viewing record collected by the viewing record collecting unit 121, a data transmitting unit 66 for transmitting the viewing record stored in the viewing record data storing unit 122 and transmitting pieces of viewer individual attribute information stored in the viewer individual attribute information storing 97 unit 87, a data transmission managing unit 118 for managing the transmission of the viewing record and the pieces of viewer individual attribute information, and a clock circuit 119 for measuring a starting time of an operation performed by the data transmission managing unit 118.

The data transmitting unit 66 comprises the modem 48 connected with the network 50 and the communication control unit 51. In this case, it is applicable that the data transmitting unit 66 have a receiving function to communicate with the service supply apparatus 70e. Also, it is applicable that a two-way communication be performed by the data transmitting unit 66 in the same manner as in the data receiving and transmitting unit 90.

In the above configuration of the service supply apparatus 70e and the receiving terminal apparatus 40e, the transmission and reception of data of a broadcasting program and a viewing record collection processing operation are described.

In a service center side, service content information Isc denoting service contents of one particular broadcasting program is broadcasted from the service supply apparatus 70e as broadcasting data of the particular broadcasting program on the image channel broadcast 1, and service addition information Isa in which features of service contents of the particular broadcasting program and a relationship between the service contents of the particular broadcasting program and service contents of another broadcasting program relating to the particular broadcasting program are written as attribute information is broadcasted from the service supply apparatus 70e as other broadcasting data of the particular broadcasting program on the data broadcast 2. Thereafter, the service content information Isc and the service addition information Isa are received by the antenna 41 of the receiving terminal apparatus 40e.

In this case, before the service content information Isc is broadcasted from the service supply apparatus 70e, the service addition information Isa is prepared in the service addition information authoring unit 72 while adding the examined viewer condition information prepared by the viewer applicability simulating unit 79, broadcasting program identification information, viewing record collection schedule information and access point information to the service addition information Isa as condition information Isa5, the service addition information Isa prepared is temporarily stored in the broadcasting data storing unit 71, the service addition information Isa is read out to the broadcasting data transmitting unit 73, and the service addition information Isa is broadcasted from the broadcasting data transmitting unit 73 to the broadcasting data receiving unit 65 on the data broadcast 2. Thereafter, the service content information Isc is broadcasted from the service supply apparatus 70e to the broadcasting data receiving unit 65 on the image channel broadcast 1.

In another case, the service content information Isc and the service addition information Isa are superimposed on various digitalized broadcasting programs and are broadcasted with through the same communication path. Also, in another case, the service content information Isc of the broadcasting program is transmitted in analog-broadcasting, and the service addition information Isa is transmitted in digital-broadcasting.

Also, in this embodiment, because viewing records in the plurality of receiving terminal apparatuses 40e are collected in the service supply apparatus 70e, viewing record collection indicating information is added to the broadcasting data transmitted from the broadcasting data transmitting unit 73. This viewing record collection indicating information is written in service addition information Isa when the service addition information Isa is prepared in the service addition information authoring unit 72. Also, examined viewer condition information designating a group of viewers for which the service center desires to supply viewing record collection service is added to attribute information Isa5 of the service addition information Isa in the service addition information authoring unit 72. For example, the attribute information Isa5 is composed of attributes such as "20s in age", "male" and "Tokyo metropolis residents".

Figure 25:
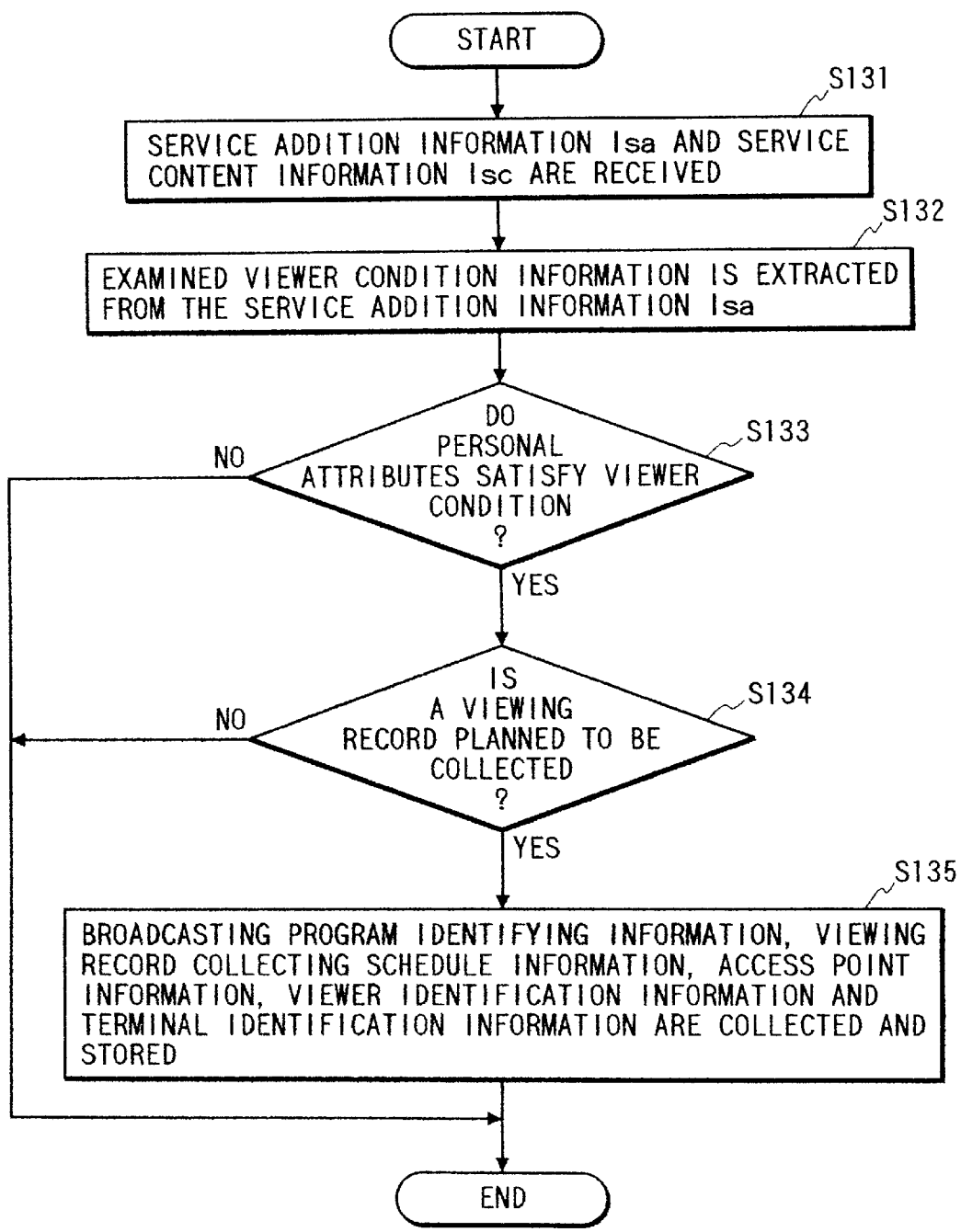
FIG. 25 is a flow chart showing a procedure of a broadcasting data receiving operation performed in each receiving terminal apparatus shown in FIG. 24 while checking whether or not a current viewer satisfies a viewer condition indicated by examined viewer condition information of service addition information Isa.

FIG. 25 is a flow chart showing a procedure of a broadcasting data receiving operation performed in each receiving terminal apparatus 40e while checking whether or not a current viewer satisfies a viewer condition indicated by examined viewer condition information of service addition information Isa.

As shown in FIG. 25, when broadcasting data composed of service addition information Isa of a particular broadcasting program and service content information Isc of the particular broadcasting program is received in one receiving terminal apparatus 40e of a current viewer, a broadcasting data receiving operation is started (step 131), the service addition information Isa is separated from the service content information Isc, and the service addition information Isa and the service content information Isc are stored in the service information storing unit 4. Thereafter, when the current viewer desires to view the particular broadcasting program, the service addition information Isa is read out from the storing unit 4 and is analyzed in the data processing control unit 47, and examined viewer condition information is extracted from the service addition information Isa (step 132). Thereafter, it is checked in the attribute information storing and managing unit 60 whether or not the personal attributes of the current viewer recognized in the viewer recognizing unit 86 satisfy a viewer condition indicated by the examined viewer condition information (step 133). That is, viewer applicability of the current viewer for the particular broadcasting program is estimated in the viewer applicability estimating unit 123 by collating the personal attributes of the current viewer with the viewer condition indicated by the examined viewer condition information, and the judgement whether or not the particular broadcasting program is suitable for the current viewer is performed according to the viewer applicability in the information utilization judging unit 124. As an example of a judging criterion, in cases where the viewer applicability estimated in the viewer applicability estimating unit 123 exceeds a prescribed value such as 80% or 60%, it is judged that the particular broadcasting program is suitable for the current viewer.

Thereafter, in cases where the personal attributes of the current viewer satisfy the viewer condition indicated by the examined viewer condition information (step 133), it is judged in the information utilization judging unit 124 whether or not a viewing record for the particular broadcasting program is planned to be collected (step 134). In cases where the viewing record collection indicating information is included in the service addition information Isa, it is judged that the particular broadcasting program is planned to be utilized for the collection of a viewing record of the current viewer. Therefore, the service addition information Isa of the particular broadcasting program stored in the service information storing unit 4 is output to the receiving information analyzing unit 120.

Thereafter, when the service content information Isc of the particular broadcasting program stored in the storing unit 4 is read out and displayed in the reproducing and displaying unit 53, the broadcasting program identifying information, the viewing record collecting schedule information and the access point information extracted from the service addition information Isa are collected in the viewing record collecting unit 121 and are stored in the viewing record data storing unit 122 (step 135). Also, the viewer identification information and the terminal identification information extracted from the viewer attribute storing unit 87 are collected in the viewing record collecting unit 121 and are stored in the viewing record data storing unit 122 (step 135). In this case, the current viewer can immediately identify the particular broadcasting program according to the broadcasting program identifying information In contrast, in cases where the personal attributes of the current viewer do not satisfy the viewer condition indicated by the examined viewer condition information (step 133) or the particular broadcasting program is not planned to be utilized for the collection of a viewing record of the current viewer (step 134), even though the service content information Isc of the particular broadcasting program stored in the storing unit 4 is read out and displayed in the reproducing and displaying unit 53, any viewing record data is not stored in the viewing record data storing unit 122.

Figure 26:
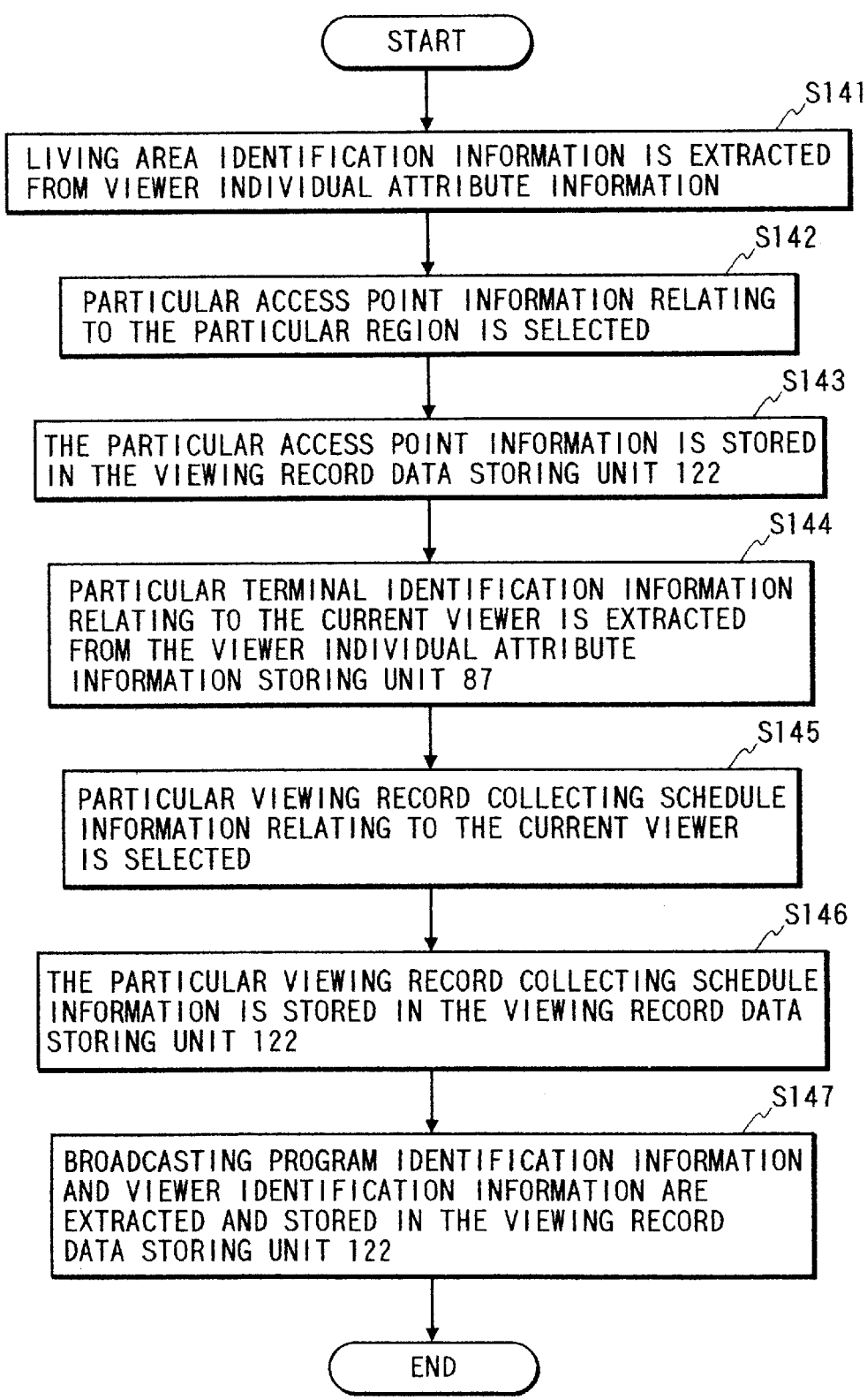
FIG. 26 is a flow chart showing a procedure of a viewing record collecting operation.

Next, a viewing record collecting operation is described. FIG. 26 is a flow chart showing a procedure of a viewing record collecting operation.

When a viewing record collecting operation is started, the service addition information Isa is analyzed by the receiving information analyzing unit 120 of the service performing unit 58. In cases where the viewing record collection indicating information is included in the service addition information Isa, the viewing record collection indicating information is extracted from the service addition information Isa and is output to the viewing record collecting unit 121. In the viewing record collecting unit 121, the living area identification information indicating a particular region in which the current viewer is resident is extracted from the viewer individual attribute information storing unit 87 to the viewing record collecting unit 121 (step 141). Thereafter, it is checked whether or not a piece of access point information included in the service addition information Isa is a piece of particular access point information relating to the particular region (step 142). In cases where the piece of access point information is not the particular access point information, another piece of access point information is checked. This checking is repeated until the particular access point information relating to the particular region is obtained. Therefore, the particular access point information relating to the particular region is selected from pieces of access point information (step 142), the particular access point information is stored in the viewing record data storing unit 122 (step 143), and particular terminal identification information relating to the current viewer is extracted from the viewer individual attribute information storing unit 87 (step 144). Thereafter, particular viewing record collecting schedule information relating to the current viewer is selected from pieces of viewing record collecting schedule information according to the particular terminal identification information (step 145). The particular viewing record collecting schedule information is stored in the viewing record data storing unit 122 (step 146). Thereafter, broadcasting program identification information and viewer identification information are extracted from the information relating to the particular region and are stored in the viewing record data storing unit 122 (step 147). Also, information indicating that the particular broadcasting program is a subject for the viewing record collection is extracted from the service addition information Isa and is displayed in the reproducing and displaying unit 53.

Next, a simulation operation in the viewing record collecting operation is described.

Viewer individual attribute information stored in the viewer individual attribute information storing unit 87 of each receiving terminal apparatus 40e is transmitted to the service supply apparatus 70e through the data transmitting unit 66, and pieces of viewer individual attribute information for all viewers are stored in the viewer individual attribute information data base unit 75. Thereafter, examined viewer condition information indicating what type of viewers are examined is prepared in the viewer applicability simulating unit 79 by referring to the viewer individual attribute information of all viewers stored in the viewer individual attribute information data base unit 75. That is, particular examined viewer condition information is initially prepared, a viewer applicability for each viewer characterized by the viewer individual attribute information managed in the viewer individual attribute information data base unit 75 is simulated by estimating applicability of the viewer for a particular broadcasting program of which one or more attributes are specified by the particular examined viewer condition information included in service addition information Isa as attribute information Isa5, and a group of viewers having high viewer applicability is specified. In cases where it is judged that the specified group of viewers is not adequate to collect viewing records from the specified group of viewers, the particular examined viewer condition information is changed, and the above simulation is repeated until the specified group of viewers is determined on condition that the collection of viewing records from the specified group of viewers is most adequate is obtained.

For example, in cases where the particular examined viewer condition information indicates attributes "female" and "20s in age in age" and a simulation result indicates that the number of particular viewers having high viewer applicability is thirty thousands, it is judged that the group of particular viewers is not adequate to collect viewing records from the group of particular viewers because it is impossible to process the viewing records collected from the group of particular viewers In this case, an attribute such as "Tokyo metropolis residents" is added to the particular examined viewer condition information to reduce the number of particular viewers having high viewer applicability. Therefore, because a simulation result indicates that the number of particular viewers having high viewer applicability is, for example, eight thousands, it is judged that the collection of viewing records from the group of particular viewers is most adequate. Therefore, examined viewer condition information indicating attributes "female", "20s in age" and "Tokyo metropolis residents" is prepared in the viewer applicability simulating unit 79, and the examined viewer condition information indicating attributes "female", "20s in age" and "Tokyo metropolis residents" is included in service addition information Isa as attribute information Isa5 in the service addition information authoring unit 72. In this example, fixed attributes such as sex, age and region are utilized. However, taste information presumed from past using records of the viewer is included in the examined viewer condition information. For example, it is applicable that the examined viewer condition information indicate an attribute such as a baseball fan or a soccer fan.

Accordingly, because viewing records of a plurality of viewers of which attributes are specified by the examined viewer condition information are collected as viewer individual attribute information in the service supply apparatus 70e, the viewing record collecting operation for a predetermined purpose can be efficiently performed.

Next, the setting of a viewing record collecting schedule is described.

The viewing record collection schedule information included in the service addition information Isa of the particular broadcasting program indicates a transmitting time to transmit a viewing record of the current viewer for the particular broadcasting program stored in the viewing record data storing unit 122 to the service supply apparatus 70e according to the terminal identification information of the current viewer. For example, in cases where the viewing record collection schedule information indicates a time 20:00, when a tail number of the terminal identification information of the current viewer is "1", a viewing record of the current viewer for the particular broadcasting program is transmitted during a time interval between 20:00 and 20:05. Also, when a tail number of the terminal identification information of the current viewer is "2", a viewing record of the current viewer for the particular broadcasting program is transmitted during a time interval between 20:05 and 20:10.

Accordingly, because the viewing record transmitting time is set according to the viewing record collection schedule information relating to the particular broadcasting program and the terminal identification information relating to the current viewer, the viewing record transmitting time for the particular broadcasting program can be set for each viewer, and the viewing record transmitting time can be set for each particular broadcasting program. Therefore, it is prevented that a large number of viewing records of a large number of viewers are simultaneously transmitted to the service supply apparatus 70e.

Also, in the same manner, an access point for each broadcasting program can be set for each viewer according to the access point information and the terminal identification information. Therefore, a viewing record transmitted from a particular receiving terminal apparatus 40e indicated by a particular access point is received by a particular service supply apparatus 70e indicated by the same particular access point and is not received by a service supply apparatus 70e indicated by a different access point. Also, an access point can be set according to attribute information of one viewer stored in the viewer individual attribute information storing unit 87 for each viewer. For example, in cases where an access point is set according to region information stored in the viewer individual attribute information storing unit 87, a plurality of viewers living in the same region have the same access point. Therefore, in cases where the whole nation is divided into ten ares (first area to tenth area), viewing records of a plurality of viewers living in a first area is received by a service supply apparatus 70e placed in the same first area, and a group of viewing records of other viewers not living in the first area is not received by the service supply apparatus 70e placed in the first area. Accordingly, viewing records of a large number of viewers can be uniformly distributed to a plurality of service supply apparatuses 70e.

In the service addition information authoring unit 72, the examined viewer condition information, examination specifying information, the viewing record collection schedule information, the access point information and the broadcasting program identifying information for identifying a particular broadcasting program are added to service addition information Isa of the particular broadcasting program, and the service addition information Isa including the pieces of information is stored in the broadcasting data storing unit 71 with service content information Isc of the particular broadcasting program and is transmitted from the broadcasting data transmitting unit 73 to each receiving terminal apparatus 40e. In each receiving terminal apparatus 40e, the examined viewer condition information, examination specifying information, the viewing record collection schedule information, the access point information and the broadcasting program identifying information are extracted from the service addition information Isa in the data processing control unit 47 and are stored in the service information storing unit 4. Thereafter, the examined viewer condition information is input to the viewer applicability estimating unit 123. Also, the personal attributes of the current viewer is recognized in the viewer attribute recognizing unit 86. Thereafter, the applicability between the personal attributes of the current viewer and the viewer condition indicated by the examined viewer condition information is estimated in the viewer applicability estimating unit 123, and an estimating result of a viewer applicability is output to the information utilization judging unit 124.

In the information utilization judging unit 124, in cases where this estimating result exceeds a prescribed value, it is judged that the viewer condition indicated by the examined viewer condition information is suitable for the current viewer recognized by the personal attributes, and the service addition information Isa stored in the service information storing unit 4 is output to the receiving information analyzing unit 120. In contrast, in cases where it is judged that the viewer condition indicated by the examined viewer condition information is not suitable for the current viewer recognized by the personal attributes, the viewing record collecting operation is finished, and the receiving terminal apparatus 40e is set to a condition for waiting for another broadcasting program. In this case, a normal broadcasting program is displayed in the reproducing and displaying unit 53.

Thereafter, when the service addition information Isa stored in the service information storing unit 4 is output to the receiving information analyzing unit 120, the service addition information Isa is analyzed in the receiving information analyzing unit 120. In cases where viewing record collection indicating information for the viewing record examination is included in the service addition information Isa, the service addition information Isa is transmitted to the viewing record collecting unit 121.

Thereafter, in cases where the viewing record collection indicating information indicates that the particular broadcasting program is specified as a subject for the examination of a viewing record, the viewing record collection schedule information and the access point information corresponding to the living area identification information, the broadcasting program identification information and the viewer identification information are collected in the viewing record collecting unit 121 and are stored in the viewing record data storing unit 122. Also, information indicating that the particular broadcasting program is a subject for the viewing record collection is extracted from the service addition information Isa and is displayed in the reproducing and displaying unit 53.

Thereafter, when the data transmission managing unit 118 detects according to time information obtained from the clock circuit 119, the viewing record schedule information and the terminal identification information that it comes time to transmit the viewing record stored in the unit 122, the viewing record and the viewer individual attribute information are output from the data transmitting unit 66 and are received in a particular service supply apparatus 70e identified by the same access point as that of the receiving terminal apparatus 40e according to the access point information.

Accordingly, because it is prevented according to the viewing record schedule information and the access point information that a large number of viewing records of a large number of viewers are simultaneously transmitted to the service supply apparatus 70e, the collection of the viewing records from a plurality of viewers can be efficiently performed.

Thereafter, the viewing records and pieces of viewer individual attribute information output from a plurality of receiving terminal apparatuses 40e are received in the data receiving unit 74 of the service supply apparatus 70e. In the service supply apparatus 70e, the pieces of viewer individual attribute information are stored in the viewer individual attribute information data base unit 75, and the viewing records are stored in the viewing record data storing unit 76. Thereafter, the viewing records are analyzed in the viewing record data analyzing unit 77. Therefore, a program rating for each broadcasting program and data relating to the attributes of the viewers are obtained. Thereafter, a viewing condition for each broadcasting program is judged according to the program rating and the data relating to the attributes of the viewers, and a configuration of broadcasting programs is changed. For example, even though a particular broadcasting program for adults is transmitted to the receiving terminal apparatuses 40e in a particular time zone for adults, in cases where the greater part of viewers for the particular broadcasting program are children, the transmission schedule for the particular broadcasting program is changed in the broadcasting schedule managing unit 81, and another broadcasting program for children is transmitted to the receiving terminal apparatuses 40e in the particular time zone. Also, contents of an electronic broadcasting program guide are changed and broadcasted.

Accordingly, a program rating for each broadcasting program can be improved. Also, even though a program rating for a particular broadcasting program is low, an advertising broadcast for the particular broadcasting program is automatically put in a schedule of advertising broadcasts by the broadcasting schedule managing unit 81, and the advertising broadcast for the particular broadcasting program is broadcasted. Therefore, the program rating for the particular broadcasting program can be improved.

Also, a particular viewer who frequently views various broadcasting programs is found out in the viewing record data analyzing unit 77, a coupon indicating a discount on services of broadcasting programs is included in a coupon list Isa2 of service addition information Isa when the service addition information Isa is prepared in the service addition information authoring unit 72, and the service addition information Isa is transmitted to a particular receiving terminal apparatus 40e of the particular viewer.

(Sixth Embodiment)

In this embodiment, an electronic direct mail and service addition information Isa indicating an attribute of the electronic direct mail are transmitted from a service supply apparatus functioning as an electronic direct mail supply apparatus to a plurality of receiving terminal apparatuses, the reception of the electronic direct mail is judged in the receiving terminal apparatuses according to the service addition information Isa, and the electronic direct mail is received by particular receiving terminal apparatuses of particular viewers.

Figure 27:
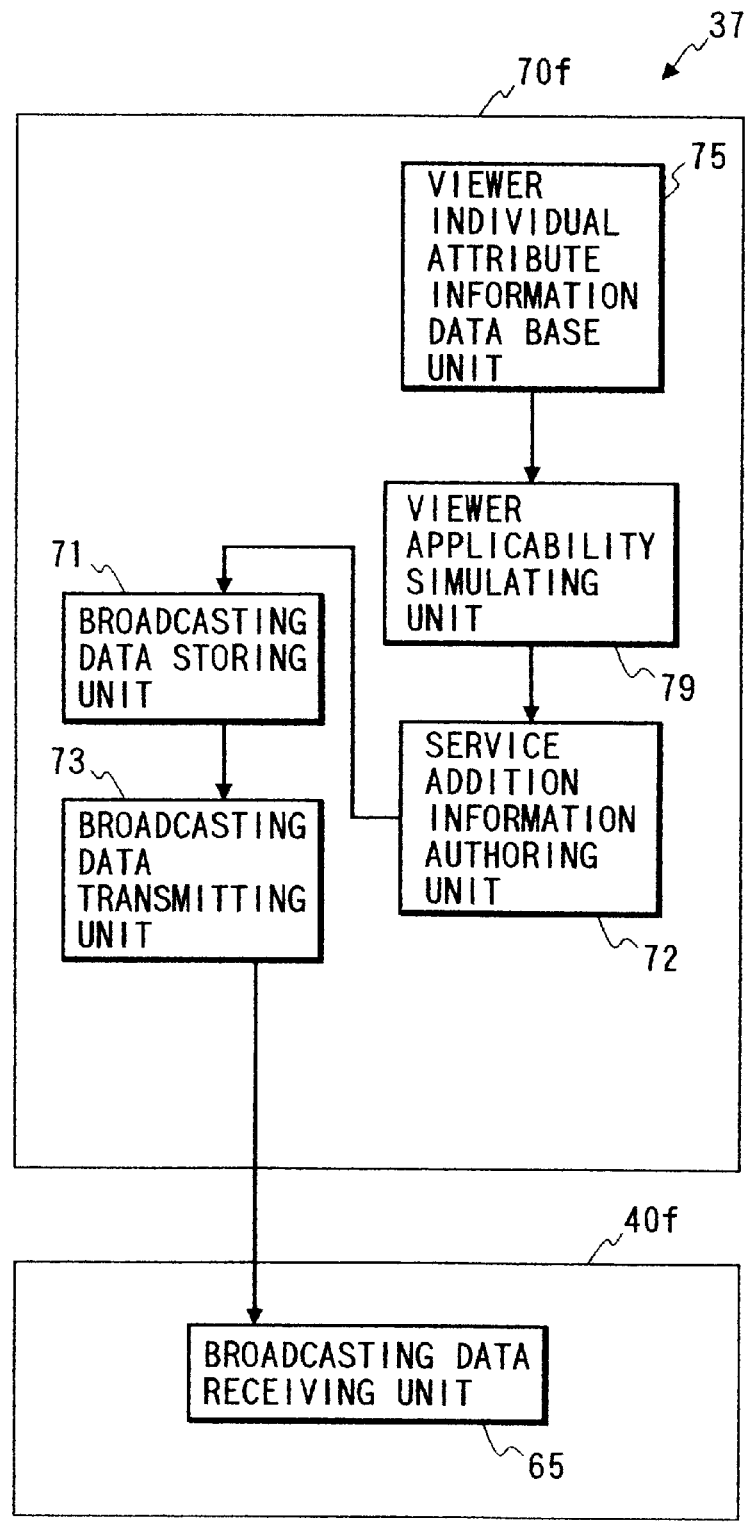
FIG. 27 is a block diagram of a service supply apparatus of a broadcast system according to a sixth embodiment of the present invention.

FIG. 27 is a block diagram of a service supply apparatus of a broadcast system according to a sixth embodiment of the present invention.

As shown in FIG. 27, a broadcast system 37 comprises a service supply apparatus 70f and a plurality of receiving terminal apparatuses 40f.

The service supply apparatus 70f comprises:

the viewer individual attribute information data base unit 75 for holding and managing the viewer individual attribute information transmitted from each of the receiving terminal apparatuses 40f, the viewer applicability simulating unit 79 for preparing provisional mail receiving viewer condition information indicating a provisional attribute condition required of viewers planned to receive the electronic direct mail, simulating a viewer applicability of each viewer for the electronic direct mail by collating the provisional attribute condition with the viewer individual attribute information managed in the viewer individual attribute information data base unit 75, specifying provisional viewers on condition that the viewer applicability of each provisional viewer for the electronic direct mail exceeds a prescribed value, and finally preparing the mail receiving viewer condition information indicating the attribute condition required of particular viewers planned to receive the electronic direct mail on condition that the viewer applicability of each particular viewer for the electronic direct mail exceeds the prescribed value and a group of the particular viewers is appropriate for the transmission of the electronic direct mail, the service addition information authoring unit 72 for preparing service addition information Isa of the electronic direct mail while adding the mail receiving viewer condition information to the service addition information Isa as condition information Isa5, the broadcasting data storing unit 71 for storing contents of the electronic direct mail and the service addition information Isa of the electronic direct mail prepared in the service addition information authoring unit 72 as broadcasting data, and the broadcasting data transmitting unit 73 for transmitting the broadcasting data stored in the broadcasting data storing unit 71 to the plurality of receiving terminal apparatuses 40f.

Figure 28:
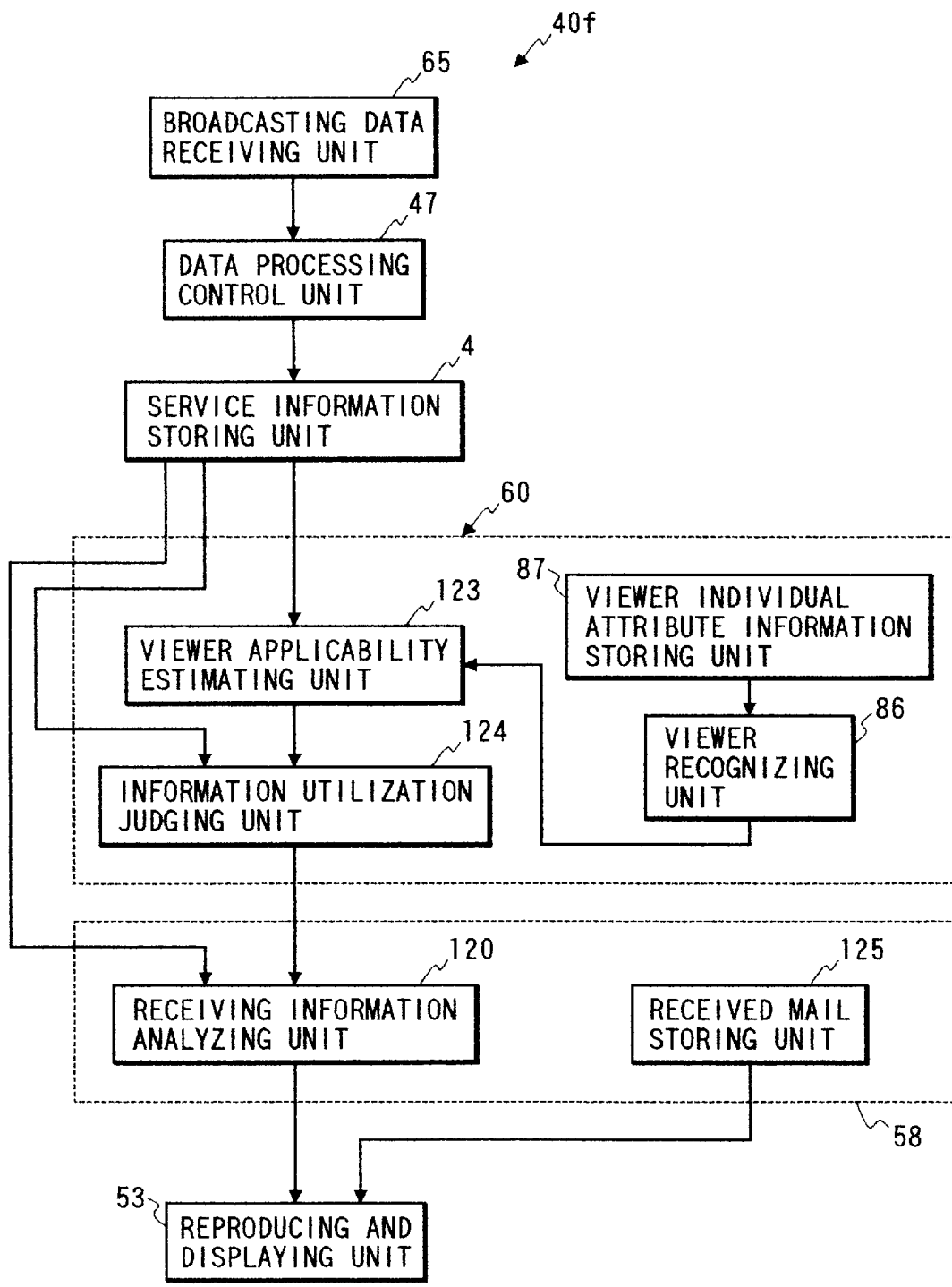
FIG. 28 is a block diagram of a receiving terminal apparatus of the broadcast system according to the sixth embodiment of the present invention.

FIG. 28 is a block diagram of a receiving terminal apparatus 40f of the broadcast system according to the sixth embodiment of the present invention.

As shown in FIG. 28, each receiving terminal apparatus 40f utilized by a viewer comprises:

the broadcasting data receiving unit 65 for receiving the broadcasting data composed of the electronic direct mail and the service addition information Isa of the electronic direct mail;

the data processing control unit 47 for analyzing the broadcasting data received by the broadcasting data receiving unit 65 and separating the service addition information Isa from the broadcasting data;

the service information storing unit 4 for storing the electronic direct mail and the service addition information Isa obtained in the data processing control unit 47;

the attribute information storing and managing unit 60 for judging whether or not the reception of the electronic direct mail is performed, according to the mail receiving viewer condition information included in the service addition information Isa and the personal attribute of the viewer;

the service performing unit 58 for receiving and storing the electronic direct mail in cases where it is judged by the attribute information storing and managing unit 60 that the reception of the electronic direct mail is performed; and the reproducing and displaying unit 53 for displaying information indicating the reception of the electronic direct mail in cases where it is judged by the attribute information storing and managing unit 60 that the reception of the electronic direct mail is performed and displaying the electronic direct mail when the viewer desires to read the electronic direct mail.

The attribute information storing and managing unit 60 comprises the viewer individual attribute information storing unit 87 for storing viewer individual attribute information generally classified into viewer identification information, terminal identification information, female or male identification information, age identification information, living area identification information, occupation identification information, married or unmarried identification information, taste (or hobby)

identification information, life style (morning person or night bird) identification information and the like, the viewer attribute recognizing unit 86 for recognizing personal attributes (for example, a taste and fixed attributes such as sex, an age and a living area) of the viewer according to viewer individual attribute information stored in the viewer individual attribute information storing unit 87, the viewer applicability estimating unit 123 for estimating a viewer applicability of the viewer for the electronic direct mail stored in the service information storing unit 4 by collating the personal attributes of the viewer recognized by the viewer attribute recognizing unit 86 with the viewer condition indicated by the mail receiving viewer condition information included in the service addition information Isa, and the information utilization judging unit 124 for judging that the reception of the electronic direct mail is performed in cases where the viewer applicability obtained in the viewer applicability estimating unit 123 exceeds a prescribed value and extracting the service addition information Isa from the service information storing unit 4.

The service performing unit 58 comprises the receiving information analyzing unit 120 for analyzing the service addition information Isa transmitted from the information utilization judging unit 124 and extracting the electronic direct mail from the service information storing unit 4 in cases where the service addition information Isa indicates the transmission of the electronic direct mail, and a received mail storing unit 125 for storing the electronic direct mail received from the receiving information analyzing unit 120.

Contents of the electronic direct mail stored in the received mail storing unit 125 is displayed in the reproducing and displaying unit 53 when the viewer desires the display of the electronic direct mail.

In the above configuration, an electronic mail transmitting operation is described.

In cases where a mail supplier desires to send a particular electronic direct mail to a group of particular viewers not specified, the particular electronic direct mail is stored in the broadcasting data storing unit 71, and service addition information Isa indicating an attribute of the particular electronic direct mail is prepared and attached to the particular electronic direct mail. In this case, a condition required for the particular viewers is prepared in the viewer applicability simulating unit 79. That is, a viewer applicability of each viewer for the particular electronic direct mail is simulated by collating the condition for viewers receiving the particular electronic direct mail with the viewer individual attribute information managed in the viewer individual attribute information data base unit 75, and mail receiving viewer condition information indicating an optimum condition for the particular viewers receiving the particular electronic direct mail is prepared.

For example, in cases where the mail receiving viewer condition information indicates attributes "female" and "20s in age" and a simulation result indicates that the number of particular viewers having high viewer applicability is thirty thousands, it is judged that the collection of viewing records for the particular electronic direct mail from the group of particular viewers is not adequate because it is impossible to process the viewing records collected from the group of particular viewers. In this case, an attribute such as "Tokyo metropolis residents" is added to the mail receiving viewer condition information to reduce the number of particular viewers having high viewer applicability. Therefore, because a simulation result indicates that the number of particular viewers having high viewer applicability is, for example, eight thousands, it is judged that the collection of viewing records from the group of particular viewers is most adequate. Therefore, mail receiving viewer condition information indicating attributes "female", "20s in age" and "Tokyo metropolis residents" is prepared in the viewer applicability simulating unit 79. In this example, fixed attributes such as sex, age and region are utilized. However, taste information presumed from past viewing records of the viewer is included in the mail receiving viewer condition information. For example, it is applicable that the mail receiving viewer condition information indicate an attribute such as a baseball fan or a soccer fan.

Thereafter, the mail receiving viewer condition information indicating attributes such as "female", "20s in age" and "Tokyo metropolis residents" is added to the service addition information Isa as attribute information Isa5 in the service addition information authoring unit 72. Also, electronic direct mail identification information is added to the service addition information Isa as attribute information Isa5 in the service addition information authoring unit 72 to identify the particular electronic direct mail. Thereafter, the service addition information Isa and the particular electronic direct mail are transmitted to a plurality of receiving terminal apparatuses of unspecified viewers.

Next, an electronic mail receiving operation performed in each receiving terminal apparatus 40f is described.

Figure 29:
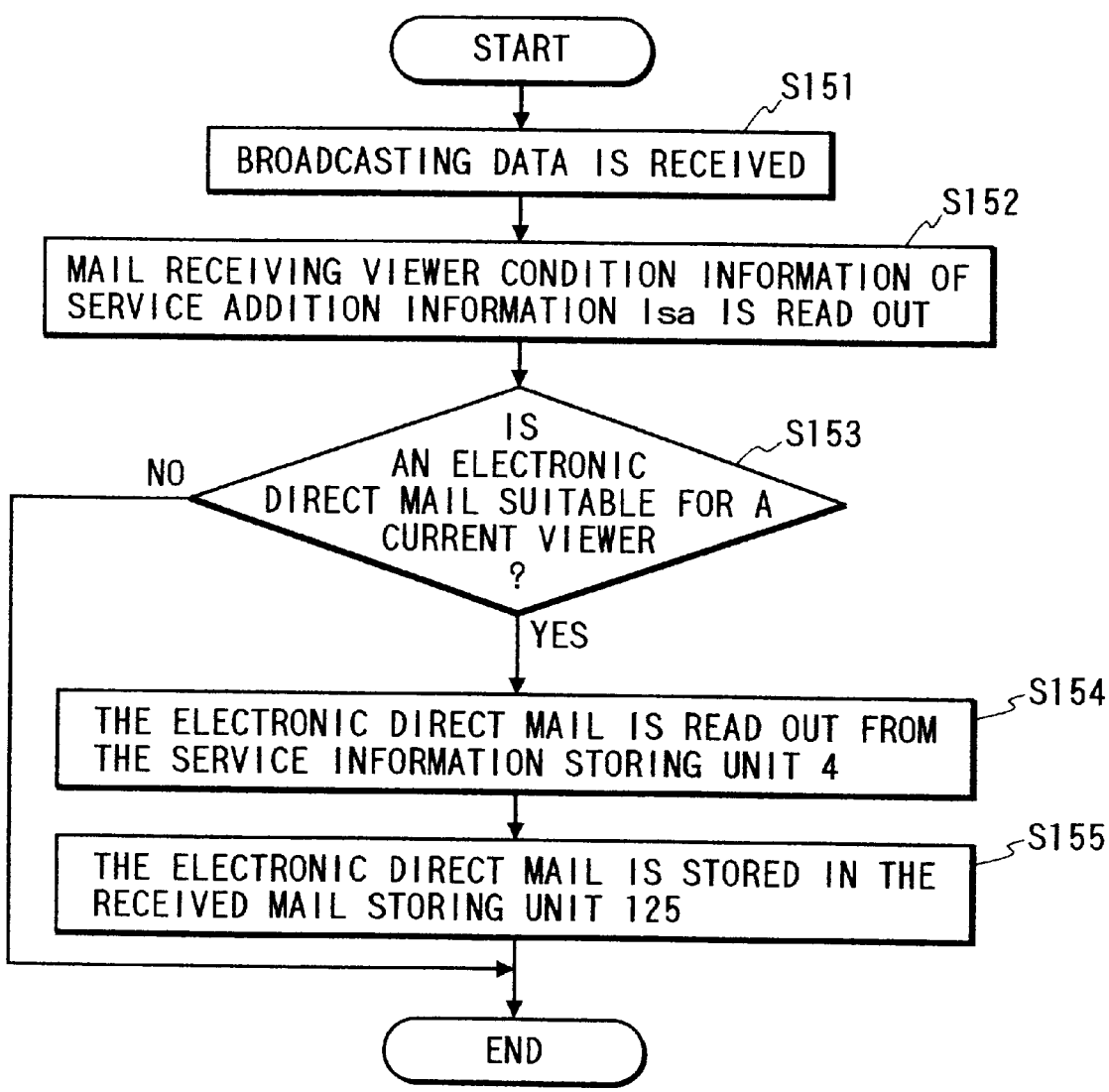
FIG. 29 is a flow chart of an electronic mail receiving operation performed in one receiving terminal apparatus while checking whether or not a particular electronic direct mail transmitted from the service supply apparatus is suitable for a current viewer of the receiving terminal apparatus.

FIG. 29 is a flow chart of an electronic mail receiving operation performed in one receiving terminal apparatus 40f while checking whether or not the particular electronic direct mail transmitted from the service supply apparatus 70f is suitable for a current viewer of the receiving terminal apparatus 40f.

As shown in FIG. 29, when the broadcasting data transmitted from the service supply apparatus 70f is received in the broadcasting data receiving unit 65 (step 151), the service addition information Isa is extracted from the broadcasting data, and the service addition information Isa and the particular electronic direct mail are stored in the service information storing unit 4. Thereafter, the mail receiving viewer condition information of the service addition information Isa is read out from the storing unit 4 and is transmitted to the viewer applicability estimating unit 123 (step 152), the personal attributes of the current viewer recognized by the viewer attribute recognizing unit 86 are collated with the viewer condition indicated by the mail receiving viewer condition information, and a viewer applicability of the current viewer for the particular electronic direct mail is estimated. Thereafter, the viewer applicability is transmitted to the information utilization judging unit 124, and it is judged by the information utilization judging unit 124 whether or not the particular electronic direct mail is suitable for the current viewer (step 153). In cases where the viewer applicability obtained in the viewer applicability estimating unit 123 exceeds a prescribed value (for example, 60% or 80%), it is judged that the particular electronic direct mail is suitable for the current viewer because the current viewer is one of the particular viewers, the service addition information Isa is extracted from the service information storing unit 4 and is transmitted to the receiving information analyzing unit 120. In the unit 120, the service addition information Isa is analyzed to obtain the electronic direct mail identification information, and the particular electronic direct mail is read out from the service information storing unit 4 in cases where the electronic direct mail identification information indicates the transmission of the particular electronic direct mail (step 154). Thereafter, the particular electronic direct mail is stored in the received mail storing unit 125 (step 155), and information indicating the reception of the particular electronic direct mail is displayed in the reproducing and displaying unit 53. Thereafter, when the viewer desires to read the particular electronic direct mail, the particular electronic direct mail is reproduced and displayed in the reproducing and displaying unit 53.

In contrast, it is judged by the information utilization judging unit 124 that the particular electronic direct mail is not suitable for the current viewer (step 153), the electronic mail receiving operation for the particular electronic direct mail is finished.

Accordingly, even though a group of the particular viewers is not specified, because the condition required for the particular viewers is specified, the particular electronic direct mail can be transmitted to the particular viewers. For example, even though an electronic direct mail in which the advertisement of a baby's diaper is written is transmitted to an unmarried person, the advertisement of a baby's diaper is useless. Therefore, in cases where mail receiving viewer condition information indicating attributes "married female", "with kid" and "baby" as a condition for a viewer is added to service addition information Isa of a particular electronic direct mail and the particular electronic direct mail is transmitted to a plurality of viewers with the service addition information Isa, the particular electronic direct mail is received by a plurality of particular viewers satisfying the condition "married female", "with kid" and "baby".

Also, in cases where a fee for the transmission of a electronic direct mail is determined by the number of viewers who receive the electronic direct mail, because the number of viewers receiving the electronic direct mail is reduced by using the broadcast system in this embodiment, the broadcast system in this embodiment is useful.

Also, it is applicable that the reception of the electronic direct mail be counted as a viewing record and the viewing record be transmitted to the service supply apparatus 70*f* in the same manner as in the fifth embodiment.

(Seventh Embodiment)

In this embodiment, a questionnaire and service addition information Isa indicating an attribute of the questionnaire are transmitted from a service supply apparatus functioning as a questionnaire supply apparatus to a plurality of receiving terminal apparatuses, the reception of the questionnaire is judged in the receiving terminal apparatuses according to the service addition information Isa, and the questionnaire is received by particular receiving terminal apparatuses of particular viewers.

Figure 30:
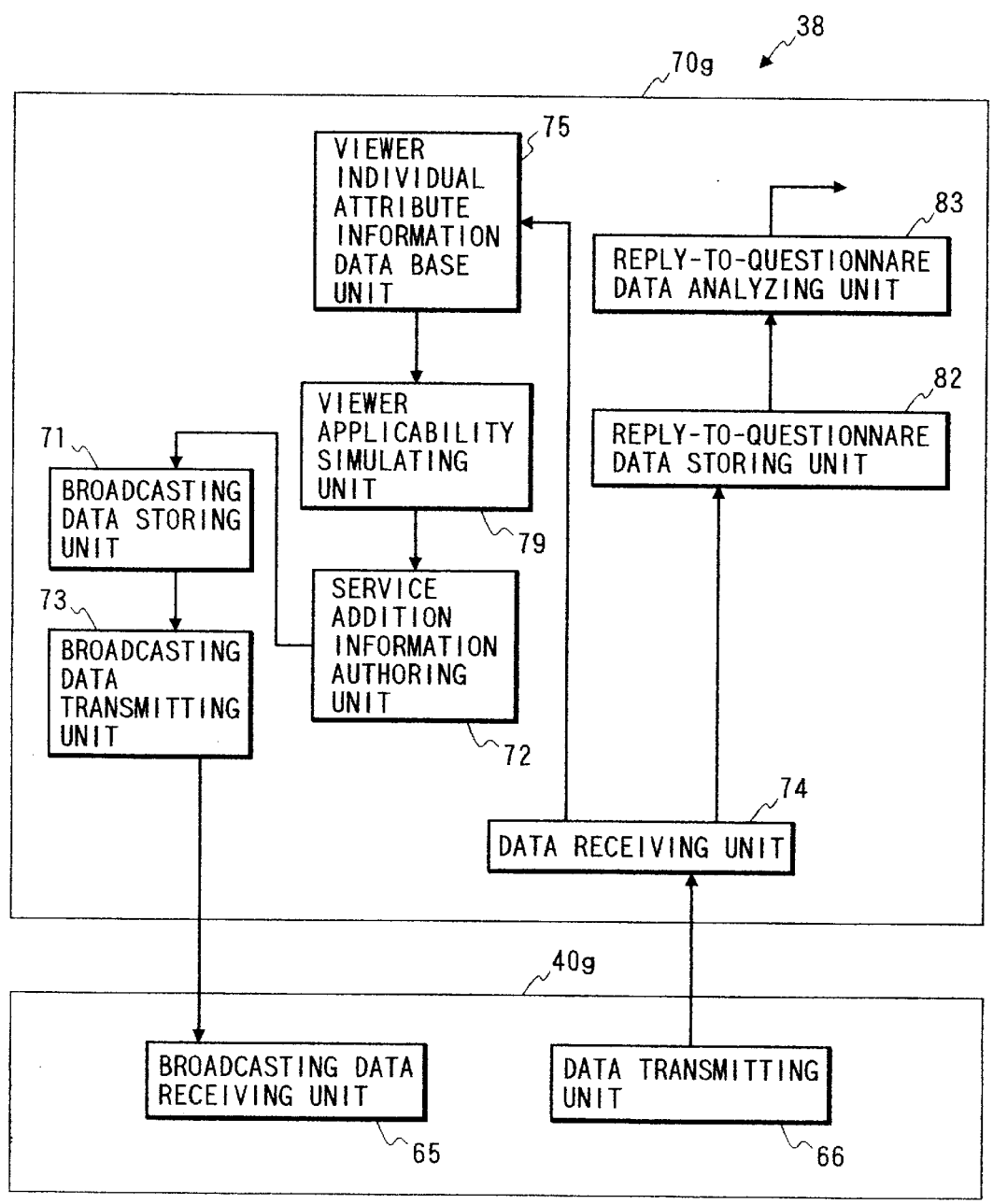
FIG. 30 is a block diagram of a service supply apparatus of a broadcast system according to a seventh embodiment of the present invention.

FIG. 30 is a block diagram of a service supply apparatus of a broadcast system according to a seventh embodiment of the present invention.

As shown in FIG. 30, a broadcast system 38 comprises a service supply apparatus 70*g* and a plurality of receiving terminal apparatuses 40*g*.

The service supply apparatus 70*g* comprises:
the data receiving unit 74 for receiving viewer individual attribute information and a reply to a questionnaire from each of the receiving terminal apparatuses 40*e*, a reply-to-questionnaire data storing unit 82 for storing the replies to the questionnaire for the viewers as reply-to-questionnaire data, a reply-to-questionnaire data analyzing unit 83 for analyzing the reply-to-questionnaire data stored in the reply-to-questionnaire data storing unit 82 to obtain a result of the questionnaire, the viewer individual attribute information data base unit 75 for holding and managing the viewer individual attribute information transmitted from each of the receiving terminal apparatuses 40*g*, the viewer applicability simulating unit 79 for provisionally preparing questionnaire receiving viewer condition information indicating a condition for viewers receiving a questionnaire, simulating a viewer applicability of each viewer for the questionnaire by collating the condition for viewers receiving the questionnaire with the viewer individual attribute information managed in the viewer individual attribute information data base unit 75 and finally preparing questionnaire receiving viewer condition information indicating an optimum condition for viewers receiving the questionnaire, the service addition information authoring unit 72 for preparing service addition information Isa of the questionnaire while adding the questionnaire receiving viewer condition information, questionnaire content information, reply-to-questionnaire collection schedule information, access point information and questionnaire identification information to the service addition information Isa as condition information Isa5, the broadcasting data storing unit 71 for storing the questionnaire and the service addition information Isa of the questionnaire prepared in the service addition information authoring unit 72 as broadcasting data, and the broadcasting data transmitting unit 73 for transmitting the broadcasting data stored in the broadcasting data storing unit 71 to the plurality of receiving terminal apparatuses 40*g*.

Figure 31:
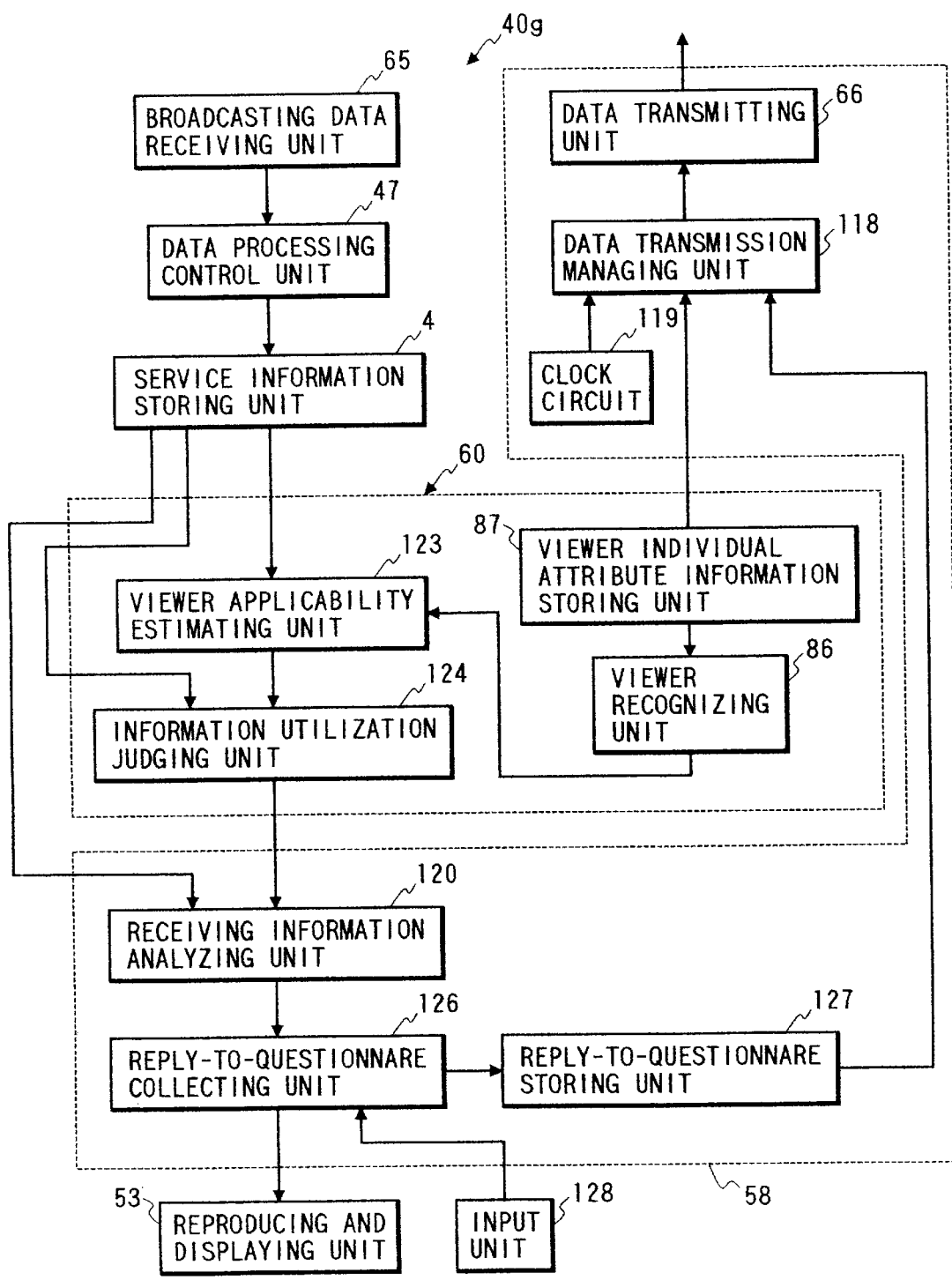
FIG. 31 is a block diagram of a receiving terminal apparatus of the broadcast system according to the seventh embodiment of the present invention.

FIG. 31 is a block diagram of the receiving terminal apparatus 40*g* of the broadcast system according to the seventh embodiment of the present invention.

As shown in FIG. 31, each receiving terminal apparatus 40*g* utilized by a current viewer comprises:
the broadcasting data receiving unit 65 for receiving the broadcasting data composed of the questionnaire and the service addition information Isa of the questionnaire;

the data processing control unit 47 for analyzing the broadcasting data received by the broadcasting data receiving unit 65 and separating the service addition information Isa from the broadcasting data;

the service information storing unit 4 for storing the questionnaire and the service addition information Isa obtained in the data processing control unit 47;

the attribute information storing and managing unit 60 for judging whether or not the reception of the questionnaire is performed, according to the questionnaire receiving viewer condition information included in the service addition information Isa and the personal attribute of the current viewer;

the service performing unit 58 for receiving and storing the questionnaire in cases where it is judged by the attribute information storing and managing unit 60 that the reception of the questionnaire is performed;

the reproducing and displaying unit 53 for displaying the questionnaire for the current viewer to fill out the questionnaire in cases where it is judged by the attribute information storing and managing unit 60 that the reception of the questionnaire is performed; and an input unit 128 for inputting a reply to the questionnaire as reply-to-questionnaire data.

The remote control pad 55 or the keyboard 56 is used as the input unit 128.

The attribute information storing and managing unit 60 comprises the viewer individual attribute information storing unit 87 for storing viewer individual attribute information generally classified into viewer identification information, terminal identification information, female or male identification information, age identification information, living area identification information, occupation identification information, married or unmarried identification information, taste (or hobby) identification information, life style (morning person or night bird) identification information and the like, the viewer attribute recognizing unit 86 for recognizing personal attributes (for example, a taste and fixed attributes such as sex, an age and a living area) of the viewer according to viewer individual attribute information stored in the viewer individual attribute information storing unit 87, the viewer applicability estimating unit 123 for estimating a viewer applicability of the viewer for the questionnaire stored in the service information storing unit 4 by collating the personal attributes of the viewer recognized by the viewer attribute recognizing unit 86 with the viewer condition indicated by the questionnaire receiving viewer condition information included in the service addition information Isa, and the information utilization judging unit 124 for judging that the reception of the questionnaire is performed in cases where the viewer applicability obtained in the viewer applicability estimating unit 123 exceeds a prescribed value and extracting the service addition information Isa from the service information storing unit 4.

The service performing unit 58 comprises the receiving information analyzing unit 120 for analyzing the service addition information Isa transmitted from the information utilization judging unit 124 to check whether or not the questionnaire identification information indicating the transmission of the questionnaire exists in the service addition information Isa, obtaining the questionnaire from the service information storing unit 4 in cases where the transmission of the questionnaire is ascertained and outputting the questionnaire and the service addition information Isa, a reply-to-questionnaire collecting unit 126 for receiving the questionnaire and the service addition information Isa from the receiving information analyzing unit 120, sending contents of the questionnaire to the reproducing and displaying unit 53, receiving the reply-to-questionnaire data from the input unit 128, collecting the reply-to-questionnaire collection schedule information, the access point information and the questionnaire identification information from the service addition information Isa and collecting the viewer identification information and the terminal identification information from the viewer individual attribute information storing unit 87, a reply-to-questionnaire storing unit 127 for storing the reply-to-questionnaire data, the reply-to-questionnaire collection schedule information, the access point information, the questionnaire identification information, the terminal identification information and the viewer identification information collected in the reply-to-questionnaire collecting unit 126, the data transmitting unit 66 for transmitting the reply-to-questionnaire data, the reply-to-questionnaire collection schedule information, the access point information, the questionnaire identification information, the terminal identification information and the viewer identification information stored in the reply-to-questionnaire storing unit 127 and transmitting the viewer individual attribute information stored in the viewer individual attribute information storing unit 87, the data transmission managing unit 118 for managing the transmission of the information performed by the data transmitting unit 66, and the clock circuit 119.

In the above configuration, a questionnaire transmitting operation is described.

In cases where a questionnaire supplier desires to send a particular questionnaire to a group of particular viewers not specified, the particular questionnaire is stored in the broadcasting data storing unit 71, and service addition information Isa indicating an attribute of the questionnaire is prepared and attached to the particular electronic direct mail. In this case, a condition required for the particular viewers is prepared in the viewer applicability simulating unit 79. That is, a viewer applicability of each viewer for the particular questionnaire is simulated by collating the condition for viewers receiving the particular questionnaire with the viewer individual attribute information managed in the viewer individual attribute information data base unit 75, and questionnaire receiving viewer condition information indicating an optimum condition for the particular viewers receiving the particular questionnaire is prepared.

For example, in cases where the questionnaire receiving viewer condition information indicates attributes "female" and "20s in age" and a simulation result obtained in the simulating unit 79 indicates that the number of particular viewers having high viewer applicability is thirty thousands, it is judged that the collection of replies to the questionnaire (reply-to-questionnaire data) from the group of particular viewers is not adequate because it is impossible to process the reply-to-questionnaire data collected from the group of particular viewers. In this case, an attribute such as "Tokyo metropolis residents" is added to the questionnaire receiving viewer condition information to reduce the number of particular viewers having high viewer applicability. Therefore, because a simulation result indicates that the number of particular viewers having high viewer applicability is, for example, eight thousands, it is judged that the collection of reply-to-questionnaire data from the group of particular viewers is most adequate. Therefore, questionnaire receiving viewer condition information indicating attributes "female", "20s in age" and "Tokyo metropolis residents" is prepared in the viewer applicability simulating unit 79. In this example, fixed attributes such as sex, age and region are utilized. However, taste information presumed from past viewing records of the viewer is included in the questionnaire receiving viewer condition information. For example, it is applicable that the questionnaire receiving viewer condition information indicate an attribute such as a baseball fan or a soccer fan.

Thereafter, the questionnaire receiving viewer condition information indicating attributes such as "female", "20s in age" and "Tokyo metropolis residents" is added to the service addition information Isa as attribute information Isa5 in the service addition information authoring unit 72. Also, questionnaire content information, reply-to-questionnaire collection schedule information, access point information and questionnaire identification information are added to the service addition information Isa as attribute information Isa5 in the service addition information authoring unit 72. Thereafter, the service addition information Isa and the particular questionnaire are transmitted to a plurality of receiving terminal apparatuses 40g of unspecified viewers.

Next, the setting of a reply-to-questionnaire collection schedule is described.

The reply-to-questionnaire collection schedule information included in the service addition information Isa indicates a transmitting time to transmit a reply-to-questionnaire of a current viewer for the particular questionnaire stored in the reply-to-questionnaire storing unit 127 to the service supply apparatus 70g according to the terminal identification information of the current viewer. For example, in cases where the reply-to-questionnaire collection schedule information indicates a time 20:00, when a tail number of the terminal identification information of the current viewer is "1", the reply-to-questionnaire of the current viewer for the particular questionnaire is transmitted during a time interval between 20:00 and 20:05. Also, when a tail number of the terminal identification information of the current viewer is "2", the reply-to-questionnaire of the current viewer for the particular questionnaire is transmitted during a time interval between 20:05 and 20:10.

Accordingly, because the reply-to-questionnaire transmitting time is set according to the reply-to-questionnaire collection schedule information relating to the particular questionnaire and the terminal identification information relating to the current viewer, the reply-to-questionnaire transmitting time for the particular questionnaire can be set for each viewer. Therefore, it is prevented that a large number of reply-to-questionnaire of a large number of viewers are simultaneously transmitted to the service supply apparatus 70g.

Also, in the same manner, an access point for each questionnaire can be set for each viewer according to the access point information and the terminal identification information. Therefore, a reply-to-questionnaire transmitted from a particular receiving terminal apparatus 40g indicated by a particular access point is received by a particular service supply apparatus 70g indicated by the same particular access point and is not received by a service supply apparatus 70g indicated by a different access point. Also, an access point can be set according to viewer individual attribute information of one viewer stored in the viewer individual attribute information storing unit 87 for each viewer. For example, in cases where an access point is set according to region information stored in the viewer individual attribute information storing unit 87, a plurality of viewers living in the same region have the same access point. Therefore, in cases where the whole nation is divided into ten ares (first area to tenth area), reply-to-questionnaire of each of a plurality of viewers living in a first area is received by a service supply apparatus 70g placed in the same first area, and a group of reply-to-questionnaire of other viewers not living in the first area is not received by the service supply apparatus 70g placed in the first area. Accordingly, reply-to-questionnaire of a large number of viewers can be uniformly distributed to a plurality of service supply apparatuses 70g.

Next, a questionnaire receiving operation performed in each receiving terminal apparatus 40g is described.

Figure 32:
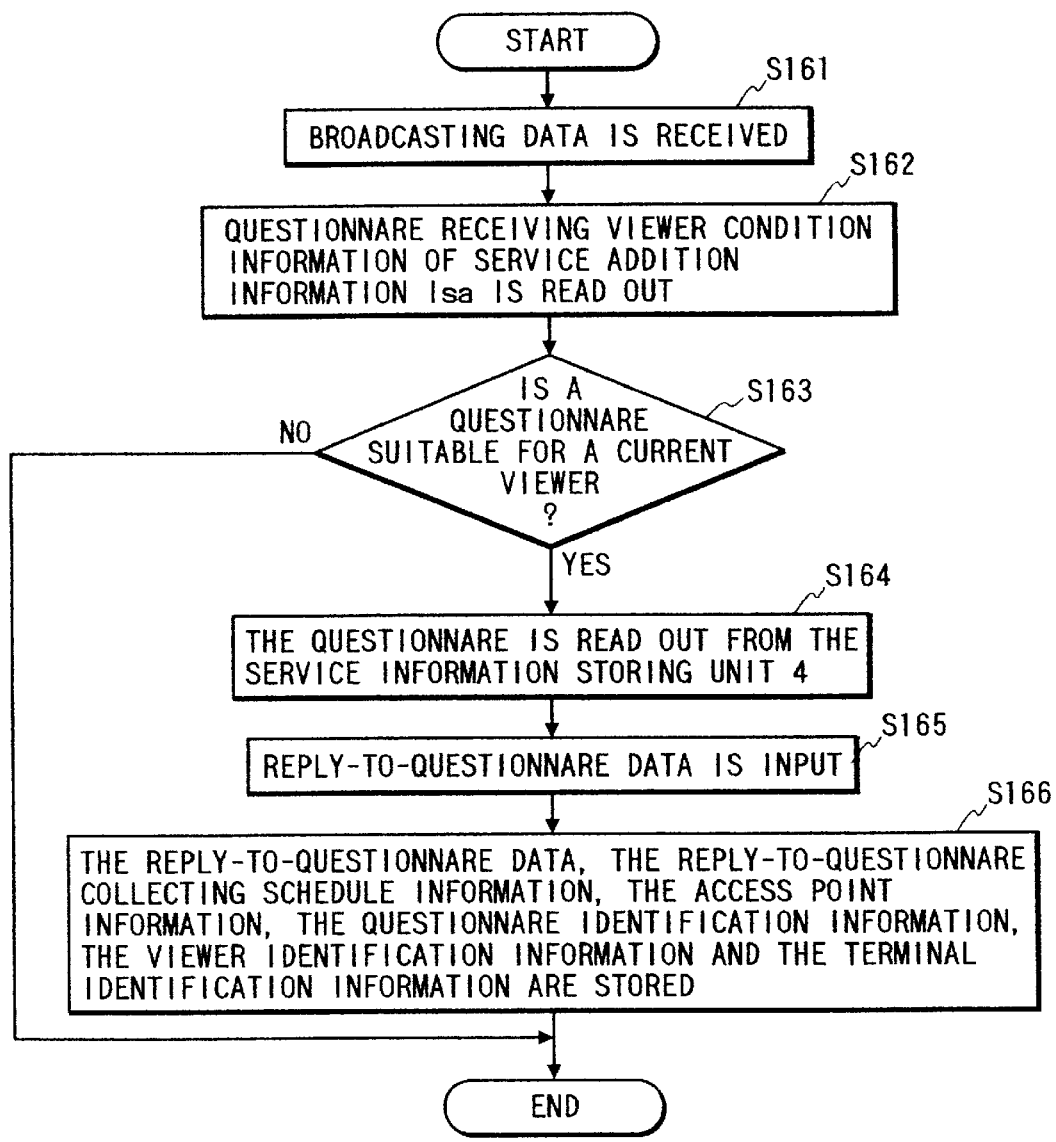
FIG. 32 is a flow chart of an questionnaire receiving operation performed in one receiving terminal apparatus while checking whether or not a particular questionnaire transmitted from the service supply apparatus is suitable for a current viewer of the receiving terminal apparatus.

FIG. 32 is a flow chart of an questionnaire receiving operation performed in one receiving terminal apparatus 40g while checking whether or not a particular questionnaire transmitted from the service supply apparatus 70g is suitable for a current viewer of the receiving terminal apparatus 40g.

As shown in FIG. 32, when the broadcasting data transmitted from the service supply apparatus 70g is received in the broadcasting data receiving unit 65 of one receiving terminal apparatus 40g of a current viewer (step 161), the service addition information Isa is extracted from the broadcasting data, and the service addition information Isa and the particular questionnaire are stored in the service information storing unit 4. Thereafter, the questionnaire receiving viewer condition information added to the service addition information Isa is read out from the service information storing unit 4 and is transmitted to the viewer applicability estimating unit 123 (step 162), the personal attributes of the current viewer recognized by the viewer attribute recognizing unit 86 are collated with the viewer condition indicated by the questionnaire receiving viewer condition information, and a viewer applicability of the current viewer for the particular questionnaire is estimated in the viewer applicability estimating unit 123. Thereafter, the viewer applicability is transmitted to the information utilization judging unit 124, and it is judged by the information utilization judging unit 124 whether or not the particular questionnaire is suitable for the current viewer (step 163). In cases where the viewer applicability obtained in the viewer applicability estimating unit 123 exceeds a prescribed value (for example, 60% or 80%), it is judged that the particular questionnaire is suitable for the current viewer because the current viewer is one of the particular viewers, the service addition information Isa is read out from the service information storing unit 4 and is transmitted to the receiving information analyzing unit 120. In the unit 120, the service addition information Isa is analyzed to check whether or not the questionnaire identification information indicating the transmission of the particular questionnaire exists in the service addition information Isa. In cases where the questionnaire identification information exists in the service addition information Isa, the particular questionnaire is read out from the service information storing unit 4, and the service addition information Isa and the particular questionnaire are output to the reply-to-questionnaire collecting unit 126 (step 164). In the unit 126, contents of the particular questionnaire are sent to the reproducing and displaying unit 53. Therefore, the current viewer inputs a reply to the particular questionnaire (or reply-to-questionnaire data) in the input unit 128 to fill out the particular questionnaire (step 165), and the reply-to-questionnaire data is transmitted to the unit 126. Thereafter, the reply-to-questionnaire collection schedule information, the access point information and the questionnaire identification information are collected from the service addition information Isa, and the viewer identification information and the terminal identification information are collected from the viewer individual attribute information storing unit 87. Thereafter, the reply-to-questionnaire data, the reply-to-questionnaire collection schedule information, the access point information, the questionnaire identification information, the viewer identification information and the terminal identification information are stored in the reply-to-questionnaire storing unit 127 (step 166).

In contrast, it is judged by the information utilization judging unit 124 that the particular questionnaire is not suitable for the current viewer (step 163), the questionnaire receiving operation for the particular questionnaire is finished.

Thereafter, when the data transmission managing unit 118 detects according to time information obtained from the clock circuit 119, the reply-to-questionnaire schedule information and the terminal identification information that it comes time to transmit the reply-to-questionnaire data stored in the unit 127, the reply-to-questionnaire data and the viewer individual attribute information are output from the data transmitting unit 66 and are received in a particular service supply apparatus 70g identified by the same access point as that of the receiving terminal apparatus 40g according to the access point information.

Accordingly, because it is prevented according to the reply-to-questionnaire schedule information and the access point information that a large number of reply-to-questionnaire data of a large number of viewers are simultaneously transmitted to the service supply apparatus 70g, the collection of the reply-to-questionnaire data from a plurality of viewers can be efficiently performed.

Thereafter, the pieces of reply-to-questionnaire data and the pieces of viewer individual attribute information output from a plurality of receiving terminal apparatuses 40g are received in the data receiving unit 74 of the particular service supply apparatus 70g. In the particular service supply apparatus 70g, the pieces of viewer individual attribute information are stored in the viewer individual attribute information data base unit 75, and the pieces of reply-to-questionnaire data are stored in the reply-to-questionnaire data storing unit 82. Thereafter, the reply-to-questionnaire data are analyzed in the reply-to-questionnaire data analyzing unit 83, and the questionnaire supplier can obtain a result of the questionnaire.

Accordingly, because the questionnaire is received by only the group of particular viewers, the questionnairing can be efficiently performed.

(Eighth Embodiment)

In this embodiment, viewer individual attribute information for each viewer is generated and managed in a service supply apparatus according to an operation record transmitted from each receiving terminal apparatus.

Figure 33:
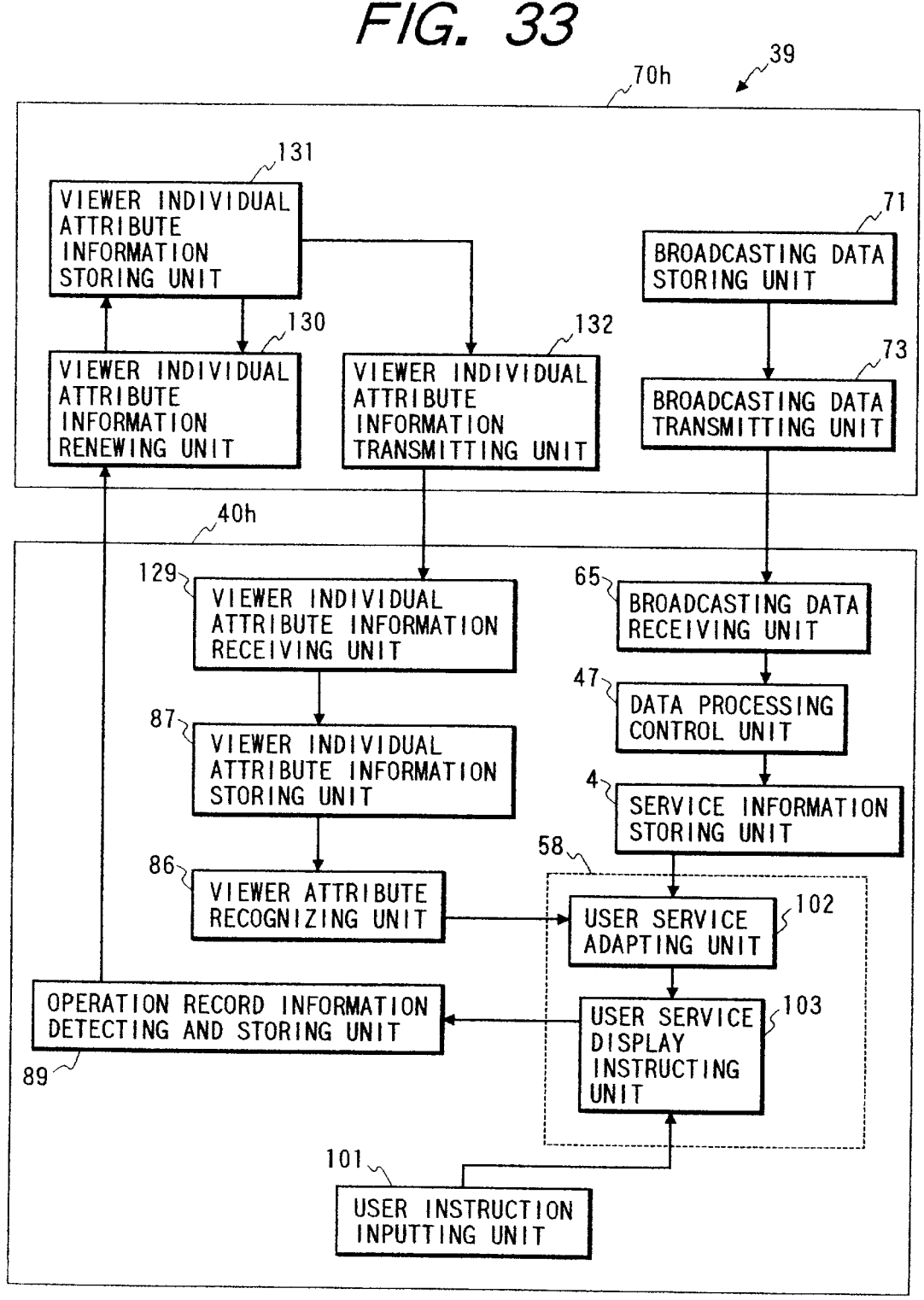
FIG. 33 is a block diagram of a broadcast system according to an eighth embodiment of the present invention.

FIG. 33 is a block diagram of a broadcast system according to an eighth embodiment of the present invention.

As shown in FIG. 33, a broadcast system 39 comprises a service supply apparatus 70h and a plurality of receiving terminal apparatuses 40h.

The service supply apparatus 70h comprises
   the broadcasting data storing unit 71, the broadcasting data transmitting unit 73,
   a viewer individual attribute information storing unit 131 for storing pieces of viewer individual attribute information,
   a viewer individual attribute information renewing unit 130 for receiving an operation record from one receiving terminal apparatuses 40h, generating new viewer individual attribute information from the operation record and adding the new viewer individual attribute information to the pieces of viewer individual attribute information stored in the viewer individual attribute information storing unit 131 to renew the pieces of viewer individual attribute information, and
   a viewer individual attribute information transmitting unit 132 for transmitting the pieces of viewer individual attribute information stored in the viewer individual attribute information storing unit 131.

Each receiving terminal apparatus 40h of a current viewer comprises
   a viewer individual attribute information receiving unit 129 for receiving the pieces of viewer individual attribute information transmitted from the viewer individual attribute information transmitting unit 132,
   the viewer individual attribute information storing unit 87 for storing the pieces of viewer individual attribute information received by the viewer individual attribute information receiving unit 129,
   the viewer attribute recognizing unit 86 for recognizing the personal attributes of the current viewer according to the pieces of viewer individual attribute information stored in the viewer individual attribute information storing unit 87, the broadcasting data receiving unit 65, the data processing control unit 47, the service information storing unit 4,
   the user instruction inputting unit 101 for receiving an instruction input by the current viewer,
   the service performing unit 58 for judging according to the personal attributes of the current viewer and the user's instruction whether or not a service of a particular broadcasting program transmitted from the service supply apparatus 70h is performed and performing the service of the particular broadcasting program to view the particular broadcasting program displayed in the reproducing and displaying unit 53 in cases where it is judged that the service of the particular broadcasting program is performed, and
   the operation record information detecting and storing unit 89 for counting a using number for the particular broadcasting program displayed under the control of the service performing unit 58 for each keyword attached to the particular broadcasting program and storing the using number for each keyword as operation record information.

The remote control pad 55 or the keyboard 56 is used as the user instruction inputting unit 101.

The service performing unit 58 comprises
   the user service adapting unit 102 for estimating an applicability of the user for the particular broadcasting program according to the personal attributes of the user obtained in the viewer attribute recognizing unit 86 and judging according to the applicability whether or not the service of the particular broadcasting program is performed, and
   the user service display instructing unit 103 for instructing the reproducing and displaying unit 53 according to the user's instruction received by the user instruction receiving unit 101 to display the particular broadcasting program when it is judged according to the user service adapting unit 102 that the service of the particular broadcasting program is performed.

In the above configuration of the service supply apparatus 70h and the receiving terminal apparatus 40h, an operation for generating and transmitting viewer individual attribute information is described.

Figure 34:
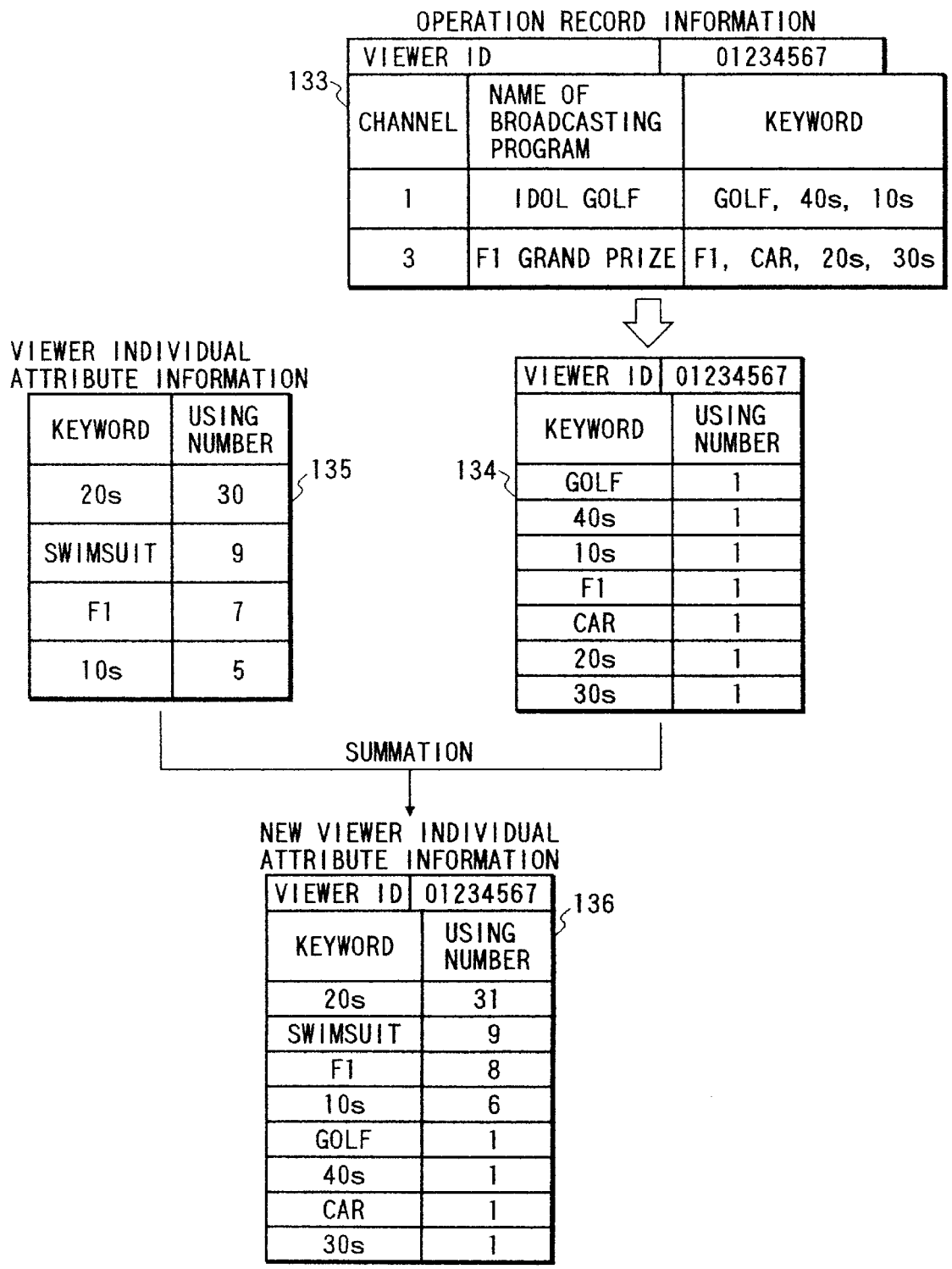
FIG. 34 is an explanatory view showing an operation for renewing viewer individual attribute information stored in a viewer individual attribute information storing unit of a service supply apparatus according to operation record information transmitted from a receiving terminal apparatus.

FIG. 34 is an explanatory view showing an operation for generating viewer individual attribute information according to operation record information transmitted from the receiving terminal apparatus 40h.

In the service supply apparatus 70h, operation record information 133 is transmitted from the operation record information detecting and storing unit 89 to the viewer individual attribute information renewing unit 130. In the operation record information 133, a set of a name of a broadcasting program and one or more particular keywords for the broadcasting program is listed for each channel, and a viewer identification number such as "01234567" is added to a list of the operation record information 133. In the viewer individual attribute information renewing unit 130, the operation record information 133 is transformed into a keyword list 134 in which a set of one particular keyword and a using number set to "1" is listed for each of the particular keywords existing in the operation record information 133. Also, viewer individual attribute information 135 already existing in the viewer individual attribute information storing unit 131 is read out to the viewer individual attribute information renewing unit 130. In the viewer individual attribute information 135, a set of one keyword and a using number for the keyword is listed for each keyword. Thereafter, the viewer individual attribute information 135 is renewed by incrementing the using number for each particular keyword in the viewer individual attribute information 135, and new viewer individual attribute information 136 is generated. Thereafter, the viewer individual attribute information 135 in the viewer individual attribute information storing unit 131 is replaced with new viewer individual attribute information 136, and the viewer individual attribute information 136 is transmitted to the viewer individual attribute information storing unit 87 of the receiving terminal apparatus 40h through the transmitting unit 132 and the receiving unit 129. In the storing unit 87, viewer individual attribute information already stored is replaced with the viewer individual attribute information 136.

For example, as shown in FIG. 35, in cases where viewer individual attribute information 139, in which a set of a keyword and a viewing time for the keyword is listed for each keyword, is transmitted from the service supply apparatus 70 to the receiving terminal apparatus 40h and is stored in the viewer individual attribute information storing unit 87, it is recognized in the viewer attribute recognizing unit 86 that personal attributes of the current viewer are "sports", "drama", "movie" and "news" and a representative personal attribute of the current viewer is "news". Thereafter, when an electronic program guide 137 shown in FIG. 39 is broadcasted from the broadcasting data storing unit 71 of the service supply apparatus 70 to the service performing unit 58 of the receiving terminal apparatus 40 as service addition information Isa, an applicability of the current viewer for each particular keyword listed in the electronic program guide 137 is estimated in the user service adapting unit 102, and particular broadcasting programs relating to the keyword "news" take priority of other broadcasting programs relating to other keywords "sports", "drama" and "movie". Thereafter, a broadcasting program table 138 shown in FIG. 39 is displayed in the reproducing and displaying unit 53 under the control of the user service display instructing unit 103. In the broadcasting program table 138, names of the particular broadcasting programs relating to the keyword "news" are listed in preferentially to names of the other broadcasting programs.

Accordingly, when the user selects a favorite broadcasting program by inputting an instruction indicating the selection of the favorite broadcasting program listed in the broadcasting program table 138 to the user instruction receiving unit 101, because names of the particular broadcasting programs relating to the keyword "news" are listed in preferentially to names of the other broadcasting programs, the current viewer can easily select the favorite broadcasting program.

Also, because the viewer individual attribute information 139 is generated and managed in the service supply apparatus 70h, the generation and management of the viewer individual attribute information 139 is not required for the receiving terminal apparatus 40h. Therefore, a size of the receiving terminal apparatus 40h can be made small.

In this embodiment, the viewer individual attribute information 139 transmitted to the current viewer is generated in the service supply apparatus 70h according to the operation records respectively indicating the selection of one broadcasting program performed by the current viewer. However, because operation records relating to many viewers are transmitted to the service supply apparatus 70h, it is applicable that the viewer individual attribute information 139 relating to many viewers be transmitted to the current viewer.

Also, one viewing time denoting an operation record is listed for each keyword in the viewer individual attribute information 139. However, it is applicable that an operation record indicating how many times each specific broadcasting program listed in an electronic broadcasting program guide is selected by the current viewer be listed as a viewing time in the viewer individual attribute information 139. Also, it is applicable that replies submitted to a questionnaire be used as the viewer individual attribute information 139.

(Ninth Embodiment)

In this embodiment, a taste distribution of all viewers is generated in a service supply apparatus according to operation records transmitted from the viewers, the viewers are classified into a plurality of types of viewers, a particular type of a current viewer is determined according to operation records transmitted from the current viewer, and viewer individual attribute information indicating the particular type of the current viewer is generated and is transmitted to a receiving terminal apparatus of the current viewer.

Figure 36:
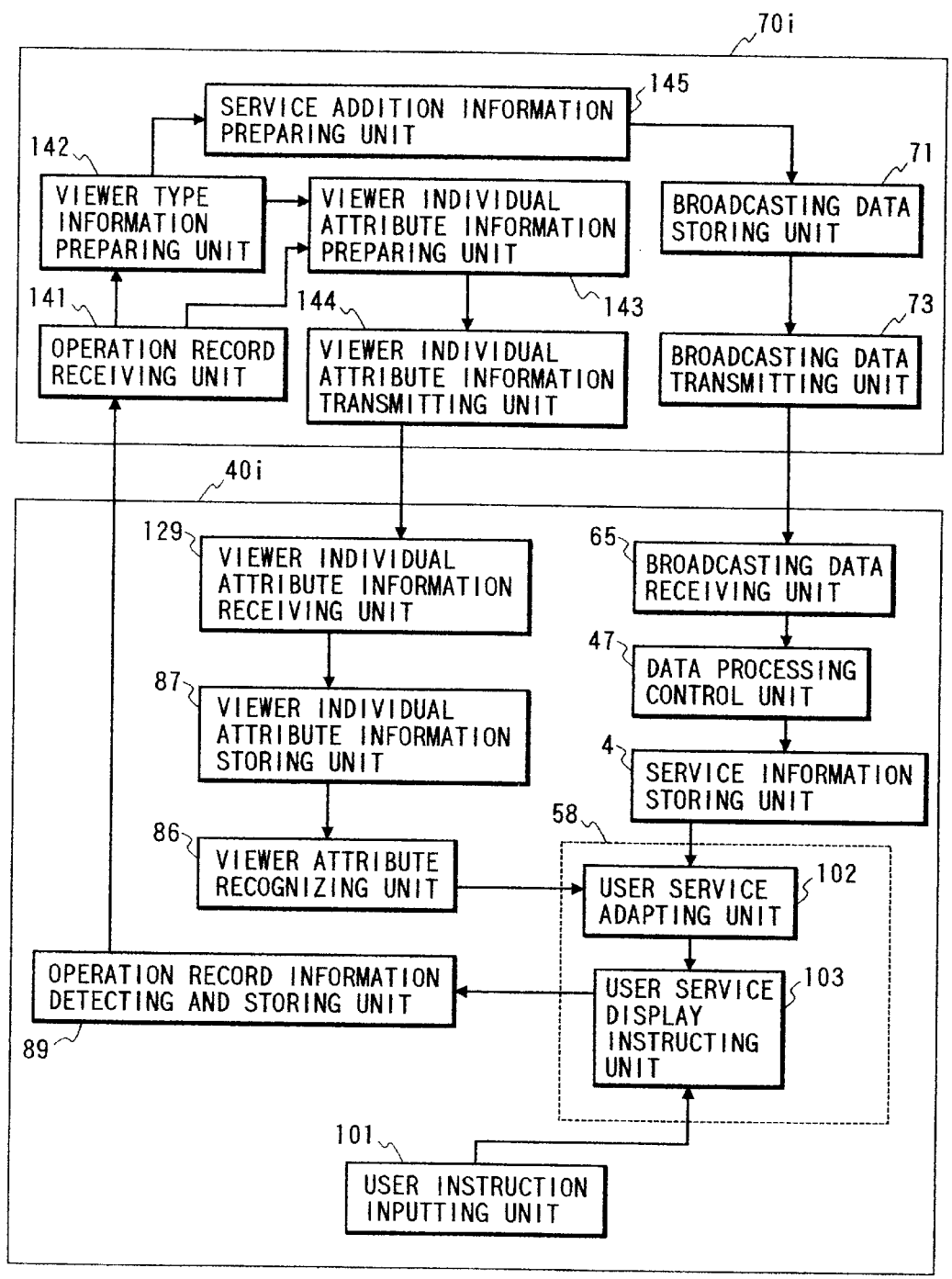
FIG. 36 is a block diagram of a broadcast system according to a ninth embodiment of the present invention.

FIG. 36 is a block diagram of a broadcast system according to a ninth embodiment of the present invention.

As shown in FIG. 36, a broadcast system comprises a service supply apparatus 70i and a plurality of receiving terminal apparatuses 40i.

The service supply apparatus 70i comprises an operation record receiving unit 141 for receiving an operation record indicating an attribute of one viewer from each of viewers, a viewer type information preparing unit 142 for generating a taste (or an attribute) distribution of the viewers from the operation records received by the operation record receiving unit 141 as viewer type information indicating attribute types of the viewers, a viewer individual attribute information preparing unit 143 for determining a taste position indicated by the operation record of one viewer in the taste distribution for each viewer and preparing viewer individual attribute information indicating an attribute type of one viewer according to the taste position of the viewer for each viewer, a viewer individual attribute information transmitting unit 144 for transmitting the viewer individual attribute information of one viewer prepared by the viewer individual attribute information preparing unit 143 to one receiving terminal apparatus 40i of the viewer for each viewer, a service addition information preparing unit 145 for preparing service addition information Isa of a particular broadcasting program according to the viewer type information generated in the viewer type information preparing unit 142 to reflect the tastes of the viewers on the service addition information Isa, the broadcasting data storing unit 71 and the broadcasting data transmitting unit 73.

Each receiving terminal apparatus 40i of a current viewer comprises the viewer individual attribute information receiving unit 129, the viewer individual attribute information storing unit 87, the viewer attribute recognizing unit 86, the broadcasting data receiving unit 65, the data processing control unit 47, the service information storing unit 4, the user instruction inputting unit 101, the service performing unit 58, and the operation record information detecting and storing unit 89.

In the above configuration of the service supply apparatus 70i and the receiving terminal apparatus 40i, an operation for generating and transmitting viewer individual attribute information is described.

When an operation record indicating the selection of a broadcasting program is transmitted from each receiving terminal apparatus 40i to the service supply apparatus 70i, the operation records are received by the operation record receiving unit 141, and a taste distribution is prepared from the operation records as viewer type information in the viewer type information preparing unit 142. Thereafter, a taste position indicated by the operation record of one viewer in the taste distribution is determined for each viewer in the viewer individual attribute information preparing unit 143, and viewer individual attribute information indicating an attribute type of one viewer is prepared according to the taste position of the viewer for each viewer. Thereafter, the viewer individual attribute information of a current viewer is transmitted to the receiving terminal apparatus 40i of the current viewer and is stored in the storing unit 87. Also, service addition information Isa of a particular broadcasting program is prepared according to the viewer type information in the service addition information preparing unit 145 to reflect the tastes of the viewers on the service addition information Isa, and the service addition information Isa and service content information of the particular broadcasting program are transmitted to the receiving terminal apparatus 40i of the current viewer.

Accordingly, because a taste of the current viewer is determined according to the taste distribution of the viewers and is transmitted to the current viewer as the viewer individual attribute information, the selection of a broadcasting program from among a plurality of broadcasting programs according to the personal attributes of the current viewer can be efficiently performed.

Also, because the viewer individual attribute information is generated and managed in the service supply apparatus 70i, the generation and management of the viewer individual attribute information is not required for the receiving terminal apparatus 40i. Therefore, a size of the receiving terminal apparatus 40i can be made small.

Having illustrated and described the principles of the present invention in a preferred embodiment thereof, it should be readily apparent to those skilled in the art that the invention can be modified in arrangement and detail without departing from such principles. We claim all modifications coming within the scope of the accompanying claims.

What is claimed is:

1. A broadcast system comprising a service supply apparatus for supplying service content information of a plurality of broadcasting programs one after another and a receiving terminal apparatus for receiving the service content information of each broadcasting program supplied by the service supply apparatus, the service supply apparatus comprising:

broadcasting data storing means for storing the service content information indicating contents of each of the broadcasting programs as broadcasting data;

service addition information preparing means for preparing service addition information, in which attribute information indicating an attribute of one broadcasting program stored in the broadcasting data storing means and content information indicating contents of an added-service are included as broadcasting data; and broadcasting data transmitting means for transmitting the service content information of each broadcasting program stored in the broadcasting data storing means and the service addition information of the corresponding broadcasting program prepared by the service addition information preparing means, and attribute information storing means for storing viewer attribute information indicating a personal attribute of the viewer;

broadcasting data receiving means for receiving the service content information and the service addition information of the broadcasting program transmitted from the broadcasting data transmitting means of the service supply apparatus;

attribute information collating means for collating the service addition information received by the broadcasting data receiving means with the viewer attribute information stored in the attribute information storing means and judging whether or not the attribute of the service content information of the broadcasting program suits the personal attribute of the viewer; and broadcasting program reproducing means for reproducing the service content information of the broadcasting program received by the broadcasting data receiving means, in cases where it is judged by the attribute information collating means that the attribute of the service content information of the broadcasting program suits the personal attribute of the viewer, and displaying the content information included in the service addition information with the service content information to show the viewer the added-service suiting the viewer.

2. A broadcast system according to claim 1 in which the service content information and the service addition information of the broadcasting program transmitted from the service supply apparatus are received by a plurality of receiving terminal apparatuses of a plurality of viewers, the service supply apparatus further comprises viewer attribute information data base for storing a piece of viewer attribute information transmitted from the attribute information storing means of each of the receiving terminal apparatuses; and service processing means for producing overall viewer attribute information for the viewers from the pieces of viewer attribute information stored in the viewer attribute information data base and selecting a piece of particular service content information of a particular broadcasting program from among the pieces of service content information of the broadcasting programs stored in the broadcasting data storing means, on condition that an attribute of the particular service content information of the particular broadcasting program is most suitable to the overall viewer attribute information, so as to transmit the particular service content information of the particular broadcasting program and particular service addition information of the particular broadcasting program from the broadcasting data transmitting means to each of the receiving terminal apparatuses.

3. A broadcast system according to claim 1 in which the viewer attribute information stored in the attribute information storing means of the receiving terminal apparatus indicates an age of the viewer, the distinction between male and female, a resident district of the viewer, a taste of the viewer, an occupation of the viewer or a life style of the viewer.

4. A broadcast system according to claim 1 in which the service addition information prepared by the service addition information preparing means of the service supply apparatus further includes an age range for the viewer, the distinction between male and female, a resident district of the viewer, tastes of the viewer, an occupation of the viewer or a life style of the viewer.

5. A broadcast system according to claim 1 in which a keyword is attached to each of the broadcasting programs stored in the broadcasting data storing means of the service supply apparatus as the service addition information prepared by the service addition information preparing means to identify a type of each broadcasting program, and the viewer attribute information stored in the attribute information storing means of each receiving terminal apparatus is composed of one keyword and a using number indicating how many times the viewer views one type of broadcasting program to which the keyword is attached.

6. A broadcast system according to claim 1 in which the service addition information prepared by the service addition information preparing means of the service supply apparatus is a coded keyword, and the service content information of the broadcasting program and the coded keyword attached to the broadcasting program are transmitted from the broadcasting data transmitting means.

7. A broadcast system according to claim 5, the service supply apparatus further comprising code table storing means for storing a code table in which a set of a keyword, a code corresponding to the keyword and a using number corresponding to the keyword is registered for each keyword; and keyword coding means for coding the keyword attached to each broadcasting program transmitted by the broadcasting data transmitting means according to the code table stored in the code table storing means by changing the keyword to the code corresponding to the keyword, one using number registered in the code table being incremented each time the keyword corresponding to the using number is coded by the keyword coding means.

8. A broadcast system according to claim 5, the service supply apparatus further comprising code table storing means for storing a code table in which a set of a keyword, a coded keyword corresponding to the keyword and a using number corresponding to the keyword is registered for each keyword;

keyword coding means for inquiring of the code table storing means a particular coded keyword corresponding to a particular keyword which is attached to a particular broadcasting program stored in the broadcasting data storing means of the service supply apparatus and coding the particular keyword to change the particular keyword to the particular coded keyword in cases where the particular coded keyword is registered in the code table, a particular using number corresponding to the particular keyword in the code table being incremented; and code table renewing means for adding a set of the particular keyword, the particular coded keyword and the particular using number set to one to the code table stored in the code table storing means in cases where the particular keyword is not registered in the code table.

9. A broadcast system according to claim 5, the service supply apparatus further comprising code table storing means for storing a code table in which a set of a keyword, a coded keyword corresponding to the keyword and a using number corresponding to the keyword is registered for each keyword;

keyword coding means for coding the keywords attached to the broadcasting programs according to the code table stored in the code table storing means to change the keywords to a plurality of coded keywords, one using number in the code table being incremented each time the keyword corresponding to the using number is coded by the keyword coding means; and code table renewing means for detecting a predetermined number of particular keywords corresponding to particular using numbers, which are smaller than the other using numbers in the code table, from the code table stored in the code table storing means and deleting a plurality of sets corresponding to the particular keywords from the code table.

10. A broadcast system according to claim 1 in which a communication line for the service content information of the broadcasting program transmitted from the broadcasting data transmitting means differs from a communication line for the service addition information transmitted from the broadcasting data transmitting means.

11. A broadcast system according to claim 1 in which the service content information of the broadcasting program transmitted from the broadcasting data transmitting means is sent to the receiving terminal apparatus on an image channel broadcast, and the service addition information transmitted from the broadcasting data transmitting means is sent to the receiving terminal apparatus through a two-way data communication line.

12. A broadcast system according to claim 1 in which the content information of the service addition information prepared by the service addition information preparing means is superimposed on the service content information of the broadcasting program digitalized by the broadcasting data transmitting means and is sent with the service content information of the broadcasting program through the same communication path.

13. A broadcast system according to claim 1 in which the service content information of the broadcasting program transmitted from the broadcasting data transmitting means is sent on analog-broadcast, and the service addition information transmitted from the broadcasting data transmitting means is sent on digital-broadcast.

14. A broadcast system according to claim 1 in which a keyword is attached to each of a plurality of broadcasting programs stored in the broadcasting data storing means of the service supply apparatus as the service addition information prepared by the service addition information preparing means to identify a type of each broadcasting program, a set of one keyword and a using number indicating how many times the current viewer views one type of broadcasting program to which the keyword is attached is listed for each keyword as the viewer attribute information stored in the attribute information storing means, the receiving terminal apparatus further comprises:

operation record storing means for detecting the reproduction of one broadcasting program performed by the broadcasting program reproducing means and storing an operation record composed of one particular keyword attached to the broadcasting program and one using number set to one, a particular using number corresponding to the particular keyword listed as the viewer attribute information of the attribute information storing means being incremented according to the operation record.

15. A broadcast system according to claim 1 in which a keyword is attached to each of a plurality of broadcasting programs stored in the broadcasting data storing means of the service supply apparatus as the service addition information prepared by the service addition information preparing means to identify a type of each broadcasting program, a set of one keyword and a using number indicating how many times the current viewer views one type of broadcasting program to which the keyword is attached is listed for each keyword as the viewer attribute information stored in the attribute information storing means, the receiving terminal apparatus further comprises:

operation record storing means for detecting the reproduction of one broadcasting program performed by the broadcasting program reproducing means and storing an operation record composed of one particular keyword attached to the broadcasting program and one using number set to one each time the reproduction of one broadcasting program is detected, and the attribute information storing means of the receiving terminal apparatus comprises:

a fixed attribute holding unit for holding one or more fixed attributes of the viewer:

a short-term attribute holding unit for holding the operation records stored in the operation record storing means as a plurality of short-term attributes;

a long-term attribute holding unit for holding one or more long-term attributes of the viewer:

a long-term attribute renewing unit for changing the short-term attributes held in the short-term attribute holding unit to a plurality of new long-term attributes at prescribed time intervals and adding the new long-term attributes to the long-term attributes stored in the long-term attribute holding unit to renew the long-term attributes stored in the long-term attribute holding unit; and a synthetic attribute outputting unit for generating a synthetic attribute from one fixed attribute stored in the fixed attribute holding unit, one short-term attribute stored in the short-term attribute holding unit and one long-term attribute stored in the long-term attribute holding unit for each keyword while weighting the short-term attribute with a weighting factor, the synthetic attributes being output to the attribute information collating means as the viewer attribute information.

16. A broadcast system according to claim 1 in which a plurality of receiving terminal apparatuses of a plurality of viewers receive the service content information of the broadcasting program and the service addition information of the broadcasting program from the service supply apparatus, the service addition information of the broadcasting program prepared in the service addition information preparing means includes examined viewer condition information indicating a group of viewers from which viewing records are collected, each receiving terminal apparatus further comprises:

viewer recognizing means for recognizing a personal attribute of the corresponding viewer according to the viewer attribute information stored in the attribute information storing means;

viewer applicability estimating means for estimating a viewer applicability for the broadcasting program received by the broadcasting data receiving means by collating the personal attribute of the corresponding viewer recognized by the viewer recognizing means with a viewer condition indicated by the examined viewer condition information of the service addition information of the broadcasting program;

information utilization judging means for judging according to the viewer applicability estimated by the viewer applicability estimating means whether or not the collection of a viewing record for the reproduction of the broadcasting program in the broadcasting program reproducing means is performed; and viewing record collecting means for collecting the viewing record for the reproduction of the broadcasting program in cases where it is judged by the information utilization judging means that the collection of the viewing record is performed, and the service supply apparatus further comprises:

viewing record receiving means for receiving a plurality of viewing records transmitted from the viewing record collecting means of the receiving terminal apparatuses;

viewer attribute information data base for storing pieces of viewer attribute information transmitted from the attribute information storing means of the receiving terminal apparatuses; and viewer applicability estimating means for estimating an overall viewer applicability for the broadcasting program by collating the pieces of viewer attribute information of the viewers stored in the viewer attribute information data base with the viewing records received in the viewing record storing means.

17. A broadcast system according to claim 1 in which the pieces of service addition information of the broadcasting programs and the pieces of service content information of the broadcasting programs are transmitted to each of a plurality of receiving terminal apparatuses one after another, each piece of service addition information includes broadcasting program identification information identifying a specific broadcasting program for which a viewing record is planned to be collected, each receiving terminal apparatus of the current viewer further comprises:

information utilization judging means for judging according to the broadcasting program identification information whether or not the collection of a viewing record for the reproduction of a particular broadcasting program received by the broadcasting program receiving means is performed; and viewing record collecting means for collecting the viewing record for the reproduction of the particular broadcasting program in cases where the particular broadcasting program agrees with the specific broadcasting program identified by the broadcasting program identification information and it is judged by the information utilization judging means that the collection of the viewing record is performed, and the service supply apparatus further comprises:

viewing record receiving means for receiving a plurality of viewing records for the specific broadcasting program transmitted from the viewing record collecting means of the receiving terminal apparatuses;

viewer attribute information data base for storing pieces of viewer attribute information transmitted from the attribute information storing means of the receiving terminal apparatuses; and viewer applicability estimating means for estimating an overall viewer applicability for the specific broadcasting program by collating the pieces of viewer attribute information of the viewers stored in the viewer attribute information data base with the viewing records received in the viewing record storing means.

18. A broadcast system according to claim 1 in which each of a plurality of receiving terminal apparatuses of a plurality of viewers receives the service content information of a particular broadcasting program and the pieces of service addition information of the particular broadcasting program from the service supply apparatus, and the service supply apparatus further comprises:

viewer attribute information receiving means for receiving pieces of viewer attribute information transmitted from the attribute information storing means of the receiving terminal apparatuses; and viewer applicability simulating means for simulating a viewer applicability of each viewer for the particular broadcasting program according to the pieces of viewer attribute information of the viewers received by the viewer attribute information receiving means and estimating a viewer condition for the particular broadcasting program according to the viewer applicabilities, the viewer condition indicating whether or not the added-service indicated by the content information of the service addition information suits the viewer.

19. A broadcast system according to claim 16 in which the service addition information of each broadcasting program prepared in the service addition information preparing means further includes viewing record collection schedule information indicating a collecting time of the viewing record collected by the viewing record collecting means of each receiving terminal apparatus, and the viewing record of one receiving terminal apparatus of a particular viewer is transmitted to the service supply apparatus during a particular time period determined by the viewing record collection schedule information and terminal identification information included in the viewer attribute information of the particular viewer.

20. A broadcast system according to claim 17 in which the service addition information of each broadcasting program prepared in the service addition information preparing means further includes viewing record collection schedule information indicating a collecting time of the viewing record collected by the viewing record collecting means of each receiving terminal apparatus, and the viewing record of one receiving terminal apparatus of a particular viewer for each broadcasting program is transmitted to the service supply apparatus during a particular time period determined by the viewing record collection schedule information and terminal identification information included in the viewer attribute information of the particular viewer.

21. A broadcast system according to claim 16 in which a group of receiving terminal apparatuses receive the service content information of one broadcasting program and the service addition information of the broadcasting program from one of a plurality of service supply apparatuses respectively identified by an access point, the service addition information of the broadcasting program prepared in the service addition information preparing means further includes access point information indicating a particular access point, the service addition information including the access point information is received by the broadcasting data receiving means of a particular group of receiving terminal apparatuses, and the viewing records of the particular group of receiving terminal apparatuses is transmitted to a particular service supply apparatus identified by the particular access point.

22. A broadcast system according to claim 17 in which each of a plurality of receiving terminal apparatuses receive the pieces of service content information of the broadcasting programs and the pieces of service addition information of the broadcasting programs one after another from one of a plurality of service supply apparatuses respectively identified by an access point, the service addition information of the specific broadcasting program prepared in the service addition information preparing means further includes access point information indicating a particular access point, the service addition information including the access point information is received by the broadcasting data receiving means of a particular group of receiving terminal apparatuses, and the viewing records of the particular group of receiving terminal apparatuses is transmitted to a particular service supply apparatus identified by the particular access point.

23. A broadcast system according to claim 16 in which information indicating that the collection of the viewing record is performed is displayed by the broadcasting program reproducing means in cases where it is judged by the information utilization judging means that the collection of the viewing record is performed.

24. A broadcast system according to claim 17 in which information indicating that the collection of the viewing record is performed is displayed by the broadcasting program reproducing means in cases where it is judged by the information utilization judging means that the collection of the viewing record is performed.

25. A broadcast system according to claim 16 in which the service supply apparatus further comprises assessed charge managing means for managing an assessed charge for the viewing of the broadcasting program according to the viewing records received by the viewing record receiving means.

26. A broadcast system according to claim 17 in which the service supply apparatus further comprises assessed charge managing means for managing an assessed charge for the viewing of the broadcasting program according to the viewing records received by the viewing record receiving means.

27. A broadcast system according to claim 16 in which the examined viewer condition information included in the service addition information is changed by the service addition information according to the overall viewer applicability estimated by the viewer applicability estimating means.

28. A broadcast system according to claim 17 in which the service supply apparatus further comprises viewing record analyzing means for analyzing the viewing records received by the viewing record receiving means; and broadcasting program schedule managing means for changing a schedule of the broadcasting programs transmitted from the service supply apparatus to each receiving terminal apparatus according to the viewing records analyzed by the viewing record analyzing means.

29. A broadcast system according to claim 17 in which the service supply apparatus further comprises viewing record analyzing means for analyzing the viewing records received by the viewing record receiving means to find out an unpopular broadcasting program for which a program rating is low; and broadcasting program schedule managing means for automatically put a particular advertising broadcast for the unpopular broadcasting program found out by the viewing record analyzing means in a schedule of advertising broadcasts.

30. A broadcast system according to claim 17 in which the service supply apparatus further comprises viewing record analyzing means for analyzing the viewing records received by the viewing record receiving means to find out a high-rated viewer who frequently views the broadcasting programs, wherein a coupon indicating a discount on services of the broadcasting programs for the high-rated viewer found out by the viewing record analyzing means is included in particular service addition information in the service addition information preparing means and the particular service addition information is transmitted to a particular receiving terminal apparatus of the high-rated viewer.

31. A broadcast system according to claim 17 in which the service supply apparatus further comprises viewing record analyzing means for analyzing the viewing records received by the viewing record receiving means to find out a new specific broadcasting program for which a viewing record is planned to be collected, wherein new broadcasting program identification information identifying the new specific broadcasting program for which a viewing record is planned to be collected is included in particular service addition information of the new specific broadcasting program by the service addition information preparing means and the particular service addition information is transmitted to the receiving terminal apparatuses.

32. A broadcast system according to claim 1 in which the receiving terminal apparatus further comprises:

operation record storing means for detecting the reproduction of one broadcasting program performed by the broadcasting program reproducing means and storing the reproduction of the broadcasting program as an operation record, and the service supply apparatus further comprises:

viewer attribute information storing means for storing the viewer attribute information of the current viewer;

viewer attribute information renewing means for renewing the viewer attribute information of the current viewer stored in the operation record storing means to renewed viewer attribute information according to the operation record stored in the operation record storing means of the receiving terminal apparatus; and viewer attribute information transmitting means for transmitting the renewed viewer attribute information obtained in the viewer attribute information renewing means to the attribute information storing means of the receiving terminal apparatus to replace the viewer attribute information of the current viewer stored in the attribute information storing means with the renewed viewer attribute information.

33. A broadcast system according to claim 32 in which a keyword is attached to each of the broadcasting programs stored in the broadcasting data storing means of the service supply apparatus as the service addition information prepared by the service addition information preparing means to identify a type of each broadcasting program, and the viewer attribute information stored in the attribute information storing means of each receiving terminal apparatus is composed of one keyword and a using number indicating how many times the viewer views one type of broadcasting program to which the keyword is attached.

34. A broadcast system according to claim 1 in which each of a plurality of receiving terminal apparatuses of a plurality of viewers receive the pieces of service content information of the broadcasting programs and the pieces of service addition information of the broadcasting programs one after another from the service supply apparatus, each receiving terminal apparatus further comprises:

operation record storing means for detecting the reproduction of one broadcasting program performed by the broadcasting program reproducing means and storing the reproduction of the broadcasting program as an operation record, and the service supply apparatus further comprises:

operation record receiving means for receiving the operation record from the operation record storing means of each receiving terminal apparatus;

viewer type information preparing means for generating an attribute distribution of the viewers from the operation records received by the operation record receiving means as viewer type information indicating attribute types of the viewers;

viewer attribute information preparing means for determining a taste position indicated by the operation record of one viewer in the taste distribution for each viewer and preparing new viewer attribute information indicating an attribute type of one viewer according to the taste position of the viewer for each viewer; and viewer attribute information transmitting means for transmitting the new viewer attribute information of one viewer prepared by the viewer attribute information preparing means to the viewer attribute information storing unit of one receiving terminal apparatus of the viewer for each viewer to replace the viewer attribute information stored in the viewer attribute information storing unit with the new viewer attribute information.

35. A broadcast system according to claim 34 in which the pieces of service addition information of the broadcasting programs are prepared according to the viewer type information generated by the viewer type information preparing means to reflect the attributes of the viewers on the pieces of service addition information.

36. A service supply apparatus, comprising:

broadcasting data storing means for storing service content information indicating contents of a broadcasting program as broadcasting data;

service addition information preparing means for preparing service addition information, in which attribute information indicating an attribute of the service content information of the broadcasting program stored in the broadcasting data storing means and content information indicating contents of an added-service are included as broadcasting data; and broadcasting data transmitting means for transmitting the service content information of the broadcasting program stored in the broadcasting data storing means and the service addition information prepared by the service addition information preparing means to one or more receiving terminal apparatuses of one or more viewers to display the content information of the service addition information with the service content information in a particular receiving terminal apparatus of a particular viewer to show the particular viewer the added-service suiting the particular viewer in cases where the attribute of the service content information indicated by the attribute information of the service addition information suits an attribute of the particular viewer.

37. A service supply apparatus according to claim 36 in which a plurality of pieces of service content information of a plurality of broadcasting programs are stored in the broadcasting data storing means of the service supply apparatus, and the service supply apparatus further comprises:

data receiving means for receiving pieces of viewer attribute information transmitted from the receiving terminal apparatuses of the viewers;

viewer attribute information data base for storing the pieces of viewer attribute information received by the data receiving means; and service processing means for producing overall viewer attribute information for the viewers from the pieces of viewer attribute information stored in the viewer attribute information data base and selecting a piece of particular service content information of a particular broadcasting program from among the pieces of service content information of the broadcasting programs, on condition that an attribute of the particular service content information of the particular broadcasting program is most suitable to the overall viewer attribute information, so as to transmit the particular service content information of the particular broadcasting program and service addition information indicating the attribute of the particular service content information of the particular broadcasting program from the broadcasting data transmitting means to each of the receiving terminal apparatuses.

38. A service supply apparatus according to claim 36, further comprising code table storing means for storing a code table in which a set of a keyword, a code corresponding to the keyword and a using number corresponding to the keyword is registered for each keyword; and keyword coding means for coding one keyword attached to each broadcasting program stored in the broadcasting data storing means as the service addition information prepared by the service addition information preparing means according to the code table stored in the code table storing means by changing the keyword to the code corresponding to the keyword.

39. A service supply apparatus according to claim 36, further comprising viewing record receiving means for receiving a viewing record of the broadcasting program from each of the receiving terminal apparatuses; and viewing record analyzing means for analyzing the viewing records received by the viewing record receiving means to find out a high-rated viewer who frequently views the broadcasting program.

40. A service supply apparatus according to claim 36, further comprising viewer attribute information receiving means for receiving pieces of viewer attribute information indicating attributes of the viewers from the receiving terminal apparatuses; and viewer applicability simulating means for simulating a viewer applicability of each viewer for the broadcasting program according to the pieces of viewer attribute information of the viewers received by the viewer attribute information receiving means and estimating a viewer condition for the broadcasting program according to the viewer applicabilities, the viewer condition indicating whether or not the added-service indicated by the content information of the service addition information suits the viewer.

41. A receiving terminal apparatus of a current viewer comprising:

attribute information storing means for storing viewer attribute information indicating a personal attribute of the current viewer;

broadcasting data receiving means for receiving service content information indicating contents of a broadcasting program and service addition information, in which attribute information indicating an attribute of the broadcasting program and content information indicating contents of an added-service are included, from a service supply apparatus;

attribute information collating means for collating the service addition information received by the broadcasting data receiving means with the viewer attribute information stored in the attribute information storing means and judging whether or not the attribute of the service content information of the broadcasting program suits the personal attribute of the viewer; and broadcasting program reproducing means for reproducing the service content information of the broadcasting program received by the broadcasting data receiving means, in cases where it is judged by the attribute information collating means that the attribute of the service content information of the broadcasting program suits the personal attribute of the viewer, and displaying the content information included in the service addition information with the service content information to show the current viewer the added-service suiting the current viewer.

42. A receiving terminal apparatus according to claim 41, further comprising:

operation record storing means for detecting the reproduction of the broadcasting program performed by the broadcasting program reproducing means and storing the reproduction of the broadcasting program as an operation record; and data transmitting means for transmitting the operation record stored in the operation record storing means to the service supplying apparatus.

43. A receiving terminal apparatus according to claim 41, further comprising:

operation record storing means for detecting the reproduction of the broadcasting program performed by the broadcasting program reproducing means and storing the reproduction of the broadcasting program as an operation record each time the reproduction of the broadcasting program is reproduced, and the attribute information storing means comprises:

a fixed attribute holding unit for holding one or more fixed attributes of the viewer:

a short-term attribute holding unit for holding the operation records stored in the operation record storing means as a plurality of short-term attributes of the current viewer;

a long-term attribute holding unit for holding one or more long-term attributes of the current viewer;

a long-term attribute renewing unit for changing each short-term attribute held in the short-term attribute holding unit to a new long-term attribute when a holding time period of the short-term attribute reaches a prescribed value and adding the new long-term attribute to the long-term attributes stored in the long-term attribute holding unit to renew the long-term attributes stored in the long-term attribute holding unit; and a synthetic attribute outputting unit for generating a plurality of synthetic attributes from the fixed attributes stored in the fixed attribute holding unit, the short-term attributes stored in the short-term attribute holding unit and the long-term attribute stored in the long-term attribute holding unit while weighting the short-term attributes with a weighting factor, the synthetic attributes being output to the attribute information collating means as the viewer attribute information.

44. A receiving terminal apparatus according to claim 41, further comprising:

viewer recognizing means for recognizing a personal attribute of the current viewer according to the viewer attribute information stored in the attribute information storing means;

viewer applicability estimating means for estimating a viewer applicability for the broadcasting program received by the broadcasting data receiving means by collating the personal attribute of the current viewer recognized by the viewer recognizing means with a viewer condition indicated by examined viewer condition information included in the service addition information;

information utilization judging means for judging according to the viewer applicability estimated by the viewer applicability estimating means whether or not the collection of a viewing record for the reproduction of the broadcasting program performed in the broadcasting program reproducing means is performed;

viewing record collecting means for collecting the viewing record for the reproduction of the broadcasting program in cases where it is judged by the information utilization judging means that the collection of the viewing record is performed; and data transmitting means for transmitting the viewing record collected by the viewing record collecting means to the service supply apparatus.

45. A broadcast system according to claim 1 in which a message or an image denoting the contents of the added-service indicated by the content information of the service addition information is displayed by the broadcasting program reproducing means in place of a message or an image included in the service content information.

46. A service supply apparatus according to claim 36 in which a message or an image denoting the contents of the added-service indicated by the content information of the service addition information is displayed in place of a message or an image included in the service content information in the particular receiving terminal apparatus.

47. A receiving terminal apparatus according to claim 41 in which a message or an image denoting the contents of the added-service indicated by the content information of the service addition information is displayed by the broadcasting program reproducing means in place of a message or an mage included in the service content information.

* * * * *